US012733062B2

(12) United States Patent
Farag et al.

(10) Patent No.: US 12,733,062 B2
(45) Date of Patent: Sep. 8, 2026

(54) BEAM INDICATION FOR FULL DUPLEX

(71) Applicant: Samsung Electronics Co., Ltd., Suwon-si (KR)

(72) Inventors: Emad Nader Farag, Flanders, NJ (US); Marian Rudolf, Longueuil (CA); Eko Onggosanusi, Coppell, TX (US); Dalin Zhu, Allen, TX (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 272 days.

(21) Appl. No.: 18/678,322

(22) Filed: May 30, 2024

(65) Prior Publication Data

US 2024/0422853 A1 Dec. 19, 2024

Related U.S. Application Data

(60) Provisional application No. 63/529,095, filed on Jul. 26, 2023, provisional application No. 63/521,539, filed on Jun. 16, 2023.

(51) Int. Cl.
*H04W 76/20* (2018.01)
*H04B 7/06* (2006.01)
(Continued)

(52) U.S. Cl.
CPC ........ *H04W 76/20* (2018.02); *H04B 7/06968* (2023.05); *H04W 72/0446* (2013.01); *H04W 72/1268* (2013.01); *H04W 72/231* (2023.01)

(58) Field of Classification Search
None
See application file for complete search history.

(56) References Cited

U.S. PATENT DOCUMENTS

| | | | | |
|---|---|---|---|---|
| 11,412,501 | B2 * | 8/2022 | Zhou | H04B 7/088 |
| 11,456,822 | B2 * | 9/2022 | Huang | H04L 5/0094 |
| 2021/0105095 | A1 * | 4/2021 | Huang | H04W 72/0446 |
| 2023/0299900 | A1 * | 9/2023 | Gao | H04L 5/0055 370/330 |

(Continued)

FOREIGN PATENT DOCUMENTS

| | | | |
|---|---|---|---|
| EP | 3914005 | A1 | 11/2021 |
| WO | 2022212308 | A1 | 10/2022 |
| WO | 2022217183 | A1 | 10/2022 |

OTHER PUBLICATIONS

"5G; NR; Physical channels and modulation (3GPP TS 38.211 version 17.4.0 Release 17)", ETSI TS 138 211 V17.4.0, Jan. 2023, 141 pages.

(Continued)

*Primary Examiner* — Faiyazkhan Ghafoerkhan

(57) ABSTRACT

Methods and apparatuses for beam indication for full duplex. A method of operating a user equipment (UE) includes receiving first and second information that includes first and second transmission configuration indicator (TCI) state configurations associated with first and second subsets of slots or symbols, respectively, on a cell and receiving a downlink control information (DCI) format that includes a first or second TCI state code point from the first or second TCI state configuration. The method further includes determining, based on whether a slot or symbol is from the first or second subset, the first or second TCI state code point and receiving, based on the determination, a shared data or control channel or signal using the first or second TCI state code point. The first subset does not include time-domain resources indicated for simultaneous transmission and reception on the cell and the second subset does.

20 Claims, 15 Drawing Sheets

(51) Int. Cl.

| | |
|---|---|
| ***H04W 72/0446*** | (2023.01) |
| ***H04W 72/1268*** | (2023.01) |
| ***H04W 72/231*** | (2023.01) |

(56) References Cited

U.S. PATENT DOCUMENTS

| | | | | |
|---|---|---|---|---|
| 2024/0121825 | A1* | 4/2024 | Rastegardoost | H04W 74/0816 |
| 2024/0137970 | A1* | 4/2024 | Rastegardoost | H04W 72/40 |
| 2024/0163905 | A1* | 5/2024 | Rastegardoost | H04W 72/25 |
| 2024/0388326 | A1* | 11/2024 | Haghighat | H04L 5/0048 |
| 2024/0422853 | A1* | 12/2024 | Farag | H04B 7/06968 |

OTHER PUBLICATIONS

"5G; NR; Multiplexing and channel coding (3GPP TS 38.212 version 17.4.0 Release 17)", ETSI TS 138 212 V17.4.0, Jan. 2023, 206 pages.

"5G; NR; Physical layer procedures for control (3GPP TS 38.213 version 17.4.0 Release 17)", ETSI TS 138 213 V17.4.0, Jan. 2023, 263 pages.

"5G; NR; Physical layer procedures for data (3GPP TS 38.214 version 17.4.0 Release 17)", ETSI TS 138 214 V17.4.0, Jan. 2023, 236 pages.

"5G; NR; Medium Access Control (MAC) protocol specification (3GPP TS 38.321 version 17.3.0 Release 17)", ETSI TS 138 321 V17.3.0, Jan. 2023, 254 pages.

"5G; NR; Radio Resource Control (RRC); Protocol specification (3GPP TS 38.331 version 17.3.0 Release 17)", ETSI TS 138 331 V17.3.0, Jan. 2023, 1295 pages.

CMCC, "Revised SID: Study on evolution of NR duplex operation", 3GPP TSG RAN Meeting #98-e, RP-223041, Dec. 2022, 5 pages.

International Search Report and Written Opinion issued Sep. 4, 2024 regarding International Application No. PCT/KR2024/008107, 7 pages.

* cited by examiner

In one example, the resources on TRP B overlapping the Tx occasion can:

1. Be in a slot or symbol of different SBFD Type
2. Be in a slot or symbol of different SBFD configuration
3. Include non-UL (e.g., DL) resources that overlap the Tx occasion

BEAM INDICATION FOR FULL DUPLEX

CROSS-REFERENCE TO RELATED AND CLAIM OF PRIORITY

The present application claims priority under 35 U.S.C. § 119 (e) to U.S. Provisional Patent Application No. 63/521,539 filed on Jun. 16, 2023, and U.S. Provisional Patent Application No. 63/529,095 filed on Jul. 26, 2023, which are hereby incorporated by reference in their entirety.

TECHNICAL FIELD

The present disclosure relates generally to wireless communication systems and, more specifically, the present disclosure relates to methods and apparatuses for beam indication for full duplex communication systems.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance. To meet the demand for wireless data traffic having increased since deployment of 4G communication systems, and to enable various vertical applications, 5G communication systems have been developed and are currently being deployed.

SUMMARY

The present disclosure relates to beam indication for full duplex.

Other technical features may be readily apparent to one skilled in the art from the following figures, descriptions, and claims.

In one embodiment, a user equipment (UE) is provided. The UE includes a transceiver configured to receive first information that includes a first transmission configuration indicator (TCI) state configuration associated with a first subset of slots or symbols from a set of slots or symbols on a cell, second information that includes a second TCI state configuration associated with a second subset of slots or symbols from the set of slots or symbols on the cell, and a downlink control information (DCI) format that includes a first TCI state code point from the first TCI state configuration or a second TCI state code point from the second TCI state configuration. The UE further includes a processor operably coupled to the transceiver. The processor is configured to determine, based on whether a slot or symbol is from the first subset of slots or symbols or the second subset of slots or symbols, the first TCI state code point or the second TCI state code point. The transceiver is further configured to receive, based on the determination that the slot or symbol is from the first subset of slots or symbols, a shared data or control channel or signal using the first TCI state code point and receive, based on the determination that the slot or symbol is from the second subset of slots or symbols, the shared data or control channel or signal using the second TCI state code point. The first subset of slots or symbols does not include time-domain resources indicated for simultaneous transmission and reception on the cell. The second subset of slots or symbols includes time-domain resources indicated for simultaneous transmission and reception on the cell.

In another embodiment, a base station (BS) is provided. The BS includes a transceiver configured to transmit first information that includes a first TCI state configuration associated with a first subset of slots or symbols from a set of slots or symbols on a cell, second information that includes a second TCI state configuration associated with a second subset of slots or symbols from the set of slots or symbols on the cell, and a DCI format that includes a first TCI state code point from the first TCI state configuration or a second TCI state code point from the second TCI state configuration. The BS further includes a processor operably coupled to the transceiver. The processor is configured to determine, based on whether a slot or symbol is from the first subset of slots or symbols or the second subset of slots or symbols, the first TCI state code point or the second TCI state code point. The transceiver is further configured to transmit, based on the determination that the slot or symbol is from the first subset of slots or symbols, a shared data or control channel or signal using the first TCI state code point and transmit, based on the determination that the slot or symbol is from the second subset of slots or symbols, the shared data or control channel or signal using the second TCI state code point. The first subset of slots or symbols does not include time-domain resources indicated for simultaneous transmission and reception on the cell. The second subset of slots or symbols includes time-domain resources indicated for simultaneous transmission and reception on the cell.

In yet another embodiment, a method of operating a UE is provided. The method includes receiving first information that includes a first TCI state configuration associated with a first subset of slots or symbols from a set of slots or symbols on a cell, receiving second information that includes a second TCI state configuration associated with a second subset of slots or symbols from the set of slots or symbols on the cell, and receiving a DCI format that includes a first TCI state code point from the first TCI state configuration or a second TCI state code point from the second TCI state configuration. The method further includes determining, based on whether a slot or symbol is from the first subset of slots or symbols or the second subset of slots or symbols, the first TCI state code point or the second TCI state code point and one of: receiving, based on the determination that the slot or symbol is from the first subset of slots or symbols, a shared data or control channel or signal using the first TCI state code point or receiving, based on the determination that the slot or symbol is from the second subset of slots or symbols, the shared data or control channel or signal using the second TCI state code point. The first subset of slots or symbols does not include time-domain resources indicated for simultaneous transmission and reception on the cell. The second subset of slots or symbols includes time-domain resources indicated for simultaneous transmission and reception on the cell.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive,"

and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1-19, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation, full duplex operation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G, or even later releases which may use terahertz (THz) bands.

The following documents and standards descriptions are hereby incorporated by reference into the present disclosure as if fully set forth herein: [1] 3GPP TS 38.211 v17.4.0, "NR; Physical channels and modulation;" [2] 3GPP TS 38.212 v17.4.0, "NR; Multiplexing and Channel coding;" [3] 3GPP TS 38.213 v17.4.0, "NR; Physical Layer Procedures for Control;" [4] 3GPP TS 38.214 v17.4.0, "NR; Physical Layer Procedures for Data;" [5] 3GPP TS 38.321 v17.3.0, "NR; Medium Access Control (MAC) protocol specification;" [6] 3GPP TS 38.331 v17.3.0, "NR; Radio Resource Control (RRC) Protocol Specification;" and [7] 3GPP RP-223041, "Study on Evolution of NR Duplex Operation."

Figure 1:
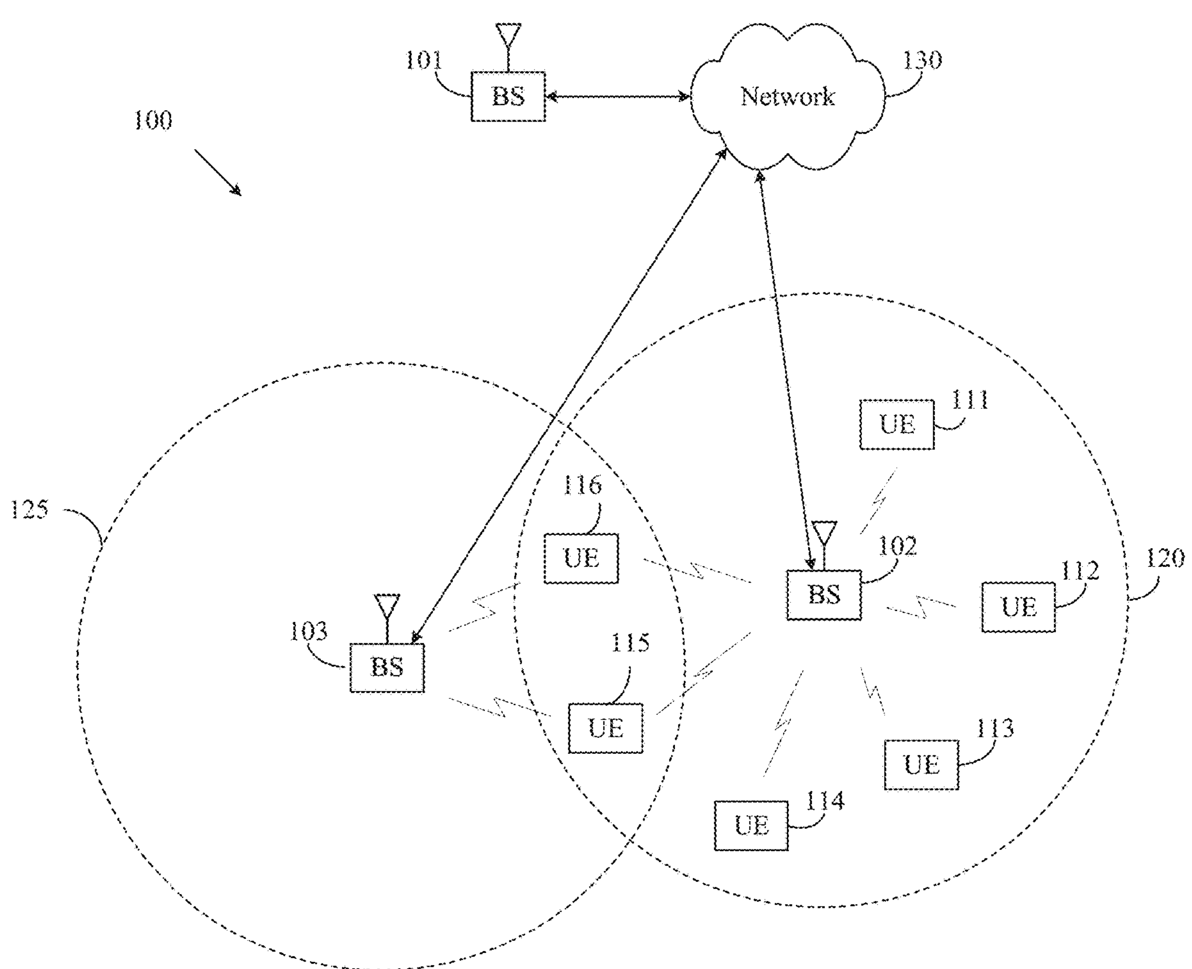
FIG. 1 illustrates an example wireless network according to embodiments of the present disclosure.
Figure 2:
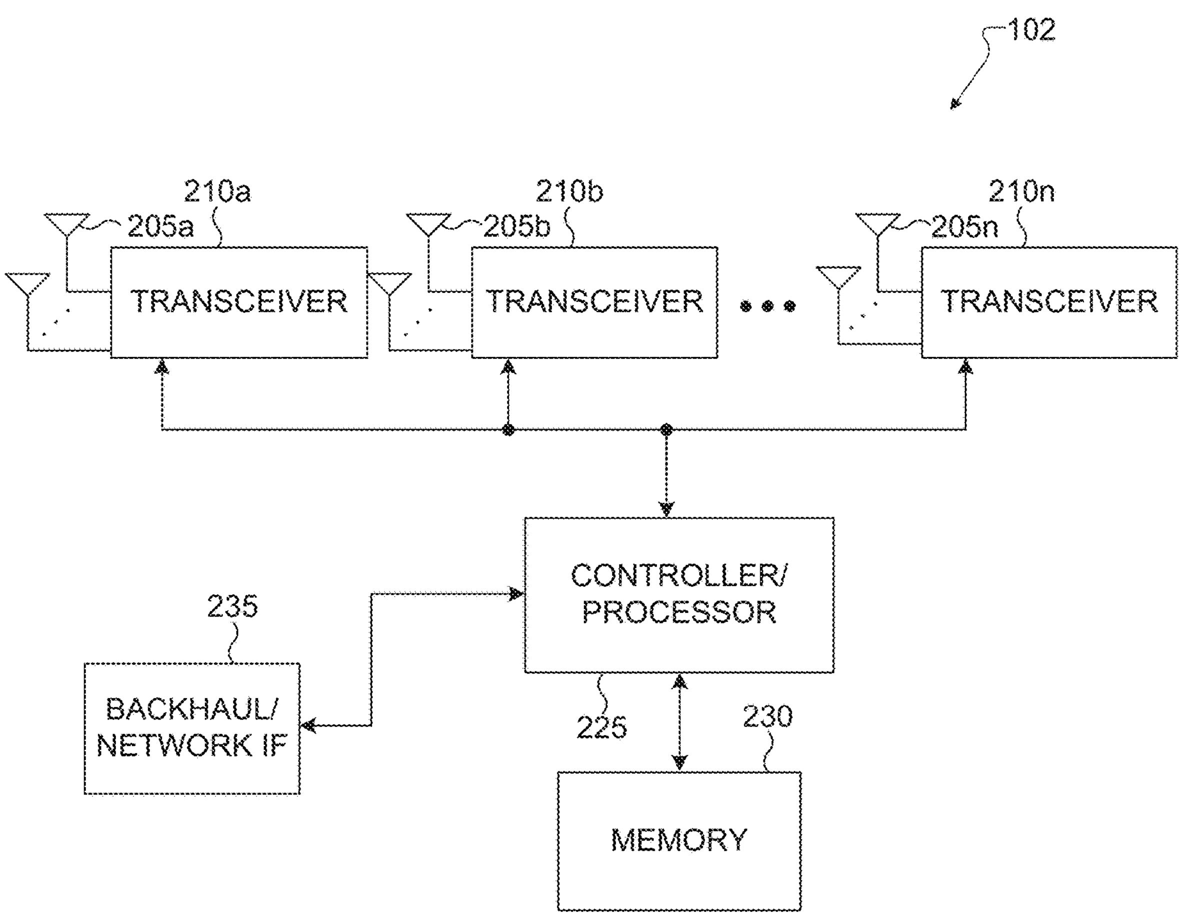
FIG. 2 illustrates an example gNodeB (gNB) according to embodiments of the present disclosure.
Figure 3:
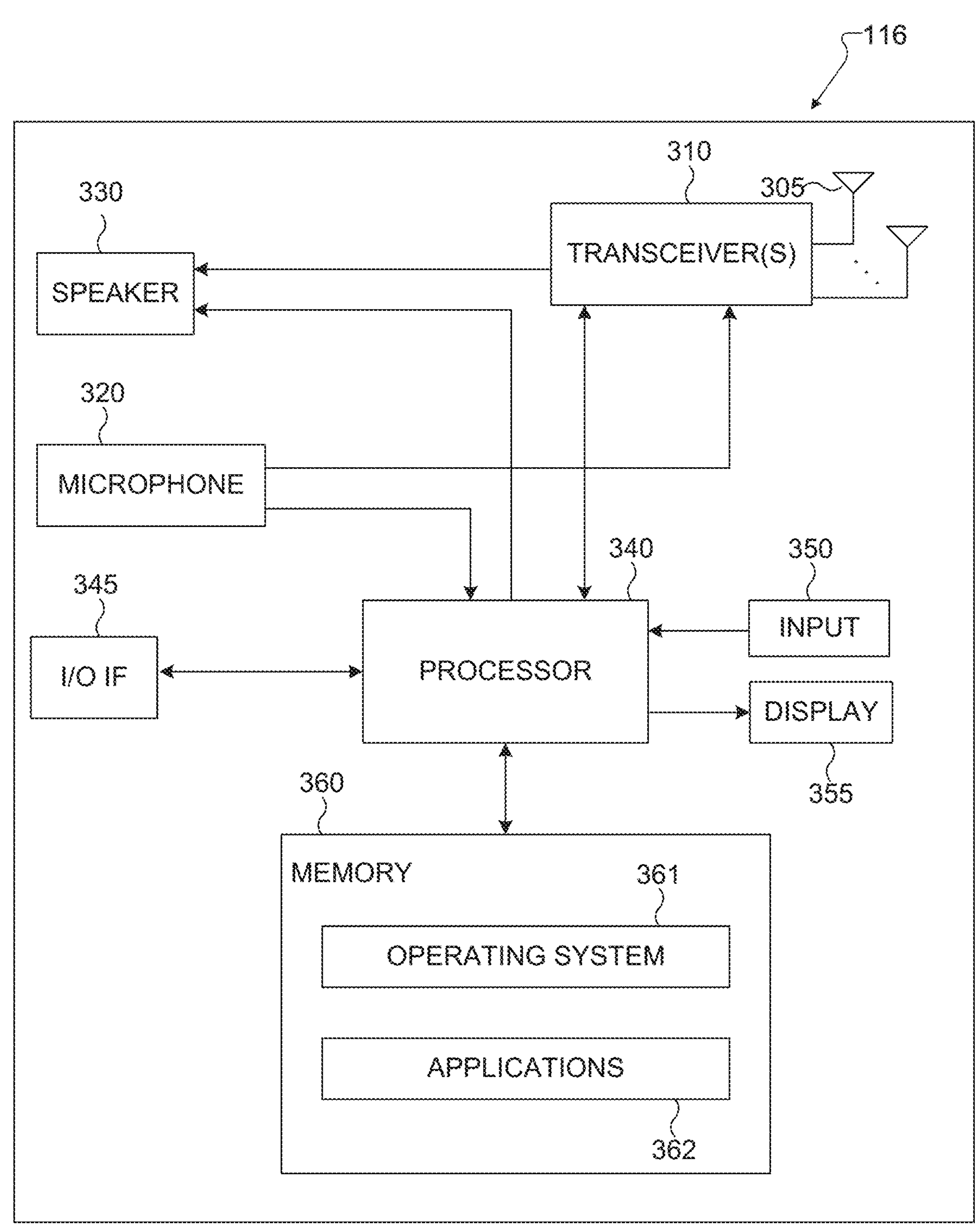
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for utilizing beam indications for full duplex communication systems. In certain embodiments, one or more of the BSs 101-103 include circuitry, programing, or a combination thereof to support beam indications for full duplex communication systems.

Although FIG. 1 illustrates one example of a wireless network, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming radio frequency (RF) signals, such as signals transmitted by UEs in the wireless network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of uplink (UL) channel signals and the transmission of downlink (DL) channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as supporting beam indication for full duplex communication systems. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the wireless network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes to utilize and/or identify beam indication for full duplex communication systems as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers.

The I/O interface 345 is the communication path between these accessories and the processor 340.

The processor 340 is also coupled to the input 350, which includes, for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
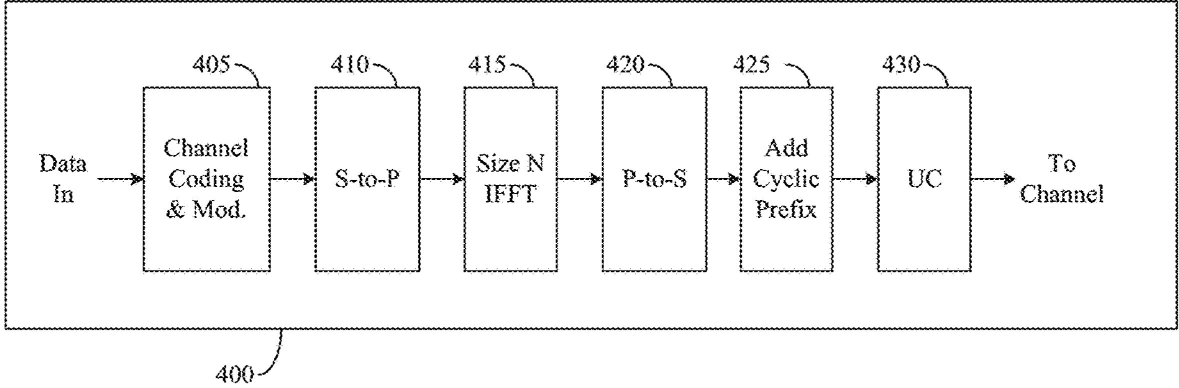
FIGS. 4A and 4B illustrates an example of a wireless transmit and receive paths according to embodiments of the present disclosure.
Figure 4B:
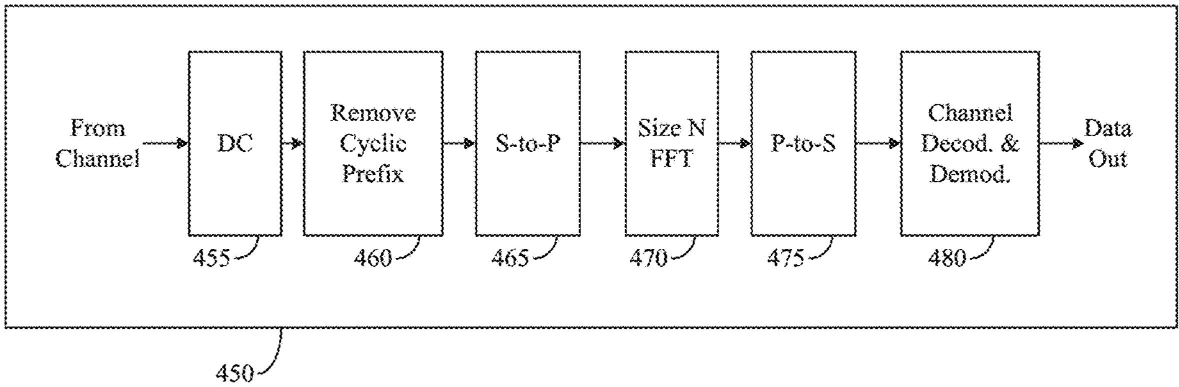

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. In some embodiments, the transmit path 400 and/or receive path 450 is configured to support beam indication for full duplex communication systems as described in embodiments of the present disclosure.

As illustrated in FIG. 4A, the transmit path 400 includes a channel coding and modulation block 205, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 250 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

Figure 5A:
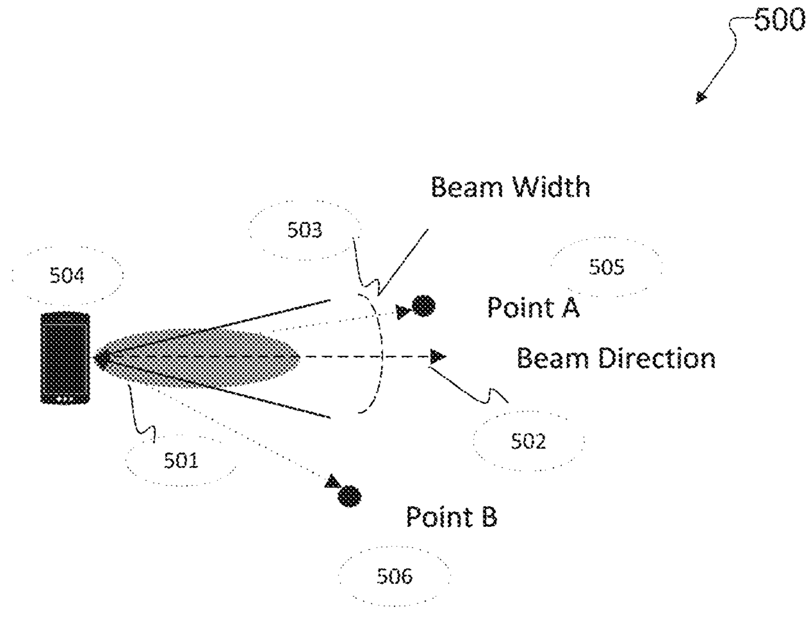
FIG. 5A illustrates an example of a wireless system according to embodiments of the present disclosure.

As illustrated in FIG. 5A, in a wireless system 500, a beam 501 for a device 504 can be characterized by a beam direction 502 and a beam width 503. For example, the device 504 (or UE 116) transmits RF energy in a beam direction and within a beam width. The device 504 receives RF energy in a beam direction and within a beam width. As illustrated in FIG. 5A, a device at point A 505 can receive from and transmit to device 504 as Point A is within a beam width and direction of a beam from device 504. As illustrated in FIG. 5A, a device at point B 506 cannot receive from and transmit to device 504 as Point B 506 is outside a beam width and direction of a beam from device 504. While FIG. 5A, for illustrative purposes, shows a beam in 2-dimensions (2D), it should be apparent to those skilled in the art, that a beam can be in 3-dimensions (3D), where the beam direction and beam width are defined in space.

Figure 5B:
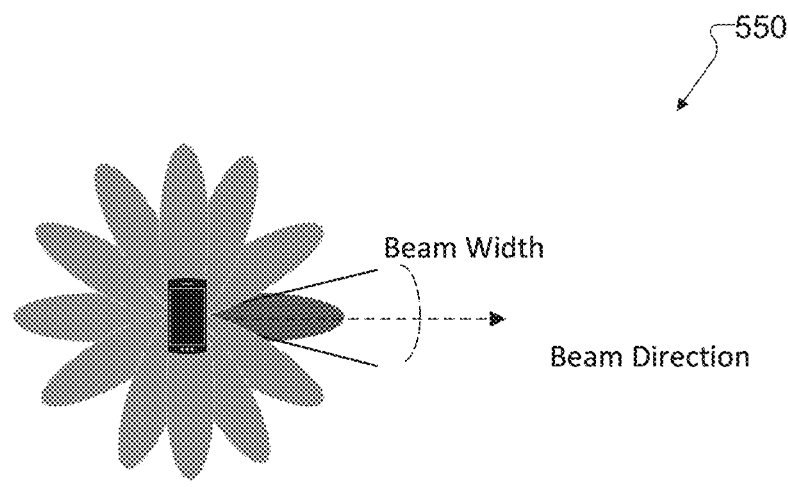
FIG. 5B illustrates an example of a multi-beam operation according to embodiments of the present disclosure.

FIG. 5B illustrates an example of a multi-beam operation 550 according to embodiments of the present disclosure. For example, the multi-beam operation 550 can be utilized by UE 116 of FIG. 3. This example is for illustration only and other embodiments can be used without departing from the scope of the present disclosure.

In a wireless system, a device can transmit and/or receive on multiple beams. This is known as "multi-beam operation". While FIG. 5B, for illustrative purposes, a beam is in 2D, it should be apparent to those skilled in the art, that a beam can be 3D, where a beam can be transmitted to or received from any direction in space.

Figure 6:
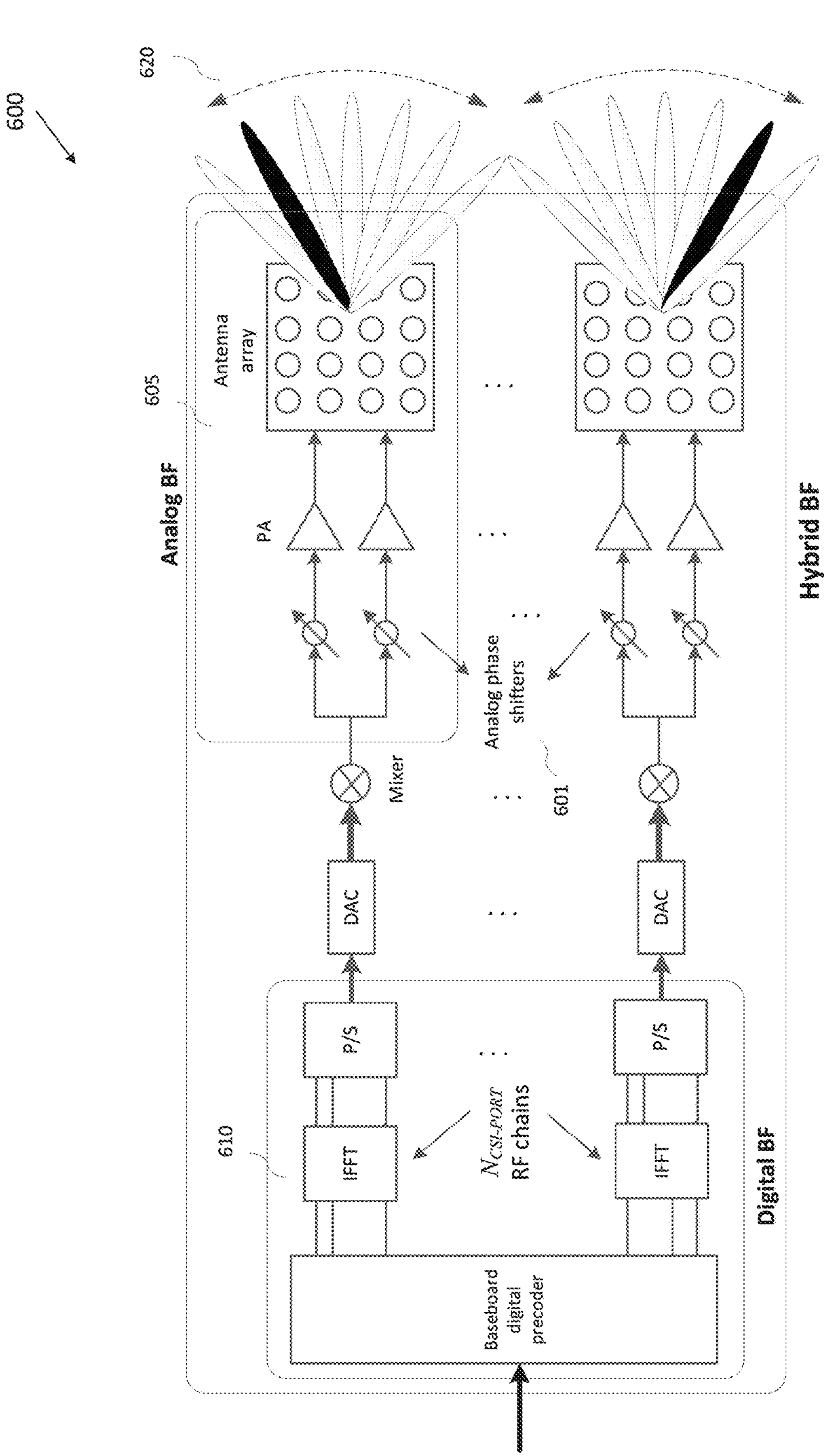
FIG. 6 illustrates an example of a transmitter structure for beamforming according to embodiments of the present disclosure.

FIG. 6 illustrates an example of a transmitter structure 600 for beamforming according to embodiments of the present disclosure. In certain embodiments, one or more of gNB 102 or UE 116 includes the transmitter structure 600. For example, one or more of antenna 205 and its associated systems or antenna 305 and its associated systems can be included in transmitter structure 600. This example is for illustration only and other embodiments can be used without departing from the scope of the present disclosure.

Accordingly, embodiments of the present disclosure recognize that Rel-14 LTE and Rel-15 NR support up to 32 CSI-RS antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of analog-to-digital converters (ADCs)/digital-to-analog converters (DACs) at mmWave frequencies) as illustrated in FIG. 6. Then, one CSI-RS port can be mapped onto a large number of antenna elements that can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or slots/subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase a precoding gain. While analog beams are wideband (hence not frequency-selective), digital precoding can be varied across frequency sub-bands or resource blocks. Receiver operation can be conceived analogously.

Since the transmitter structure 600 of FIG. 6 utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam. The system of FIG. 6 is also applicable to higher frequency bands such as >52.6 GHz (also termed frequency range 2-2 or FR2-2). In this case, the system can employ only analog beams. Due to the O2 absorption loss around 60 GHz frequency (~10 dB additional loss per 100 m distance), a larger number and narrower analog beams (hence a larger number of radiators in the array) are needed to compensate for the additional path loss.

The text and figures are provided solely as examples to aid the reader in understanding the present disclosure. They are not intended and are not to be construed as limiting the scope of the present disclosure in any manner. Although certain embodiments and examples have been provided, it will be apparent to those skilled in the art based on the disclosures herein that changes in the embodiments and examples shown may be made without departing from the scope of the present disclosure. The transmitter structure 600 for beamforming is for illustration only and other embodiments can be used without departing from the scope of the present disclosure.

In this disclosure, a beam is determined by either of;

A TCI state, that establishes a quasi-colocation (QCL) relationship between a source reference signal (e.g., SS/PBCH block (SSB) and/or CSI-RS) and a target reference signal A spatial relation information that establishes an association to a source reference signal, such as SSB or CSI-RS or sounding reference signal (SRS).

In either case, the ID of the source reference signal or TCI state or spatial relation identifies the beam.

The TCI state and/or the spatial relation reference RS can determine a spatial Rx filter or quasi-co-location (QCL) properties for reception of downlink channels at the UE, or a spatial Tx filter for transmission of uplink channels from the UE. The TCI state and/or the spatial relation reference RS can determine a spatial Tx filter or quasi-co-location (QCL) properties for transmission of downlink channels from the gNB, or a spatial Rx filter for reception of uplink channels at the gNB.

In the present disclosure a beam is determined by either of: a transmission configuration indication (TCI) state that establishes a quasi-co-location (QCL) relationship or spatial relation between a source reference signal (e.g., a synchronization signal block (Synchronization Signal/Physical Broadcast Channel (SS/PBCH) Block or SSB) or channel state information reference signal (CSI-RS)) and a target reference signal, or spatial relationship information that establishes an association to a source reference signal, such as an SSB, CSI-RS, or sounding reference signal (SRS). In either case, the ID of the source reference signal or TCI state or spatial relation identifies the beam.

The TCI state and/or the spatial relationship reference RS can determine a spatial Rx filter for reception of downlink channels at the UE, or a spatial Tx filter for transmission of uplink channels from the UE. The TCI state and/or the spatial relation reference RS can determine a spatial Tx filter for transmission of downlink channels or signals from the gNB (e.g., the gNB 102), or a spatial Rx filter for reception of uplink channels or signals at the gNB.

A communication system can include a downlink (DL) that refers to transmissions from a base station (such as the BS 102) or one or more transmission points to UEs (such as the UE 116) and an uplink (UL) that refers to transmissions from UEs (such as the UE 116) to a base station (such as the BS 102) or to one or more reception points.

A time unit for DL signaling or for UL signaling on a cell is referred to as a slot and can include one or more symbols.

A symbol can also serve as an additional time unit. A frequency or bandwidth (BW) unit is referred to as a resource block (RB). One RB includes a number of sub-carriers (SCs). For example, a slot can have duration of one millisecond or 0.5 millisecond, include 14 symbols and an RB can have a bandwidth of 180 kHz or 720 kHz respectively, and include 12 SCs with inter-SC spacing of 15 KHz or 30 kHz respectively. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format. A DCI format scheduling PDSCH reception or PUSCH transmission for a single UE, such as a DCI format with cyclic redundancy check (CRC) scrambled by cell-radio network temporary identifier (C-RNTI)/configured scheduling RNTI (CS-RNTI)/modulation and coding scheme C-RNTI (MCS-C-RNTI) as described in 38.212 [REF2], are referred for brevity as a unicast DCI format. A DCI format scheduling PDSCH reception for multicast communication, such as a DCI format with CRC scrambled by group RNTI (G-RNTI)/G-CS-RNTI as described in REF2, are referred to as multicast DCI format. DCI formats providing various control information to at least a subset of UEs in a serving cell, such as DCI format 2_0 in REF2, are referred to as group-common (GC) DCI formats.

A UE can be indicated a spatial setting for a PDCCH reception based on a configuration of a value for a transmission configuration indication state (TCI state) of a control resource set (CORESET) where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB (such as BS 102) transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE (such as UE 116) can determine CSI-RS transmission parameters through DL control signaling or higher layer signaling, such as radio resource control (RRC) signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel (PRACH).

An antenna port is defined such that the channel over which a symbol on the antenna port is conveyed can be inferred from the channel over which another symbol on the same antenna port is conveyed.

For demodulation reference signal (DM-RS) associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same precoding resource block group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may expect the same precoding being used.

For DM-RS associated with a physical broadcast channel (PBCH), the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE (such as the UE 116) may expect that synchronization signal (SS)/PBCH block (also denoted as SSBs) transmitted with the same block index on the same center frequency location are quasi co-located with respect to Doppler spread, Doppler shift, average gain, average delay, delay spread, and, when applicable, spatial Rx parameters. The UE may not expect quasi co-location for any other synchronization signal SS/PBCH block transmissions.

In absence of CSI-RS configuration, and unless otherwise configured, the UE may expect PDSCH DM-RS and SSB to be quasi co-located with respect to Doppler shift, Doppler spread, average delay, delay spread, and, when applicable, spatial Rx parameters. The UE may expect that the PDSCH DM-RS within the same code division multiplexing (CDM) group is quasi co-located with respect to Doppler shift, Doppler spread, average delay, delay spread, and spatial Rx. The UE may also expect that DM-RS ports associated with a PDSCH are QCL with QCL type A, type D (when applicable) and average gain. The UE may further expect that no DM-RS collides with the SS/PBCH block.

The UE can be configured with a list of up to M transmission configuration indication (TCI) State configurations within the higher layer parameter PDSCH-Config to decode PDSCH according to a detected PDCCH with DCI intended for the UE and the given serving cell, where M depends on the UE capability maxNumberConfiguredTOIstatesPer (C. Each TCI-State contains parameters for configuring a quasi-colocation (QCL) relationship between one or two downlink reference signals and the DM-RS ports of the PDSCH, the DM-RS port of PDCCH or the CSI-RS port(s) of a CSI-RS resource.

The quasi-co-location relationship is configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs. The quasi-co-location types corresponding to each DL RS are given by the higher layer parameter qcl-Type in QCL-Info and may take one of the following values: QCL-TypeA: {Doppler shift, Doppler spread, average delay, delay spread}; QCL-TypeB: {Doppler shift, Doppler spread; QCL-TypeC: {Doppler shift, average delay}; and QCL-TypeD: {Spatial Rx parameter}.

The UE receives a MAC-control element (CE) activation command to map up to [N] (e.g., N=8) TCI states to the codepoints of the DCI field "Transmission Configuration Indication." When the HARQ-ACK corresponding to the PDSCH carrying the activation command is transmitted in slot n, the indicated mapping between TCI states and codepoints of the DCI field "Transmission Configuration Indication" may be applied after a MAC-CE application time, e.g., starting from the first slot that is after slot $$\left(n + 3N_{slot}^{subframe,\mu}\right).$$

Rel-17 introduced the unified TCI framework, where a unified or master or main or indicated TCI state is signaled or indicated to the UE. The unified or master or main or indicated TCI state can be one of:

1. In case of joint TCI state indication, wherein a same beam is used for DL and UL channels, a joint TCI state that can be used at least for UE-dedicated DL channels and UE-dedicated UL channels.
2. In case of separate TCI state indication, wherein different beams are used for DL and UL channels, a DL TCI state that can be used at least for UE-dedicated DL channels.
3. In case of separate TCI state indication, wherein different beams are used for DL and UL channels, a UL TCI state that can be used at least for UE-dedicated UL channels.

The unified (master or main or indicated) TCI state is a DL or a Joint TCI state of UE-dedicated reception on PDSCH/PDCCH and the CSI-RS applying the indicated TCI state and/or an UL or a Joint TCI state for dynamic-grant/configured-grant based PUSCH, PUCCH, and SRS applying the indicated TCI state.

The unified TCI framework applies to intra-cell beam management, wherein, the TCI states have a source RS that is directly or indirectly associated, through a quasi-co-location relation, e.g., spatial relation, with an SSB of a serving cell (e.g., the TCI state is associated with a TRP of a serving cell). The unified TCI state framework also applies to inter-cell beam management, wherein a TCI state can have a source RS that is directly or indirectly associated, through a quasi-co-location relation, e.g., spatial relation, with an SSB of cell that has a physical cell identity (PCI) different from the PCI of the serving cell (e.g., the TCI state is associated with a TRP of a cell having a PCI different from the PCI of the serving cell). In Rel-17, UE-dedicated channels can be received and/or transmitted using a TCI state associated with a cell having a PCI different from the PCI of the serving cell. While the common channels can be received and/or transmitted using a TCI state associated with the serving cell (e.g., not associated with a cell having a PCI different from the PCI of the serving cell). Common channels can include:

- Channels carrying system information (e.g., SIB) with a DL assignment carried by a DCI in PDCCH having a CRC scrambled by system information RNTI (SI-RNTI) and transmitted in Type0-PDCCH common search space (CSS) set.
- Channels carrying other system information with a DL assignment carried by a DCI in PDCCH having a CRC scrambled by SI-RNTI and transmitted in Type0A-PDCCH CSS set.
- Channels carrying paging or short messages with a DL assignment carried by a DCI in PDCCH having a CRC scrambled by paging RNTI (P-RNTI) and transmitted in Type2-PDCCH CSS set.
- Channels carrying RANDOM ACCESS CHANNEL (RACH) related channels with a DL assignment or UL grant carried by a DCI in PDCCH having a CRC scrambled by random access (RA)-RNTI or TC-RNTI and transmitted in Type1-PDCCH CSS set.

A DL-related DCI Format (e.g., DCI Format 1_1 or DCI Format 1_2), with or without DL assignment, can indicate to a UE through a field "transmission configuration indication" a TCI state code point, wherein, the TCI state codepoint can be one of (1) a DL TCI state; (2) an UL TCI state; (3) a joint TCI state; or (4) a pair of DL TCI state and UL TCI state. TCI state code points are activated by MAC CE signaling.

Quasi-co-location (QCL) relation, can be quasi-location with respect to one or more of the following relations [38.214 [REF4]—section 5.1.5]:

- Type A, {Doppler shift, Doppler spread, average delay, delay spread}
- Type B, {Doppler shift, Doppler spread}
- Type C, {Doppler shift, average delay}
- Type D, {Spatial Rx parameter}

In addition, quasi-co-location relation can also provide a spatial relation for UL channels, e.g., a DL source reference signal provides information on the spatial domain filter to be used for UL transmissions, or the UL source reference signal provides the spatial domain filter to be used for UL transmissions, e.g., same spatial domain filter for UL source reference signal and UL transmissions.

The unified (master or main or indicated) TCI state applies at least to UE dedicated DL and UL channels.

The unified (master or main or indicated) TCI can also apply to other DL and/or UL channels and/or signals e.g., non-UE dedicated channel and sounding reference signal (SRS).

In certain embodiments, 5G NR radio supports time-division duplex (TDD) operation and frequency division duplex (FDD) operation. Use of FDD or TDD depends on the NR frequency band and per-country allocations. TDD is required in most bands above 2.5 GHz.

Figure 7:
FIG. 7 illustrates a timeline of an example time division duplexing (TDD) configurations according to embodiments of the present disclosure.
Figure 7:
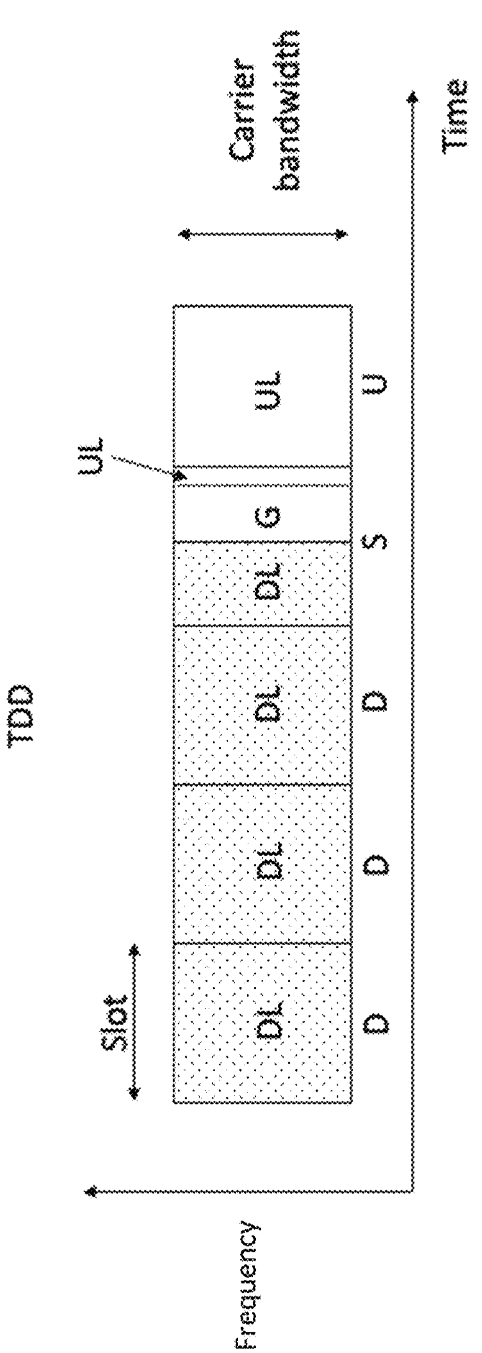

FIG. 7 illustrates a timeline 700 of an example TDD configurations according to embodiments of the present disclosure. For example, timeline 700 of an example TDD configurations can be followed by any of the UEs 111-116 and the BS 102 of FIG. 1. This example is for illustration only and other embodiments can be used without departing from the scope of the present disclosure.

With reference to FIG. 7, a DDDSU UL-DL configuration is shown. Here, D denotes a DL slot, U denotes an UL slot, and S denotes a special or switching slot with a DL part, a flexible part that can also be used as guard period G for DL-to-UL switching, and optionally an UL part.

TDD has a number of advantages over FDD. For example, use of the same band for DL and UL transmissions leads to simpler UE implementation with TDD because a duplexer is not required. Another advantage is that time resources can be flexibly assigned to UL and DL considering an asymmetric ratio of traffic in both directions. DL is typically assigned more time resources in TDD to handle DL-heavy mobile traffic. Another advantage is that CSI can be more easily acquired via channel reciprocity. This reduces an overhead associated with CSI reports especially when there is a large number of antennas.

Although there are advantages of TDD over FDD, there are also disadvantages. A first disadvantage is a smaller coverage of TDD due to the smaller portion of time resources available for transmissions from a UE, while with FDD all time resources can be used. Another disadvantage is latency. In TDD, a timing gap between reception by a UE and transmission from a UE containing the hybrid automatic repeat request acknowledgement (HARQ-ACK) information associated with receptions by the UE is typically larger than that in FDD, for example by several milliseconds. Therefore, the HARQ round trip time in TDD is typically longer than that with FDD, especially when the DL traffic load is high. This causes increased UL user plane latency in TDD and can cause data throughput loss or even HARQ stalling when a PUCCH providing HARQ-ACK information needs to be transmitted with repetitions in order to improve coverage (an alternative in such case is for a network to forgo HARQ-ACK information at least for some transport blocks in the DL).

To address some of the disadvantages for TDD operation, an adaptation of link direction based on physical layer signaling using a DCI format is supported where, with the exception of some symbols in some slots supporting predetermined transmissions such as for SSBs, symbols of a slot can have a flexible direction (UL or DL) that a UE can determine according to scheduling information for transmissions or receptions. A PDCCH can also be used to provide a DCI format, such as a DCI format 2_0 as described in 38.213 [REF3], that can indicate a link direction of some flexible symbols in one or more slots. Nevertheless, in actual deployments, it is difficult for a gNB scheduler to adapt a transmission direction of symbols without coordination with other gNB schedulers in the network (e.g., the network 130). This is because of CLI where, for example, DL receptions in a cell by a UE can experience large interference from UL transmissions in the same or neighboring cells from other UEs.

Figure 8:
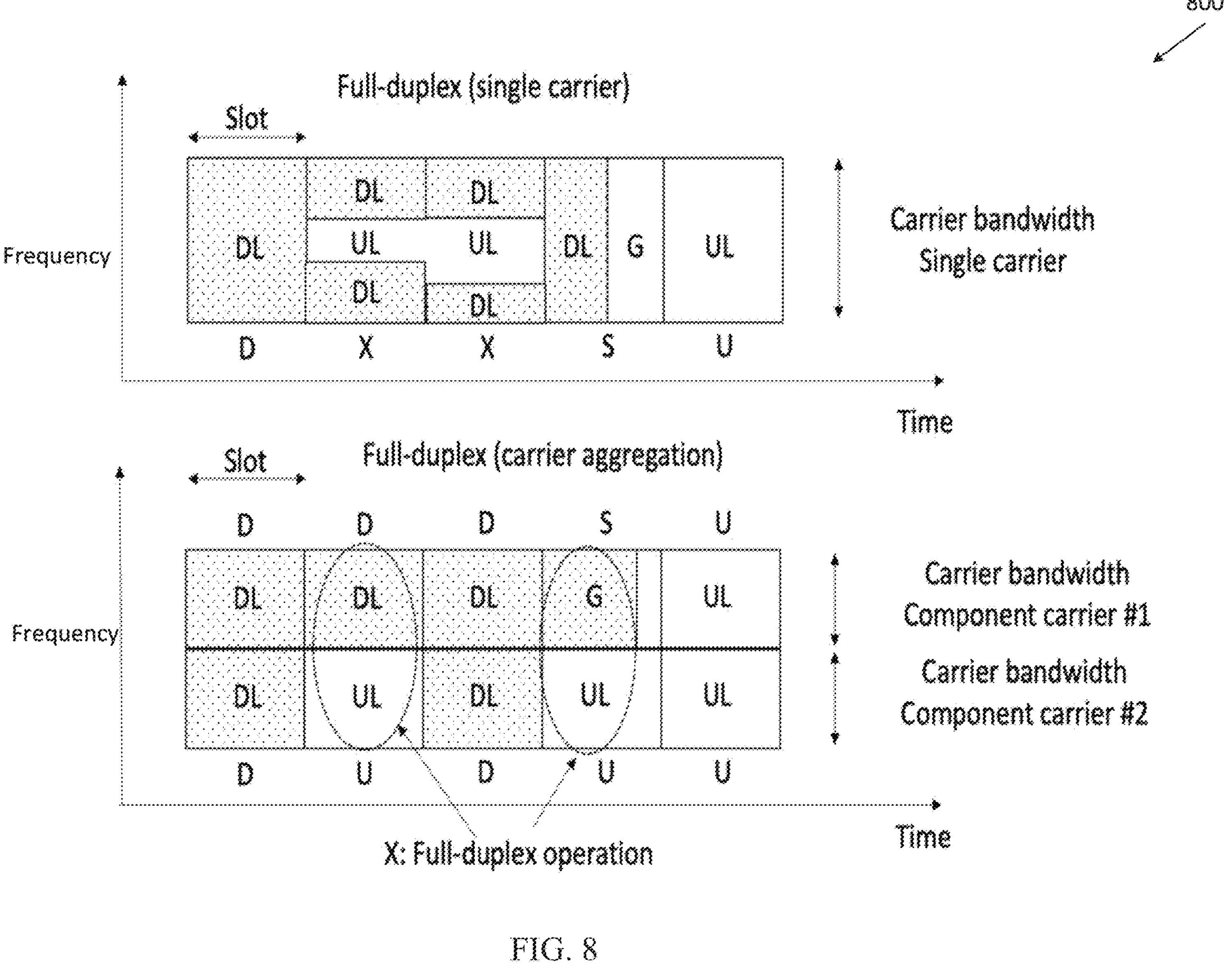
FIG. 8 illustrates timelines of an example full duplex (FD) configurations according to embodiments of the present disclosure.

FIG. 8 illustrates timelines 800 of example FD configurations according to embodiments of the present disclosure. For example, timelines 800 for FD configurations can be followed by the UE 116 and the BS 102 of FIG. 1. This example is for illustration only and other embodiments can be used without departing from the scope of the present disclosure.

Full-duplex (FD) communications offer increased spectral efficiency, improved capacity, and reduced latency in wireless networks. When using FD communications, UL and DL signals are simultaneously received and transmitted on fully or partially overlapping, or adjacent, frequency resources, thereby improving spectral efficiency and reducing latency in user and/or control planes.

There are several options for operating a FD wireless communication system. For example, a single carrier may be used such that transmissions and receptions are scheduled on same time-domain resources, such as symbols or slots. Transmissions and receptions on same symbols or slots may be separated in frequency, for example by being placed in non-overlapping sub-bands. An UL frequency sub-band, in time-domain resources that also include DL frequency sub-bands, may be located in the center of a carrier, or at the edge of the carrier, or at a selected frequency-domain position of the carrier. The allocations of DL sub-bands and UL sub-bands may also partially or even fully overlap. A gNB may simultaneously transmit and receive in time-domain resources using same physical antennas, antenna ports, antenna panels and transmitter-receiver units (TRX). Transmission and reception in FD may also occur using separate physical antennas, ports, panels, or TRXs. Antennas, ports, panels, or TRXs may also be partially reused, or only respective subsets can be active for transmissions and receptions when FD communication is enabled.

When a UE receives signals/channels from a gNB in a full-duplex slot, the receptions may be scheduled in a DL subband of the full-duplex slot. When full-duplex operation at the gNB (e.g., the gNB 102) uses DL slots for scheduling transmissions from the UE using full-duplex transmission and reception at the gNB, there may be one or multiple, such as two, DL subbands in the full-duplex slot. When a UE is scheduled to transmit in a full-duplex slot, the transmission may be scheduled in an UL subband of the full-duplex slot. When full-duplex operation at the gNB uses UL slots for purpose of scheduling transmissions to UEs using full-duplex transmission and reception at the gNB, there may be one or multiple, such as two, UL subbands in the full-duplex slot. Full-duplex operation using an UL subband or a DL subband may be referred to as Subband-Full-Duplex (SBFD).

For example, when full-duplex operation at the gNB uses a DL or F slot or symbol for scheduling transmissions from the UE using full-duplex transmission and reception at the gNB, there may be one DL subband on the full-duplex slot or symbol and one UL subband of the full-duplex slot or symbol in the NR carrier. A frequency-domain configuration of the DL and UL subbands may then be referred to as 'DU' or 'UD', respectively, depending on whether the UL subband is configured/indicated in the upper or the lower part of the NR carrier. In another example, when full-duplex operation at the gNB uses a DL or F slot or symbol for scheduling transmissions from the UE using full-duplex transmission and reception at the gNB, there may be two DL subbands and one UL subband on the full-duplex slot or symbol. A frequency-domain configuration of the DL and UL subbands may then be referred to as 'DUD' when the UL subband is configured/indicated in a part of the NR carrier and the DL subbands are configured/indicated at the edges of the NR carrier, respectively. Similar principles extend to the case where full-duplex operation at the gNB uses U slot(s) or symbol(s). For example, the gNB may configure and/or indicate one or two SBFD DL subband(s) in the U slot/symbol using for example a frequency-domain 'DU', 'UD' or 'DUD' configuration.

In the following, for brevity, full-duplex slots/symbols and SBFD slots/symbols may be jointly referred to as SBFD slots/symbol and non-full-duplex slots/symbols and normal DL or UL slot/symbols may be referred to as non-SBFD slots/symbols.

Instead of using a single carrier, different component carriers (CCs) for receptions and transmissions can be used by a UE. For example, receptions by a UE can occur on a first CC and transmissions by the UE occur on a second CC having a small, including zero, frequency separation from the first CC.

Furthermore, a gNB can operate with FD mode even when a UE still operates in half-duplex mode, such as when the UE can either transmit and receive at a same time, or the UE can also be capable for FD operation.

FD transmission/reception is not limited to gNBs, TRPs, or UEs, but can also be used for other types of wireless nodes such as relay or repeater nodes.

Full duplex operation needs to overcome several challenges in order to be functional in actual deployments. When using overlapping frequency resources, received signals are subject to co-channel CLI and self-interference. CLI and self-interference cancellation methods include passive methods that rely on isolation between transmit and receive antennas, active methods that utilize RF or digital signal processing, and hybrid methods that use a combination of active and passive methods. Filtering and interference cancellation may be implemented in RF, baseband (BB), or in both RF and BB. While mitigating co-channel CLI may require large complexity at a receiver, it is feasible within current technological limits. Another aspect of FD operation is the mitigation of adjacent channel CLI because in several cellular band allocations, different operators have adjacent spectrum.

Throughout the disclosure, the term Full-Duplex (FD) is used as a short form for a full-duplex operation in a wireless system. The terms 'cross-division-duplex' (XDD), 'full duplex' (FD) and 'subband-full-duplex' (SBFD) may be used interchangeably in the disclosure.

FD operation in NR can improve spectral efficiency, link robustness, capacity, and latency of UL transmissions. In an NR TDD system, transmissions from a UE are limited by fewer available transmission opportunities than receptions by the UE. For example, for NR TDD with sub-carrier spacing (SCS)=30 kHz, DDDU (2 msec), DDDSU (2.5 msec), or DDDDDDDSUU (5 msec), the UL-DL configurations allow for an DL:UL ratio from 3:1 to 4:1. Any transmission from the UE can only occur in a limited number of UL slots, for example every 2, 2.5, or 5 msec, respectively.

For a single carrier TDD configuration with FD enabled, slots denoted as X are FD slots. Both DL and UL transmissions can be scheduled in FD slots for at least one or more symbols. The term FD or the term SBFD slot is used to refer to a slot where UEs can simultaneously receive and transmit in at least one or more symbols of the slot if scheduled or assigned radio resources by the base station. A half-duplex UE cannot transmit and receive simultaneously in a FD or SBFD slot or on a FD or SBFD symbol of a FD slot. When a half-duplex UE is configured for transmission in symbols of a FD slot, another UE can be configured for reception in the symbols of the FD slot. A FD UE can transmit and receive simultaneously in symbols of a FD slot in presence of other UEs with resources for either receptions or transmissions in the symbols of the FD slot. Transmissions by a UE in a first FD slot can use same or different frequency-domain resources than in a second FD slot, wherein the resources can differ in bandwidth, a first RB, or a location of the center carrier.

For a carrier aggregation TDD configuration with FD enabled, a UE receives in a slot on CC #1 and transmits in at least one or more symbols of the slot on CC #2. In addition to D slots used only for transmissions/receptions by a gNB/UE, U slots used only for receptions/transmissions by the gNB/UE and S slots that are used for both transmission and receptions by the gNB/UE and also support DL-UL switching. FD slots with both transmissions/receptions by a gNB or a UE that occur on same time-domain resources, such as slots or symbols, are labeled by X. For the example of TDD with SCS=30 kHz, single carrier, and UL-DL allocation DXXSU (2.5 msec), the second and third slots allow for FD operation. Transmissions from a UE can also occur in a last slot (U) where the full UL transmission bandwidth is available. FD slots or symbol assignments over a time period/number of slots can be indicated by a DCI format in a PDCCH reception and can then vary per unit of the time period, or can be indicated by higher layer signaling, such as via a MAC CE or RRC.

Although FIGS. 7-8 illustrates diagrams, various changes may be made to the diagrams 700-800 of FIGS. 7-8. For example, while certain diagrams (such as diagrams 700, 800) describe a certain slot structure, various components combined, further subdivided, or omitted and additional components can be added according to particular needs.

In the following and throughout the disclosure, various embodiments of the disclosure may be also implemented in any type of UE including, for example, UEs with the same, similar, or more capabilities compared to common 5G NR UEs. Although various embodiments of the disclosure discuss 3GPP 5G NR communication systems, the embodiments may apply in general to UEs operating with other RATs and/or standards, such as next releases/generations of 3GPP, IEEE WiFi, and so on.

In the following, unless otherwise explicitly noted, providing a parameter value by higher layers includes providing the parameter value by a system information block (SIB), such as a SIB1, or by a common RRC signaling, or by UE-specific RRC signaling.

In the following, for brevity of description, the higher layer provided TDD UL-DL frame configuration refers to tdd-UL-DL-ConfigurationCommon as example for RRC common configuration and/or tdd-UIL-DL-Configuration-Dedicated as example for UE-specific configuration. The UE determines a common TDD UL-DL frame configuration of a serving cell by receiving a SIB such as a SIB1 when accessing the cell from RRC_IDLE or by RRC signaling when the UE is configured with an SCell or additional secondary cell groups (SCGs) by an IE ServingCellConfig-Common in RRC_CONNECTED. The UE determines a dedicated TDD UL-DL frame configuration using the IE ServingCellConfig when the UE is configured with a serving cell, e.g., add or modify, where the serving cell may be the SpCell or an SCell of a master cell group (MCG) or SCG. A TDD UL-DL frame configuration designates a slot or symbol as one of types 'D', 'U' or 'F' using at least one time-domain pattern with configurable periodicity.

In the following, for brevity of description, slot format indication (SFI) refers to a slot format indicator as example that is indicated using higher layer provided IEs such as slotFormatCombination or slotFormatCombinationsPerCell and which is indicated to the UE by group common DCI format such as DCI F2_0 where slotFormats are defined in REF3.

In the following, for brevity of description, the parameter/IE 'fd-config' is used to describe the configuration and parameterization for UE determination of receptions and/or transmissions in a serving cell supporting full-duplex operation. For example, the UE may be provided with the set of RBs or set of symbols of a SBFD UL or DL subband. It is not necessary that the use of full-duplex operation by a gNB in the serving cell when scheduling to a UE receptions and/or transmissions in a slot or symbol is identifiable by or known to the UE. For example, parameters associated with the parameter 'fd-config' may include a set of time-domain resources, e.g., symbols/slots, where receptions or transmissions by the UE are allowed or disallowed; a range or a set of frequency-domain resources, e.g., serving cells, BWPs, start and/or end or a set of RBs, where receptions or transmissions by the UE are allowed or disallowed; one or multiple guard intervals for time and/or frequency domain radio resources during receptions or transmissions by the UE, e.g., guard SCs or RBs, guard symbols; one or multiple resource types, e.g., 'simultaneous Tx-Rx', 'Rx only', or 'Tx only' or 'D', 'U', 'F', 'N/A'; one or multiple scheduling behaviors, e.g., "DG only", "CG only", "any". Configuration and/or parameters associated with the fd-config may include indications or values to determine Tx power settings of receptions by the UE, such as, reference power, energy per resource element (EPRE), or power offset of a designated channel/or signal type transmitted by a serving gNB; to determine the power and/or spatial settings for transmissions by the UE. Configuration and/or parameters associated with the fd-config may be provided to the UE using higher layer signaling, DCI-based signaling, and/or MAC CE based signaling. For example, configuration and/or parameters associated with fd-config may be provided to the UE by means of common RRC signaling using SIB or by UE-dedicated RRC signaling such as ServingCellConfig. For example, configuration and/or parameters associated with fd-config may be provided to the UE using an RRC-configured time domain resource allocation (TDRA) table, or a PDCCH, PDSCH, PUCCH or PUSCH configuration, and/or DCI-based signaling that indicates to the UE a configuration for the UE to apply.

When considering MIMO and beamforming operation in a full-duplex wireless communication system, several issues related to limitations and drawbacks of existing technology need to be overcome. A first issue relates to the need for the UE to efficiently support separate gNB antenna configurations in a non-full-duplex slot or symbol and in a full-duplex slot or symbol.

It needs to be considered that for transmissions by a gNB in a full-duplex system, a different number of transmitter/receiver antennas, a different effective transmitter antenna aperture area, and/or different transmitter antenna directivity settings may be available for gNB transmissions in a normal DL slot or symbol, i.e., non-SBFD slot or symbol, when compared to gNB transmissions in a SBFD slot or symbol. Similar considerations may apply to gNB receptions in a normal UL slot or symbol when compared to gNB receptions in the UL sub-band of a SBFD slot. The EPRE settings for gNB transmissions in a SBFD slot or symbol with full-duplex operation may be constrained to prevent gNB-side receiver automatic gain control (AGC) blocking and to enable effective implementation of serial interference cancellation (SIC) during gNB receptions in the UL subband of the SBFD slot or symbol when comparted to the EPRE settings of gNB transmissions in the normal DL slot. Therefore, the gNB (e.g., the gNB 102) transmission power budget and, correspondingly, the received signal strength available for the UE receiver may not be same for a signal/channel being transmitted by the gNB on a non-SBFD slot/symbol when compared to transmission by the gNB of a same signal/channel on a SBFD slot/symbol. Similar observations hold when full-duplex transmission and reception by a gNB antenna based on multiple antenna panels is implemented. Then, QCL and transmit timing aspects may vary between different panels, and transmissions or receptions from/by the gNB may be subjected to different link gains depending on the antenna panel used for a transmission or reception instance.

Furthermore, interference levels experienced by the UE receiver may differ between receptions in a normal DL slot or symbol and receptions in a SBFD slot or symbol. During receptions in a normal DL slot, the UE receiver may be interfered by co-channel transmissions from neighbor gNBs. During receptions in a SBFD slot or symbol, the UE receiver may be subjected to UE-to-UE inter-subband co-channel and/or UE-to-UE adjacent channel cross-link interference (CLI) stemming from UL-to-DL transmissions in the SBFD slot or symbol. Therefore, the resulting interference power levels and their variation experienced by the UE receiver may not be same for reception of signal/channels on non-SBFD slot/symbol when compared to reception of a signal/channel on a SBFD slot/symbol.

In consequence, embodiments of the present disclosure recognize need arises to configure and operate the SBFD-aware UE with MIMO and beamforming transmission and reception settings which are adopted and adjusted to the available gNB-side SBFD antenna configuration on a symbol/slot.

As mentioned herein, when a UE is configured with full duplex, the flexible slots (e.g., SBFD slots) can be used for DL transmissions from the gNB to the UE, as well as for uplink transmissions from the UE to gNB, while the normal uplink and normal downlink slots (also referred to as uplink and downlink slots) are used for uplink (UL) and downlink (DL) transmissions, respectively. This is illustrated in FIG. 8. The antenna configuration used for flexible slots can be different from the antenna configuration used for normal UL and DL slots.

When the gNB is transmitting and the UE is receiving in a SBFD slot a first DL or joint beam is used.

When the gNB is transmitting and the UE is receiving in a DL slot a second DL or joint beam is used.

When the UE is transmitting and the gNB is receiving in a SBFD slot a first UL or joint beam is used.

When the UE is transmitting and the gNB is receiving in an UL slot a second UL or joint beam is used.

A beam can be determined based on TCI state that establishes a quasi-co-location (e.g., TypeD quasi-co-location) or spatial relation between a source reference signal and a target reference signal. For example, the source reference signal can be a reference signal used to determine a spatial filter or QCL for the beam, and the target reference signal is that of the channel or signal being received or transmitted.

In Rel-17 a unified or master or main or indicated TCI state is signaled to the UE to indicate a beam for the UE to use. RRC signaling configures Rel-17 TCI states wherein TCI state can be configured as DL or Joint TCI state using information element (DLorJoint-TCIState), or UL TCI state using information element (UL-TCIState). MAC signaling can activate one or more TCI codepoints. When one TCI state codepoint is activated by MAC CE, the UE applies the TCI state(s) associated with the activated codepoint after a beam application time. When more than one TCI codepoints are activated by MAC CE, further DCI signaling is used to indicate a TCI state codepoint to the UE. The unified TCI state can be signaled by a DCI Format (e.g., DL related DCI Format (e.g., DCI Format 1_1 or DCI Format 1_2) with a DL assignment or a DL related DCI Format (e.g., DCI Format 1_1 or DCI Format 1_2) without a DL assignment. A joint TCI state can be used for DL channels or signals and for UL channels or signals. Alternatively, separate TCI states can be used, wherein a DL TCI state is used for DL channels or signals and an UL TCI state for UL channels or signals.

When a UE is configured for full duplex, two beams can be indicated for DL channels or signals and/or for UL channels or signals. In this disclosure we present solutions for beam indication signaling for full duplex operation.

The present disclosure relates to a 5G/NR communication system.

This disclosure considers design aspects related to beam indication signaling for full duplex systems, where different beams can be used in SBFD slots and in normal UL or DL slots.

- In one example, a TCI state includes at least two reference signals as QCL TypeD or as spatial relation reference signals. A TCI state can be a joint TCI state, or a DL TCI state or an UL TCI state. A MAC CE activates a set of codepoints (e.g., 8 codepoints), wherein a codepoint can include a DL TCI state, an UL TCI state, a joint TCI state or a pair of DL and UL TCI states. A UE is indicated a TCI state codepoint.
- In one example, a TCI state includes one reference signal as QCL TypeD or as spatial relation reference signal. A TCI state can be a joint TCI state, or a DL TCI state or an UL TCI state. A MAC CE activates a set of codepoints (e.g., 8 codepoints), wherein a codepoint can include DL TCI state(s) and/or UL TCI state(s) and/or joint TCI(s) for SBFD slots and/or for normal UL/DL slots. A UE is indicated a TCI state codepoint.
- In one example, a TCI state includes one reference signal as QCL TypeD or as spatial relation reference signal. A TCI state can be a joint TCI state, or a DL TCI state or an UL TCI state. A MAC CE activates a set of codepoints (e.g., 8 codepoints), wherein a codepoint can include a DL TCI state, an UL TCI state, a joint TCI state or a pair of DL and UL TCI states. A UE is indicated a first codepoint for SBFD slots and a second codepoint for normal UL and DL slots.
- In one example, a TCI state includes one reference signal as QCL TypeD or as spatial relation reference signal. A TCI state can be a joint TCI state, or a DL TCI state or an UL TCI state. A MAC CE activates a set of codepoints (e.g., 8 codepoints), wherein a codepoint can include a DL TCI state, an UL TCI state, a joint TCI state or a pair of DL and UL TCI states. A UE is indicated a TCI state codepoint, wherein the codepoint is from the first set of codepoints for SBFD slots and the codepoint is from the second set of codepoints for normal UL and DL slots.

Aspects, features, and advantages of the present disclosure are readily apparent from the following detailed description, simply by illustrating a number of particular embodiments and implementations, including the best mode contemplated for carrying out the present disclosure. The present disclosure is also capable of other and different embodiments, and its several details can be modified in various obvious respects, all without departing from the spirit and scope of the present disclosure. Accordingly, the drawings and description are to be regarded as illustrative in nature, and not as restrictive. The present disclosure is illustrated by way of example, and not by way of limitation, in the figures of the accompanying drawings.

In the following, both FDD and TDD are considered as a duplex method for DL and UL signaling.

Although exemplary descriptions and embodiments to follow expect orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

This disclosure considers several components that can be used in conjunction or in combination with one another, or can operate as standalone schemes.

In the present disclosure, the term "activation" describes an operation wherein a UE receives and decodes a signal from the network (or gNB) that signifies a starting point in time. The starting point can be a present or a future slot/subframe or symbol and the exact location is either implicitly or explicitly indicated, or is otherwise specified in the system operation or is configured by higher layers. Upon successfully decoding the signal, the UE responds according to an indication provided by the signal. The term "deactivation" describes an operation wherein a UE receives and decodes a signal from the network (or gNB) that signifies a stopping point in time. The stopping point can be a present or a future slot/subframe or symbol and the exact location is either implicitly or explicitly indicated, or is otherwise specified in the system operation or is configured by higher layers. Upon successfully decoding the signal, the UE responds according to an indication provided by the signal.

Terminology such as TCI, TCI states, SpatialRelationInfo, target RS, reference RS, and other terms is used for illustrative purposes and is therefore not normative. Other terms that refer to same functions can also be used.

A "reference RS" corresponds to a set of characteristics of a DL beam or an UL TX beam, such as a direction, a precoding/beamforming, a number of ports, and so on.

In the following components, a TCI state is used for beam indication. It can refer to a DL TCI state for downlink channels (e.g., PDCCH and PDSCH), an uplink TCI state for uplink channels (e.g., PUSCH or PUCCH), a joint TCI state for downlink and uplink channels, or separate TCI states for uplink and downlink channels. A TCI state can be common across multiple component carriers or can be a separate TCI state for a component carrier or a set of component carriers. A TCI state can be gNB or UE panel specific or common across panels. In some examples, the uplink TCI state can be replaced by SRS resource indicator (SRI).

Figure 9:
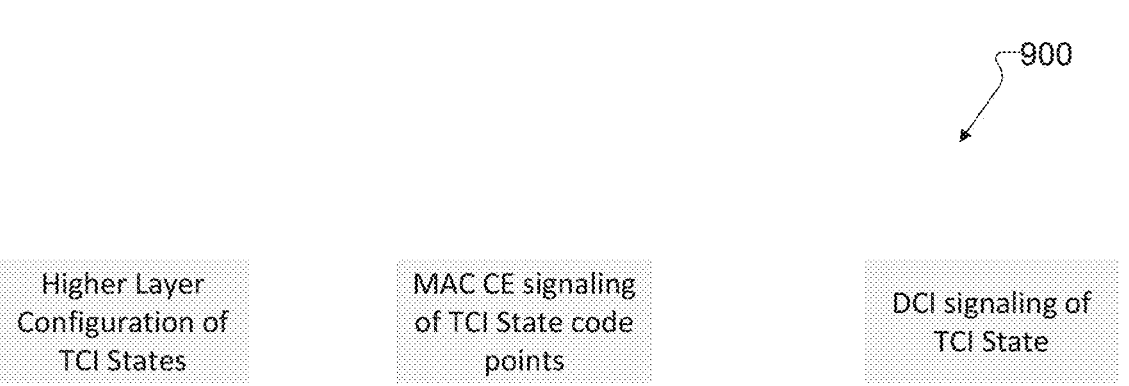
FIG. 9 illustrates a diagram of example higher level signaling according to embodiments of the present disclosure.

FIG. 9 illustrates a diagram of an example higher level signaling 900 according to embodiments of the present disclosure. For example, higher level signaling 900 can be received by the UE 116 of FIG. 3. This example is for illustration only and other embodiments can be used without departing from the scope of the present disclosure.

In the following examples, as illustrated in FIG. 9, a UE (e.g., the UE 116) is configured/updated through higher layer RRC signaling a set of TCI States with N elements. In one example, DL and joint TCI states are configured by higher layer parameter DLorJoint-TCIState, wherein, the number of DL and Joint TCI state is $N_{DJ}$. UL TCI state are configured by higher layer parameter (IL-TCIState, wherein the number of UL TCI state is $N_U$. $N=N_{DJ}+N_U$. The DLorJoint-TCIState can include DL or Joint TCI states that belong to a serving cell, e.g., the source RS of the TCI state is associated with the serving cell (the PCI of the serving cell). Additionally, the DL or Joint TCI states can be associated with a cell having a PCI different from the PCI of the serving cell, e.g., the source RS of the TCI state is associated with a cell having a PCI different from the PCI of the serving cell. The UIL-TCIState can include UL TCI states that belong to a serving cell, e.g., the source RS of the TCI state is associated with the serving cell (the PCI of the serving cell). Additionally, the UL TCI states can be associated with a cell having a PCI different from the PCI of the serving cell, e.g., the source RS of the TCI state is associated with a cell having a PCI different from the PCI of the serving cell.

MAC CE signaling includes a subset of M (M≤N) TCI states or TCI state code points from the set of N TCI states, wherein a code point is signaled in the "transmission configuration indication" field of a DCI used for indication of the TCI state. A codepoint can include one TCI state (e.g., DL TCI state or UL TCI state or Joint (DL and UL) TCI state). Alternatively, a codepoint can include two TCI states (e.g., a DL TCI state and an UL TCI state). L1 control signaling (i.e., Downlink Control Information (DCI)) updates the UE's TCI state, wherein the DCI includes a "transmission configuration indication" (beam indication) field e.g., with m bits (such that $M\leq 2^m$), the TCI state corresponds to a code point signaled by MAC CE. A DCI used for indication of the TCI state can be DL related DCI Format (e.g., DCI Format 1_1 or DCI Format 1_2), with a DL assignment or without a DL assignment.

Figure 10:
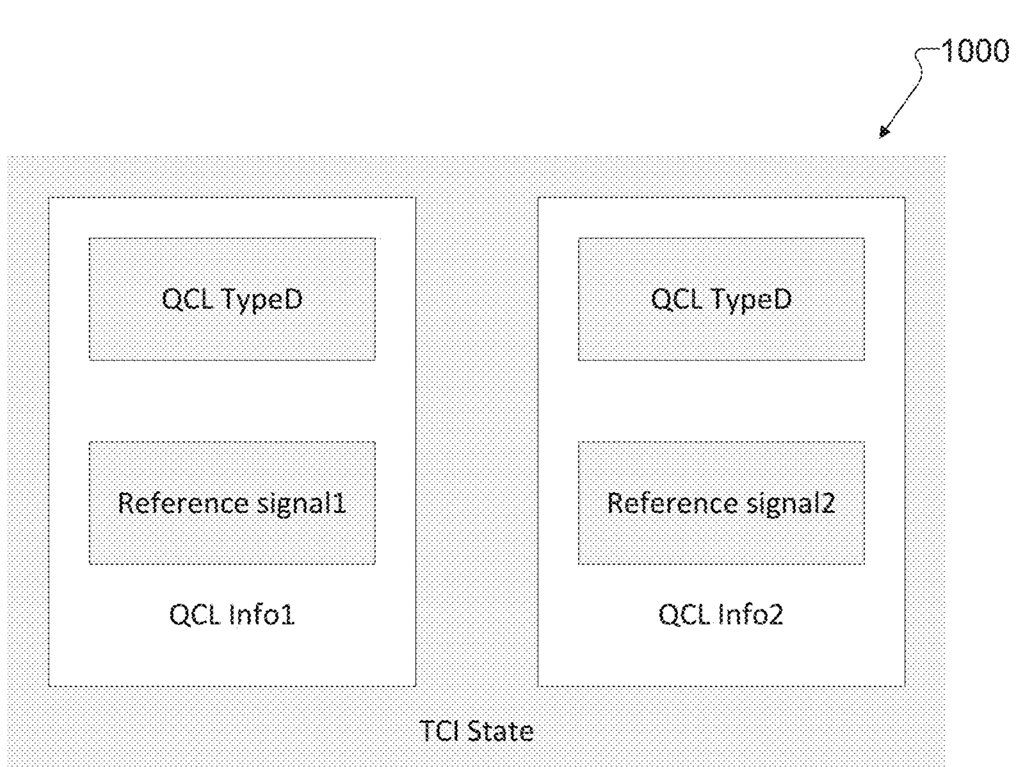
FIG. 10 illustrates a diagram of an example transmission configuration indication (TCI) state according to embodiments of the present disclosure.

FIG. 10 illustrates a diagram of an example TCI state 1000 according to embodiments of the present disclosure. For example, TCI state 1000 may be utilized by any of the UEs 111-116 of FIG. 1. This example is for illustration only and other embodiments can be used without departing from the scope of the present disclosure.

Figure 11:
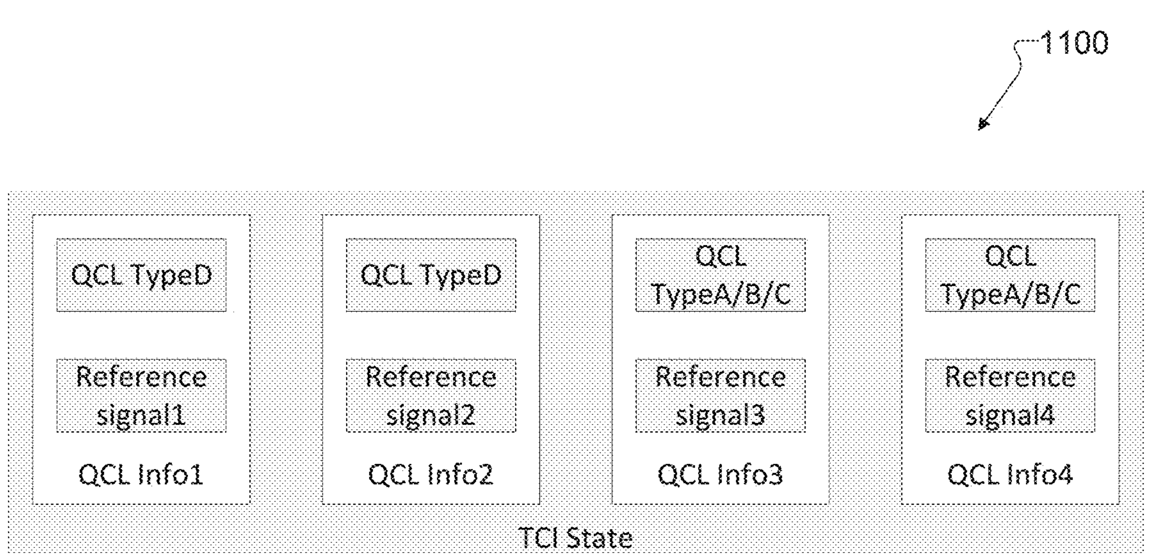
FIG. 11 illustrates a diagram of an example TCI state according to embodiments of the present disclosure.

FIG. 11 illustrates a diagram of an example TCI state 1100 according to embodiments of the present disclosure. For example, TCI state 1100 may be implemented by the UE 116 of FIG. 3. This example is for illustration only and other embodiments can be used without departing from the scope of the present disclosure.

The TCI states can be associated, through a QCL relation, with an SSB or reference signal of serving cell, or an SSB or reference signal associated with a PCI different from the PCI of the serving cell. The QCL relation with a SSB can be a direct QCL relation, wherein the source RS (e.g., for a QCL Type D relation or a spatial relation) of the QCL state is the SSB. The QCL relation with a SSB can be an indirect QCL relation, wherein, the source RS (e.g., for a QCL Type D relation or a spatial relation) can be a reference signal. The reference signal has the SSB as its source (e.g., for a QCL Type D relation or a spatial relation). The indirect QCL relation to an SSB can involve a QCL or spatial relation chain of more than one reference signal.

In one example, as illustrated in FIG. 10 and FIG. 11, a TCI state includes:

- A first QCL Info of QCL TypeD, wherein the first QCL info includes a first reference signal.
- A second QCL Info of QCL TypeD, wherein the second QCL info includes a second reference signal.

In one example, the first QCL Info of QCL Type D is used for SBFD slots and the second QCL Info of QCL Type D is used for normal UL and/or DL slots.

In one example, the first QCL Info of QCL Type D is used for normal UL and/or DL slots and the second QCL Info of QCL Type D is used for SBFD slots.

In one example, if the TCI state is not configured a second QCL Info of QCL TypeD, the first QCL Info of QCL Type D is used for SBFD slots and for UL and/or DL slots.

Figure 12:
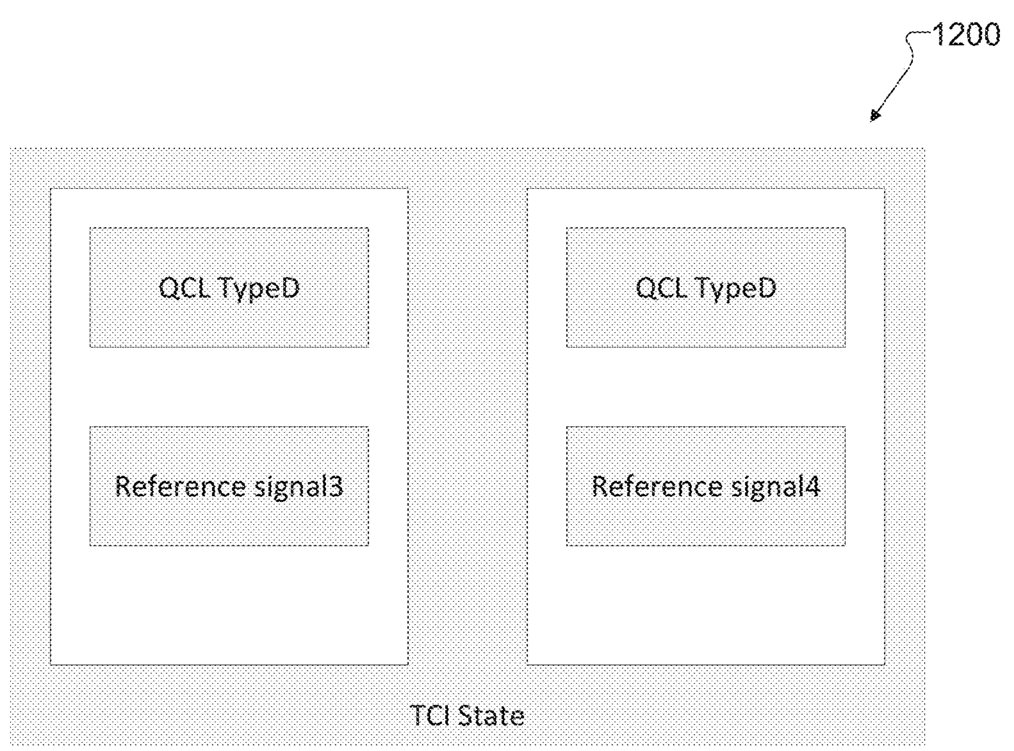
FIG. 12 illustrates a diagram of an example TCI state according to embodiments of the present disclosure.

FIG. 12 illustrates a diagram of an example TCI state 1200 according to embodiments of the present disclosure. For example, TCI state 1200 may be utilized by the UE 111 of FIG. 1. This example is for illustration only and other embodiments can be used without departing from the scope of the present disclosure.

In one example, as illustrated in FIG. 11 and FIG. 12, a TCI state includes

- A third QCL Info of QCL TypeA or TypeB or TypeC, wherein the third QCL info includes a third reference signal.
- A fourth QCL Info of QCL TypeA or TypeB or TypeC, wherein the fourth QCL info includes a fourth reference signal.

In one example, the third QCL Info of QCL TypeA or TypeB or TypeC is used for SBFD slots and the fourth QCL Info of QCL TypeA or TypeB or TypeC is used for normal UL and/or DL slots.

In one example, the third QCL Info of QCL TypeA or TypeB or TypeC is used for normal UL and/or DL slots and the fourth QCL Info of QCL TypeA or TypeB or TypeC is used for SBFD slots.

In one example, if the TCI state is not configured a fourth QCL Info of QCL TypeA or TypeB or TypeC, the third QCL Info of QCL TypeA or TypeB or TypeC is used for SBFD slots and for UL and/or DL slots.

In one example, a TCI state can be configured with one of the following:

- Two QCL info of QCL TypeD and two QCL info of QCL Type A or TypeB or TypeC.
- One QCL info of QCL TypeD and one QCL info of QCL Type A or TypeB or TypeC In one example, a TCI state configured for a normal UL and/or DL slot restricts and limits the allowed TCI state which can be configured on a SBFD slot. A restriction or limitation allowed TCI state(s) on a SBFD slot can apply to a SBFD DL subband or to a SBFD UL subband. For example, when the second QCL Info of QCL Type D is used for normal UL and/or DL slots, then a first QCL Info is restricted or limited to QCL Type D for SBFD slots or a DL subband or an UL subband of a SBFD slot.

In one example, a TCI state configured for a SBFD slot or a SBFD DL subband or to a SBFD UL subband in a SBFD slot restricts and limits the allowed TCI state which can be configured on a normal UL and/or DL slot. For example, when the first QCL Info of QCL Type D is used for a SBFD slot, then a second QCL Info is restricted or limited to QCL Type D for a normal UL and/or DL slot.

In one example, a TCI state includes:

A first includes a first reference signal.

A second reference signal.

In one example, the first reference signal is used for SBFD slots, and the second reference signal is used for normal UL and/or DL slots.

In one example, the first reference signal is used for normal UL and/or DL slots and the second reference signal is used for SBFD slots.

In one example, if the TCI state is not configured a second reference signal, the first reference signal is used for SBFD slots and for UL and/or DL slots.

In one example, a TCI state includes:

A first pathlossReferenceRS-Id.

A second pathlossReferenceRS-Id.

In one example, the first pathlossReferenceRS-Id is used for SBFD slots, and the second pathlossReferenceRS-Id is used for normal UL slots.

In one example, the first pathlossReferenceRS-Id is used for normal UL slots and the second pathlossReferenceRS-Id is used for SBFD slots.

In one example, if the TCI state is not configured a second pathlossReferenceRS-Id, the first pathlossReferenceRS-Id is used for SBFD slots and for UL and/or DL slots.

In one example, a TCI state includes one pathlossReferenceRS-Id, wherein the pathlossReferenceRS-Id is used for SBFD slots and for UL slots.

In one example, a TCI state includes:

A first ul-powerControl.

A second ul-powerControl.

In one example, the first ul-powerControl is used for SBFD slots and the second ul-powerControl is used for normal UL slots.

In one example, the first ul-powerControl is used for normal UL slots and the second ul-powerControl is used for SBFD slots.

In one example, if the TCI state is not configured a second ul-powerControl, the first ul-powerControl is used for SBFD slots and for UL and/or DL slots.

In one example, a TCI state includes one ul-powerControl, wherein the ul-powerControl is used for SBFD slots and for UL slots.

In a variant of the previous examples, if N antenna configurations are used, a TCI state can be configured to include one or more of the following:

Up to N QCL Info of TypeD.

Up to N QCL Info of TypeA or TypeB or TypeC.

Up to N reference signal.

Up to N pathlossReferenceRS-Id

Up to N ul-powerControl.

In one example, a TCI state can be a DL or Joint TCI state, for example, configured in DLorJoint-TCIState.

In one example, a TCI sate can be an UL TCI state, for example, configured in UL-TCIState.

In one example, a MAC CE activates a sets of codepoints (for example, 8 codepoints).

In one example, separate beam indication is used for SBFD slots and for normal UL and/or DL slots, a codepoint can include one of:

A DL TCI state from the list: DLorJoint-TCIState.

An UL TCI state from the list: UL-TCIState.

A pair of DL TCI state and UL TCI state from the lists DLorJoint-TCIState and UL-TCIState respectively.

In one example, joint beam indication is used for SBFD slots and for normal UL and/or DL slots, a codepoint can include a joint TCI state from the list: DLorJoint-TCIState.

In one example, separate beam indication is used for SBFD slots and joint beam indication is used for normal UL and/or DL slots, a codepoint can include one of:

A DL or Joint TCI state from the list: DLorJoint-TCIState.

An UL TCI state from the list: UL-TCIState.

A pair of DL or Joint TCI state and UL TCI state from the lists DLorJoint-TCIState and UL-TCIState respectively.

A UE can determine a DL TCI state for a SBFD slot using the DL or Joint TCI state from the list: DLorJoint-TCIState. A UE can determine an UL TCI state for a SBFD slot using the UL TCI state from the list: UL-TCIState. A UE can determine a Joint TCI state for an UL and/or DL slot using the DL or Joint TCI state from the list: DLorJoint-TCIState.

In one example, joint beam indication is used for SBFD slots and separate beam indication is used for normal UL and/or DL slots, a codepoint can include one of:

A DL or Joint TCI state from the list: DLor Joint-TCIState.

An UL TCI state from the list: UL-TCIState.

A pair of DL or Joint TCI state and UL TCI state from the lists DLor Joint-TCIState and UL-TCIState respectively.

A UE can determine a DL TCI state for a DL slot using the DL or Joint TCI state from the list: DLorJoint-TCIState. A UE can determine an UL TCI state for an UL slot using the UL TCI state from the list: UL-TCIState. A UE can determine a Joint TCI state for a SBFD slot using the DL or Joint TCI state from the list: DLorJoint-TCIState.

Figure 13:
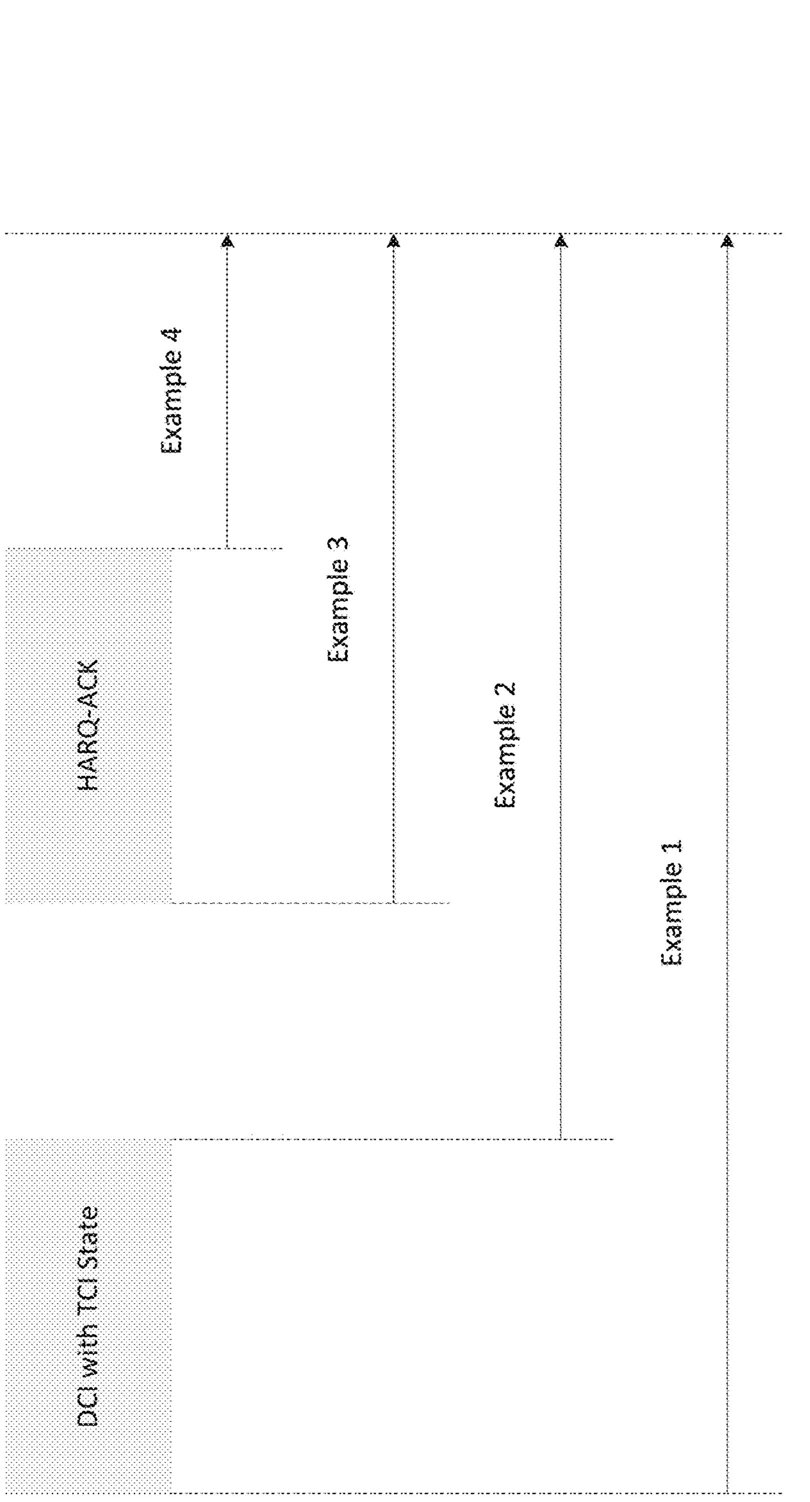
FIG. 13 illustrates a diagram of example beam application time configurations according to embodiments of the present disclosure.

FIG. 13 illustrates a diagram of example beam application time configurations 1300 according to embodiments of the present disclosure. For example, beam application time configurations 1300 can be utilized by any of the UEs 111-116 of FIG. 1. This example is for illustration only and other embodiments can be used without departing from the scope of the present disclosure.

In one example a UE is indicated a TCI state code point in a DCI Format (e.g., DCI Format 1_1 or DCI Format 1_2), wherein the DCI Format may have a DL assignment, or the DCI Format may not have a DL assignment. In one example, a HARQ-ACK is transmitted in response to the DCI Format. In one example, when the HARQ-ACK includes a positive acknowledgment, the beam (e.g., spatial domain filter) is updated based on the TCI state code point in the DCI Format. In one example, when the HARQ-ACK includes a positive acknowledgment or a negative acknowledgment, the beam (e.g., spatial domain filter) is updated based on the TCI state code point in the DCI Format. In one example, the beam is updated at a start of a slot after a beam application time, wherein the beam application time is measured from one of (as illustrated in FIG. 13):

The start of channel (e.g., PDCCH) conveying the TCI state code point (Example 1 of FIG. 13).

The end of channel (e.g., PDCCH) conveying the TCI state code point (Example 2 of FIG. 13).

The start of channel (e.g., PUCCH or PUSCH) conveying the acknowledgment of the channel conveying the TCI state code point (Example 3 of FIG. 13).

The end of channel (e.g., PUCCH or PUSCH) conveying the acknowledgment of the channel conveying the TCI state code point (Example 4 of FIG. 13).

In one example, a beam application time is common (e.g., the same) for SBFD slots and for normal UL and/or DL slots.

In one example, a first beam application time is used for SBFD slots, and a second beam application time is used for UL and/or DL slots.

In one example, the beam application time is configured and/or updated by RRC signaling and/or MAC CE signaling and/or L1 control signaling.

In one example, the beam application time is determined based on the smallest sub-carrier spacings among the carriers to which the beam is being applied.

In one example, the slot boundary at which the beam update occurs is determined based on the smallest sub-carrier spacings among the carriers to which the beam is being applied.

In one example, the beam application time is counted over normal UL and DL slots/symbols.

In one example, the beam application time is counted over SBFD slots/symbols.

In one example, the beam application time is counted over SBFD slots/symbols and normal UL and DL slots/symbols.

In one example, the new beam is applied at a slot boundary of a normal UL/DL slot.

In one example, the new beam is applied at a slot boundary of a normal UL/DL symbol.

In one example, in case of separate beam indication, a TCI state indicates a codepoint with DL TCI state for a SBFD slot or an UL and/or DL slot. The DL beam (e.g., DL spatial domain filter) is updated after the beam application time as illustrated in FIG. 13. The UL beam (e.g., UL spatial domain filter) remains unchanged.

In one example, in case of separate beam indication, a TCI state indicates a codepoint with UL TCI state for a SBFD slot or an UL and/or DL slot. The UL beam (e.g., UL spatial domain filter) is updated after the beam application time as illustrated in FIG. 13. The DL beam (e.g., DL spatial domain filter) remains unchanged.

In one example, in case of separate beam indication, a TCI state indicates a codepoint with a pair of DL TCI state and UL TCI state for a SBFD slot or an UL and/or DL slot. The DL beam (e.g., DL spatial domain filter) and the UL beam (e.g., UL spatial domain filter) are updated after the beam application time as illustrated in FIG. 13.

In one example, in case of joint beam indication, a TCI state indicates a codepoint with a joint TCI state for a SBFD slot or an UL and/or DL slot. The DL beam (e.g., DL spatial domain filter) and the UL beam (e.g., UL spatial domain filter) are updated after the beam application time as illustrated in FIG. 13.

In one example, a TCI state can be a DL or a Joint TCI state, e.g., a TCI state from a list of a TCI states configured by DLorJoint-TCIState, wherein a TCI state can include one or more of the following fields:

- TCI state ID
- First QCL Info, e.g., with QCL TypeA or TypeB or TypeC.
- Second QCL Info, e.g., with QCL TypeD.
- additionalPCI
- pathlossReferenceRS-Id
- ul-powerControl wherein, the QCL Info can include one or more of the following fields:

- Cell index (e.g., serving cell index)
- Bwp-id
- referenceSignal (e.g., NZP CSI RS resource ID or SSB index)
- QCL Type, wherein the QCL type can TypeA or TypeB or TypeC or TypeD.

In one example, a DL or Joint TCI state configured by DLorJoint-TCIState, can be used for SBFD slots.

In one example, a DL or Joint TCI state configured by DLorJoint-TCIState, can be used for UL and/or DL slots.

In one example, a common list of DL or Joint TCI states may be configured for SBFD slots and for UL and/or DL slots.

In one example, two lists of DL or Joint TCI states (e.g., using first DLorJoint-TCIState and second DLorJoint-TCIState) may be configured, wherein

- A first list of DL or Joint TCI states may be configured for SBFD slots.
- A second list of DL or Joint TCI states may be configured for UL and/or DL slots.

In one example, a TCI state can be an UL TCI state, e.g., a TCI state from a list of a TCI states configured by UL-TCIState, wherein a TCI state can include one or more of the following fields:

- UL TCI state ID.
- Cell index (e.g., serving cell index).
- Bwp-id.
- referenceSignal (e.g., NZP CSI RS resource ID or SSB index or SRS resource ID).
- additionalPCI
- pathlossReferenceRS-Id
- ul-powerControl In one example, an UL TCI state configured by UL-TCIState, can be used for SBFD slots.

In one example, an UL TCI state configured by UL-TCIState, can be used for UL slots.

In one example, a common list of UL states may be configured for SBFD slots and for UL slots.

In one example, two lists of UL TCI states (e.g., using first UL-TCIState and second UL-TCIState) may be configured, wherein

- A first list of UL TCI states may be configured for SBFD slots.
- A second list of UL TCI states may be configured for UL slots.

In one example, a MAC CE activates a set of codepoints (for example 8 codepoints), wherein a codepoint can include one or more DL TCI states and/or UL TCI states and/or Joint TCI states. For example, a codepoint can include TCI states according to one or more of the combinations (other combinations are not precluded) given by TABLE 1.

TABLE 1

Example of TCI state codepoint content

| | Contents of Codepoint | Use case |
|---|---|---|
| Codepoint example 1 | Joint TCI state, wherein:<br>Example 1a: the Joint TCI state is used for SBFD slots and for UL and/or DL slots. | Joint beam indication for SBFD slots and for UL and/or DL slots |

TABLE 1-continued

| Example of TCI state codepoint content | | |
|---|---|---|
| | Contents of Codepoint | Use case |
| | Example 1b: the Joint TCI state is used for SBFD slots.<br>Example 1c: the Joint TCI state is used for UL and/or DL slots. | |
| Codepoint example 2 | First Joint TCI state, wherein the first Joint TCI state is used for SBFD slots<br>Second Joint TCI state, wherein the second Joint TCI state is used for UL and/or DL slots. | Joint beam indication for SBFD slots and for UL and/or DL slots |
| Codepoint example 3 | DL TCI state, wherein:<br>Example 3a: the DL TCI state is used for SBFD slots and for DL slots.<br>Example 3b: the DL TCI state is used for SBFD slots.<br>Example 3c: the DL TCI state is used for SBFD slots. | Separate beam indication for SBFD slots and for UL and/or DL slots |
| Codepoint example 4 | First DL TCI state, wherein the first DL TCI state is used for SBFD slots.<br>Second DL TCI state, wherein the second DL TCI state is used for DL slots. | Separate beam indication for SBFD slots and for UL and/or DL slots |
| Codepoint example 5 | UL TCI state, wherein:<br>Example 5a: the UL TCI state is used for SBFD slots and for UL slots.<br>Example 5b: the UL TCI state is used for SBFD slots.<br>Example 5c: the UL TCI state is used for UL slots. | Separate beam indication for SBFD slots and for UL and/or DL slots |
| Codepoint example 6 | First UL TCI state, wherein the first UL TCI state is used for SBFD slots.<br>Second UL TCI state, wherein the second UL TCI state is used for UL slots. | Separate beam indication for SBFD slots and for UL and/or DL slots |
| Codepoint example 7 | A pair of DL TCI state and UL TCI state, wherein:<br>Example 7a: the DL TCI state and UL TCI state are used for SBFD slots and for UL and/or DL slots.<br>Example 7b: the DL TCI state and UL TCI state are used for SBFD slots.<br>Example 7c: the DL TCI state and UL TCI state are used for UL and/or DL slots.<br>Example 7d: the DL TCI state is used for SBFD slots and UL TCI state is used for SBFD slots and for UL slots.<br>Example 7e: the DL TCI state is used for SBFD slots and UL TCI state is used for UL slots.<br>Example 7f: the DL TCI state is used for DL slots and UL TCI state is used for SBFD slots and for UL slots.<br>Example 7g: the DL TCI state is used for DL slots and UL TCI state is used for UL slots.<br>Example 7h: the DL TCI state is used for SBFD slots and for DL slots and UL TCI state is used for SBFD slots.<br>Example 7i: the DL TCI state is used for SBFD slots and for DL slots and UL TCI state is used for UL slots. | Separate beam indication for SBFD slots and for UL and/or DL slots |
| Codepoint example 8 | A first pair of DL TCI state and UL TCI state, wherein the first DL TCI state and the first UL TCI state are used for SBFD slots.<br>A second DL TCI state and UL TCI state, wherein the second DL TCI state and the second UL TCI state are used for UL and/or DL slots. | Separate beam indication for SBFD slots and for UL and/or DL slots |
| Codepoint example 9 | DL TCI state, wherein:<br>Example 9a: the DL TCI state is used for SBFD slots and for DL slots.<br>Example 9b: the DL TCI state is used for SBFD slots.<br>Example 9c: the DL TCI state is used for DL slots.<br>First UL TCI state, wherein the first UL TCI state is used for SBFD slots.<br>Second UL TCI state, wherein the second UL TCI state is used for UL slots. | Separate beam indication for SBFD slots and for UL and/or DL slots |

TABLE 1-continued

| Example of TCI state codepoint content | | |
|---|---|---|
| | Contents of Codepoint | Use case |
| Codepoint example 10 | First DL TCI state, wherein the first DL TCI state is used for SBFD slots.<br>Second DL TCI state, wherein the second DL TCI state is used for DL slots.<br>UL TCI state, wherein:<br>Example 10a: the UL TCI state is used for SBFD slots and for UL slots.<br>Example 10b: the UL TCI state is used for SBFD slots.<br>Example 10c: the UL TCI state is used for UL slots. | Separate beam indication for SBFD slots and for UL and/or DL slots |
| Codepoint example 11 | First DL or Joint TCI state, wherein<br>Example 11a: the DL TCI state is for SBFD slots.<br>Example 11b: the joint TCI state is for UL and/or DL slots.<br>Example 11c: the DL or Joint TCI state is for SBFD slots (DL) and for UL and/or DL slots. | Separate beam indication for SBFD slots and joint beam indication for UL and/or DL slots |
| Codepoint example 12 | UL TCI state, wherein the UL TCI state is for SBFD slots. | Separate beam indication for SBFD slots and joint beam indication for UL and/or DL slots |
| Codepoint example 13 | A DL or Joint TCI state, wherein:<br>Example 13a: the DL TCI state is used for SBFD slots.<br>Example 13b: the Joint TCI state is used for UL and/or DL slots.<br>Example 13c: the DL or Joint TCI state is for SBFD slots (DL) and for UL and/or DL slots.<br>UL TCI state, wherein the UL TCI state is for SBFD slots. | Separate beam indication for SBFD slots and joint beam indication for UL and/or DL slots |
| Codepoint example 14 | A Joint TCI state, wherein the Joint TCI state is used for UL and/or DL slots.<br>DL TCI state, wherein the DL TCI state is for SBFD slots. | Separate beam indication for SBFD slots and joint beam indication for UL and/or DL slots |
| Codepoint example 15 | A Joint TCI state, wherein the Joint TCI state is used for UL and/or DL slots.<br>DL TCI state, wherein the DL TCI state is for SBFD slots.<br>UL TCI state, wherein the UL TCI state is for SBFD slots. | Separate beam indication for SBFD slots and joint beam indication for UL and/or DL slots |
| Codepoint example 16 | First DL or Joint TCI state, wherein<br>Example 16a: the Joint TCI state is for SBFD slots.<br>Example 16b: the DL TCI state is for DL slots.<br>Example 16c: the DL or Joint TCI state is for SBFD slots (DL and UL) and for DL slots. | Joint beam indication for SBFD slots and separate beam indication for UL and/or DL slots |
| Codepoint example 17 | UL TCI state, wherein the UL TCI state is for UL slots. | Joint beam indication for SBFD slots and separate beam indication for UL and/or DL slots |
| Codepoint example 18 | A DL or Joint TCI state, wherein:<br>Example 18a: the Joint TCI state is used for SBFD slots.<br>Example 18b: the DL TCI state is used for DL slots.<br>Example 18c: the DL or Joint TCI state is for SBFD slots (DL and UL) and for DL slots.<br>UL TCI state, wherein the UL TCI state is for UL slots. | Joint beam indication for SBFD slots and separate beam indication for UL and/or DL slots |
| Codepoint example 19 | A Joint TCI state, wherein the Joint TCI state is used for SBFD slots.<br>DL TCI state, wherein the DL TCI state is for DL slots. | Joint beam indication for SBFD slots and separate beam indication for UL and/or DL slots |
| Codepoint example 20 | A Joint TCI state, wherein the Joint TCI state is used for SBFD slots.<br>DL TCI state, wherein the DL TCI state is for DL slots.<br>UL TCI state, wherein the UL TCI state is for UL slots. | Joint beam indication for SBFD slots and separate beam indication for UL and/or DL slots |

In one example, for TCI states in a same codepoint, a UE expects a same additionalPCI.

In one example, for TCI states in a same codepoint, the additionalPCI can be different.

In one example, for TCI states (e.g., UL and Joint TCI states) in a same codepoint, a UE expects a same pathlossReferenceRS-Id.

In one example, for TCI states (e.g., UL and Joint TCI states) in a same codepoint, the pathlossReferenceRS-Id can be different.

In one example, for TCI states (e.g., UL and Joint TCI states) in a same codepoint, a UE expects a same ul-powerControl.

In one example, for TCI states (e.g., UL and Joint TCI states) in a same codepoint, the ul-powerControl can be different.

In a variant of the previous examples, if N antenna configurations are used, a TCI state codepoint can be configured to include up to N DL TCI states and/or N UL TCI states and/or N Joint TCI states.

In one example a UE (e.g., the UE 116) is indicated a TCI state code point in a DCI Format (e.g., DCI Format 1_1 or DCI Format 1_2), wherein the DCI Format may have a DL assignment, or the DCI Format may not have a DL assignment. In one example, a HARQ-ACK is transmitted in response to the DCI Format. In one example, when the HARQ-ACK includes a positive acknowledgment, the beam (e.g., spatial domain filter) is updated based on the TCI state code point in the DCI Format. In one example, when the HARQ-ACK includes a positive acknowledgment or a negative acknowledgment, the beam (e.g., spatial domain filter) is updated based on the TCI state code point in the DCI Format. In one example, the beam is updated at a start of a slot after a beam application time, wherein the beam application time is measured from one of (as illustrated in FIG. 13):

- The start of channel (e.g., PDCCH) conveying the TCI state code point (Example 1 of FIG. 13).
- The end of channel (e.g., PDCCH) conveying the TCI state code point (Example 2 of FIG. 13).
- The start of channel (e.g., PUCCH or PUSCH) conveying the acknowledgment of the channel conveying the TCI state code point (Example 3 of FIG. 13).
- The end of channel (e.g., PUCCH or PUSCH) conveying the acknowledgment of the channel conveying the TCI state code point (Example 4 of FIG. 13).

In one example, a beam application time is common (e.g., the same) for SBFD slots and for UL and/or DL slots.

In one example, a first beam application time is used for SBFD slots, and a second beam application time is used for UL and/or DL slots.

In one example, the beam application time is configured and/or updated by RRC signaling and/or MAC CE signaling and/or L1 control signaling.

In one example, the beam application time is determined based on the smallest sub-carrier spacings among the carriers to which the beam is being applied.

In one example, the slot boundary at which the beam update occurs is determined based on the smallest sub-carrier spacings among the carriers to which the beam is being applied.

In one example, the beam application time is counted over normal UL and DL slots/symbols.

In one example, the beam application time is counted over SBFD slots/symbols.

In one example, the beam application time is counted over SBFD slots/symbols and normal UL and DL slots/symbols.

In one example, the new beam is applied at a slot boundary of a normal UL/DL slot.

In one example, the new beam is applied at a slot boundary of a normal UL/DL symbol.

In one example, if a TCI state for a slot type (e.g., a slot type can be for example, SBFD slot or UL or DL slot) is not included in the TCI state codepoint, the corresponding TCI state is not updated.

In one example, if a TCI state for a first slot type is not included in the TCI state codepoint, and a TCI state for a second slot type is included in the TCI state codepoint. The TCI state for the first slot type is updated to follow that of the second slot type.

In one example, if a TCI state for a direction (e.g., a direction can be UL or DL) is not included in the TCI state codepoint, the corresponding TCI state is not updated.

In one example, if a TCI state for a slot type and a direction is not included in the TCI state codepoint, the corresponding TCI state is not updated.

In one example, if a TCI state for a first slot type and a direction is not included in the TCI state codepoint, and a TCI state for a second slot type and the direction is included in the TCI state codepoint. The TCI state for the first slot type and the direction is updated to follow that of the second slot type and the direction.

In one example, a TCI state can be a DL or a Joint TCI state, e.g., a TCI state from a list of a TCI states configured by DLorJoint-TCIState, wherein a TCI state can include one or more of the following fields:

- TCI state ID
- First QCL Info, e.g., with QCL TypeA or TypeB or TypeC.
- Second QCL Info, e.g., with QCL TypeD.
- additionalPCI
- pathlossReferenceRS-Id
- ul-powerControl wherein, the QCL Info can include one or more of the following fields:

- Cell index (e.g., serving cell index)
- Bwp-id
- referenceSignal (e.g., NZP CSI RS resource ID or SSB index)
- QCL Type, wherein the QCL type can TypeA or TypeB or TypeC or TypeD In one example, a DL or Joint TCI state configured by DLorJoint-TCIState, can be used for SBFD slots.

In one example, a DL or Joint TCI state configured by DLorJoint-TCIState, can be used for UL and/or DL slots.

In one example, a common list of DL or Joint TCI states may be configured for SBFD slots and for UL and/or DL slots.

In one example, two lists of DL or Joint TCI states (e.g., using first DLorJoint-TCIState and second DLorJoint-TCIState) may be configured, wherein

- A first list of DL or Joint TCI states may be configured for SBFD slots.
- A second list of DL or Joint TCI states may be configured for UL and/or DL slots.

In one example, a TCI state can be an UL TCI state, e.g., a TCI state from a list of a TCI states configured by UL-TCIState, wherein a TCI state can include one or more of the following fields:

- UL TCI state ID
- Cell index (e.g., serving cell index
- Bwp-id
- referenceSignal (e.g., NZP CSI RS resource ID or SSB index or SRS resource ID).
- additionalPCI pathlossReferenceRS-Id ul-powerControl In one example, an UL TCI state configured by UL-TCIState, can be used for SBFD slots.

In one example, an UL TCI state configured by UL-TCIState, can be used for UL slots.

In one example, a common list of UL states may be configured for SBFD slots and for UL slots.

In one example, two lists of UL TCI states (e.g., using first UL-TCIState and second UL-TCIState) may be configured, wherein

- A first list of UL TCI states may be configured for SBFD slots.
- A second list of UL TCI states may be configured for UL slots.

In one example, a MAC CE activates a set of codepoints (for example 8 codepoints), wherein a codepoint can include one DL TCI state and/or UL TCI state and/or Joint TCI state.

- In one example, a codepoint can be used for separate beam indication, a codepoint can include one of:
  - A DL TCI state from the list: DLorJoint-TCIState.
  - An UL TCI state from the list: UL-TCIState.
  - A pair of DL TCI state and UL TCI state from the lists DLorJoint-TCIState and UL-TCIState respectively.
- In one example, a codepoint can be used for joint beam indication, a codepoint can include a joint TCI state from the list: DLorJoint-TCIState.

In one example, a TCI state codepoint can include a flag to indicate if the TCI state codepoint can be applied to a SBFD slot or to an UL/DL slot. For example, if the flag is "0" the TCI state codepoint can be applied to a SBFD slot, and if the flag is "1" the TCI state codepoint can be applied to an UL and/or DL slot. In another example, if the flag is "1" the TCI state codepoint can be applied to a SBFD slot, and if the flag is "0" the TCI state codepoint can be applied to an UL and/or DL slot. In one example, a TCI state for SBFD slots is from a first DLorJoint-TCIState list or a first list UL-TCIState for SBFD slots. In one example, a TCI state for DL/UL slots is from a second DLorJoint-TCIState list or a second list UL-TCIState for DL/UL slots. In one example, the flag is absent, and whether the TCI state code point is for SBFD slots/symbols or DL/UL slots/symbols is determined based in the list(s) (first or second) used for the TCI states of the TCI state code point, for the example the TCI state IDs of the first list(s) are different for the TCI state IDs of the second list(s). In one example, the TCI state IDs of the first list(s) can be from the same set as the TCI state IDs of the second list(s), i.e., a TCI state ID in a first list can be the same as a TCI state ID in the second list, a flag in the TCI state code point can distinguish the slot/symbol (SBFD or normal DL/UL), the TCI state code point can apply to.

In one example, a TCI state codepoint can include a flag to indicate if the TCI state codepoint can be applied to a SBFD slot or to an UL/DL slot or (to a SBFD and an UL/DL slot).

In one example, a TCI state codepoint can applied to a SBFD slot and/or an UL/DL slot.

In one example, a UE can be indicated in a DCI Format (e.g., DCI Format 1_1 or DCI Format 1_2), wherein the DCI Format may have a DL assignment, or the DCI Format may not have a DL assignment, up to two codepoints:

- A first codepoint for SBFD slots
- A second codepoint for UL and/or DL slots

In one example, if the first codepoint is not included, the TCI state corresponding to the SBFD slots is not updated.

In one example, if the first codepoint is not included, and the second code point is included, the TCI state corresponding to the SBFD slots is updated to that of the second codepoint (e.g., updated to that of the UL and/or DL slots).

In one example, if the second codepoint is not included, the TCI state corresponding to the UL and/or DL slots is not updated.

In one example, if the second codepoint is not included, and the first code point is included, the TCI state corresponding to the UL and/or DL slots is updated to that of the first codepoint (e.g., updated to that of the SBFD slots).

In one example, for TCI states indicated by codepoints in a same DCI Format (or in a same channel or signal), a UE expects a same additionalPCI.

In one example, for TCI states indicated by codepoints in a same DCI Format (or in a same channel or signal), the additionalPCI can be different.

In one example, for TCI states (e.g., UL and Joint TCI states) indicated by codepoints in a same DCI Format (or in a same channel or signal), a UE expects a same pathloss-ReferenceRS-Id.

In one example, for TCI states (e.g., UL and Joint TCI states) indicated by codepoints in a same DCI Format (or in a same channel or signal), the pathlossReferenceRS-Id can be different.

In one example, for TCI states (e.g., UL and Joint TCI states) indicated by codepoints in a same DCI Format (or in a same channel or signal), a UE expects a same ul-power-Control.

In one example, for TCI states (e.g., UL and Joint TCI states) indicated by codepoints in a same DCI Format (or in a same channel or signal), the ul-powerControl can be different.

In one example, a UE can be indicated in a DCI Format (e.g., DCI Format 1_1 or DCI Format 1_2) wherein the DCI Format may have a DL assignment, or the DCI Format may not have a DL assignment a flag and a codepoint:

- In one example a flag or field can indicate if a codepoint in the DCI format applies to a SBFD slot or to an UL/DL slot. For example, if the flag is "0" the TCI state codepoint can be applied to a SBFD slot, and if the flag is "1" the TCI state codepoint can be applied to an UL and/or DL slot. In another example, if the flag is "1" the TCI state codepoint can be applied to a SBFD slot, and if the flag is "0" the TCI state codepoint can be applied to an UL and/or DL slot.
- In one example a flag or field can indicate if a codepoint in the DCI format applies to a SBFD slot or to an UL/DL slot or to a SBFD slot and an UL/DL slot.
- In one example, a flag in the codepoint can indicate the type of slot/symbol the indicated TCI state applies to, there is no flag in the DCI format indicating the TCI state codepoint.

In one example, a HARQ-ACK is transmitted in response to the DCI Format. In one example, when the HARQ-ACK includes a positive acknowledgment, the beam (e.g., spatial domain filter) is updated based on the TCI state code point in the DCI Format. In one example, when the HARQ-ACK includes a positive acknowledgment or a negative acknowledgment, the beam (e.g., spatial domain filter) is updated based on the TCI state code point in the DCI Format. In one example, the beam is updated at a start of a slot after a beam application time, wherein the beam application time is measured from one of (as illustrated in FIG. 13):

- The start of channel (e.g., PDCCH) conveying the TCI state code point (Example 1 of FIG. 13).
- The end of channel (e.g., PDCCH) conveying the TCI state code point (Example 2 of FIG. 13).

The start of channel (e.g., PUCCH or PUSCH) conveying the acknowledgment of the channel conveying the TCI state code point (Example 3 of FIG. 13).

The end of channel (e.g., PUCCH or PUSCH) conveying the acknowledgment of the channel conveying the TCI state code point (Example 4 of FIG. 13).

In one example, a beam application time is common (e.g., the same) for SBFD slots and for UL and/or DL slots.

In one example, a first beam application time is used for SBFD slots, and a second beam application time is used for UL and/or DL slots.

In one example, the beam application time is configured and/or updated by RRC signaling and/or MAC CE signaling and/or L1 control signaling.

In one example, the beam application time is determined based on the smallest sub-carrier spacings among the carriers to which the beam is being applied.

In one example, the slot boundary at which the beam update occurs is determined based on the smallest sub-carrier spacings among the carriers to which the beam is being applied.

In one example, the beam application time is counted over normal UL and DL slots/symbols.

In one example, the beam application time is counted over SBFD slots/symbols.

In one example, the beam application time is counted over SBFD slots/symbols and normal UL and DL slots/symbols.

In one example, the new beam is applied at a slot boundary of a normal UL/DL slot.

In one example, the new beam is applied at a slot boundary of a normal UL/DL symbol.

In a variant of the previous examples, if N antenna configurations are used, a DCI Format can include up to N TCI state codepoints for the N antenna configurations and corresponding slots.

In a variant of the previous examples, if N antenna configurations are used, a DCI Format can include up to N TCI state codepoint and a flag indicating which of the N antenna configurations and corresponding slots the TCI state codepoint can be applied to.

In one example, two MAC CE sets are activated one for SBFD slots and other normal DL or UL slots.

In one example, a TCI state can be a DL or a Joint TCI state, e.g., a TCI state from a list of a TCI states configured by DLorJoint-TCIState, wherein a TCI state can include one or more of the following fields:

TCI state ID

First QCL Info, e.g., with QCL TypeA or TypeB or TypeC

Second QCL Info, e.g., with QCL TypeD additionalPCI pathlossReferenceRS-Id ul-powerControl wherein, the QCL Info can include one or more of the following fields:

Cell index (e.g., serving cell index)

Bwp-id referenceSignal (e.g., NZP CSI RS resource ID or SSB index)

QCL Type, wherein the QCL type can TypeA or TypeB or TypeC or TypeD

In one example, a DL or Joint TCI state configured by DLorJoint-TCIState, can be used for SBFD slots.

In one example, a DL or Joint TCI state configured by DLorJoint-TCIState, can be used for UL and/or DL slots.

In one example, a common list of DL or Joint TCI states may be configured for SBFD slots and for UL and/or DL slots.

In one example, two lists of DL or Joint TCI states (e.g., using first DLorJoint-TCIState and second DLorJoint-TCIState) may be configured, wherein:

A first list of DL or Joint TCI states may be configured for SBFD slots.

A second list of DL or Joint TCI states may be configured for UL and/or DL slots.

In one example, a TCI state can be an UL TCI state, e.g., a TCI state from a list of a TCI states configured by UL-TCIState, wherein a TCI state can include one or more of the following fields:

UL TCI state ID

Cell index (e.g., serving cell index)

Bwp-id referenceSignal (e.g., NZP CSI RS resource ID or SSB index or SRS resource ID).

additionalPCI pathlossReferenceRS-Id ul-powerControl

In one example, an UL TCI state configured by UL-TCIState, can be used for SBFD slots.

In one example, an UL TCI state configured by UL-TCIState, can be used for UL slots.

In one example, a common list of UL states may be configured for SBFD slots and for UL slots.

In one example, two lists of UL TCI states (e.g., using first UL-TCIState and second UL-TCIState) may be configured, wherein A first list of UL TCI states may be configured for SBFD slots.

A second list of UL TCI states may be configured for UL slots.

In one example, a MAC CE can activate two sets of codepoints:

First set of codepoints (for example 8 codepoints) for SBFD slots.

Second set of codepoints (for example 8 codepoints) for UL and/or DL slots.

In one example, if MAC CE activates one set of codepoints, the codepoints can be used for SBFD slots and/or for UL and/or DL slots.

In one example, a codepoint can include one DL TCI state and/or UL TCI state and/or Joint TCI state.

In one example, a codepoint can be used for separate beam indication, a codepoint can include one of:

A DL TCI state from the list: DLorJoint-TCIState.

An UL TCI state from the list: UL-TCIState.

A pair of DL TCI state and UL TCI state from the lists DLorJoint-TCIState and UL-TCIState respectively.

In one example, a codepoint can be used for joint beam indication, a codepoint can include a joint TCI state from the list: DLorJoint-TCIState.

In a variant of the previous examples, if N antenna configurations are used, up to N sets of codepoints can be activated by MAC CE.

In one example a UE is indicated a TCI state code point index in a DCI Format (e.g., DCI Format 1_1 or DCI Format 1_2), wherein the DCI Format may have a DL assignment, or the DCI Format may not have a DL assignment. Wherein:

If one MAC CE list of TCI state code points is activated, the TCI state codepoint index corresponds to a TCI state codepoint from the list. TCI state codepoint is applied to SBFD slots and UL and/or DL slots.

If two MAC CE lists of TCI state code points are activated

A first TCI state codepoint from a first MAC CE activated list of codepoints. The first TCI state codepoint is applied to SBFD slots.

A second TCI state codepoint from a second MAC CE activated list of codepoints. The second TCI state codepoint is applied to UL and/or DL slots.

In one example a UE is indicated two TCI state codepoints (a first TCI state codepoint and a second TCI state codepoint) in a DCI Format (e.g., DCI Format 1_1 or DCI Format 1_2), wherein the DCI Format may have a DL assignment, or the DCI Format may not have a DL assignment. Wherein:

If one MAC CE list of TCI state code points is activated:

The first TCI state codepoint is from the MAC CE activated list of codepoints. The first TCI state codepoint is applied to SBFD slots.

The second TCI state codepoint is from the MAC CE activated list of codepoints. The second TCI state codepoint is applied to UL and/or DL slots.

If two MAC CE lists of TCI state code points are activated:

The first TCI state codepoint is from a first MAC CE activated list of codepoints. The first TCI state codepoint is applied to SBFD slots.

The second TCI state codepoint is from a second MAC CE activated list of codepoints. The second TCI state codepoint is applied to UL and/or DL slots.

In one example a UE is indicated a TCI state codepoint and a flag in a DCI Format (e.g., DCI Format 1_1 or DCI Format 1_2), wherein the DCI Format may have a DL assignment, or the DCI Format may not have a DL assignment. Wherein:

If one MAC CE list of TCI state code points is activated

The TCI state codepoint is from the MAC CE activated list of codepoints and can apply to SBFD slots and UL and/or sidelink (SL) slots.

If two MAC CE lists of TCI state code points are activated:

If the flag is A, the TCI state codepoint is from a first MAC CE activated list of codepoints. The TCI state codepoint is applied to SBFD slots.

If the flag is B the TCI state codepoint is from a second MAC CE activated list of codepoints. The TCI state codepoint is applied to UL and/or DL slots.

In one example, A=0 and B=1. In one example, A=1 and B=0.

In a further example, if the flag is C, the TCI state codepoint is from a first MAC CE activated list of codepoints. The TCI state codepoint is applied to SBFD slots and to UL and/or DL slots.

In a further example, if the flag is D, the TCI state codepoint is from a second MAC CE activated list of codepoints. The TCI state codepoint is applied to SBFD slots and to UL and/or DL slots.

In one example, a HARQ-ACK is transmitted in response to the DCI Format. In one example, when the HARQ-ACK includes a positive acknowledgment, the beam (e.g., spatial domain filter) is updated based on the TCI state code point in the DCI Format. In one example, when the HARQ-ACK includes a positive acknowledgment or a negative acknowledgment, the beam (e.g., spatial domain filter) is updated based on the TCI state code point in the DCI Format. In one example, the beam is updated at a start of a slot after a beam application time, wherein the beam application time is measured from one of (as illustrated in FIG. 13):

The start of channel (e.g., PDCCH) conveying the TCI state code point (Example 1 of FIG. 13).

The end of channel (e.g., PDCCH) conveying the TCI state code point (Example 2 of FIG. 13).

The start of channel (e.g., PUCCH or PUSCH) conveying the acknowledgment of the channel conveying the TCI state code point (Example 3 of FIG. 13).

The end of channel (e.g., PUCCH or PUSCH) conveying the acknowledgment of the channel conveying the TCI state code point (Example 4 of FIG. 13).

In one example, a beam application time is common (e.g., the same) or SBFD slots and for UL and/or DL slots.

In one example, a first beam application time is used for SBFD slots, and a second beam application time is used for UL and/or DL slots.

In one example, the beam application time is configured and/or updated by RRC signaling and/or MAC CE signaling and/or L1 control signaling.

In one example, the beam application time is determined based on the smallest sub-carrier spacings among the carriers to which the beam is being applied.

In one example, the slot boundary at which the beam update occurs is determined based on the smallest sub-carrier spacings among the carriers to which the beam is being applied.

In one example, the beam application time is counted over normal UL and DL slots/symbols.

In one example, the beam application time is counted over SBFD slots/symbols.

In one example, the beam application time is counted over SBFD slots/symbols and normal UL and DL slots/symbols.

In one example, the new beam is applied at a slot boundary of a normal UL/DL slot.

In one example, the new beam is applied at a slot boundary of a normal UL/DL symbol.

In one example, if a TCI state for a slot type (e.g., a slot type can be for example, SBFD slot or UL or DL slot) is not included in a DCI format used for beam indication, the corresponding TCI state is not updated.

In one example, if a TCI state for a first slot type is not included in a DCI format for beam indication, and a TCI state for a second slot type is included in the DCI format for beam indication. The TCI state for the first slot type is updated to follow that of the second slot type.

In one example, if a TCI state for a direction (e.g., a direction can be UL or DL) is not included in a DCI Format for beam indication, the corresponding TCI state is not updated.

In one example, if a TCI state for a slot type and a direction is not included in a DCI Format for beam indication, the corresponding TCI state is not updated.

In one example, if a TCI state for a first slot type and a direction is not included in a DCI Format for beam indication, and a TCI state for a second slot type and the direction is included in the DCI Format for beam indication. The TCI state for the first slot type and the direction is updated to follow that of the second slot type and the direction.

In a variant of the previous examples, a DCI Format used for beam indication (e.g., TCI state indication or TCI state code point) can be one of the following:

DCI Format 1_0

UL DCI Format (e.g., DCI Format 0_0 or DCI Format 0_1 or DCI Format 0_2), with or without uplink grant A DCI Format for beam indication, e.g., a DCI format that includes a TCI state or a TCI state ID or TCI state codepoint While the pervious examples, describe a TCI state or TCI state ID or TCI state codepoint applying to a SBFD slot and/or to an UL and/or DL slot. It should be apparent to those skilled in the art, that a slot is a time unit that can be replaced by one of the following:

A symbol
A subframe
A frame, etc.

For example, a TCI state or TCI state ID or TCI state codepoint can be applied to a SBFD symbol and/or an UL and/or DL symbol.

In a variant of the previous examples, a SBFD symbol/slot can flip into a UL or a DL symbol, the TCI state used for such a symbol/slot is that the TCI state corresponding to UL and/or DL symbols.

In a variant of the previous examples, a SBFD symbol/slot can flip into a UL or a DL symbol, the TCI state used for such a symbol/slot is that the TCI state corresponding SBFD symbols.

In a variant of the previous examples, the reference signals used for a TCI state (e.g., as the source reference signal) follow a same antenna configuration as the corresponding TCI state is applied to.

In a variant of the previous examples, the reference signals used for a TCI state (e.g., as the source reference signal) are in a slot/symbol of a same type as that to which the TCI state is applied to.

In the one or more examples described herein, the following examples for the configuration or application of separate and/or joint beam indication can be considered:

In one example, one of the following can be configured or applied:

- Separate beam indication for SBFD slots and separate beam indication for UL and/or DL slots.
- Joint beam indication for SBFD slots and joint beam indication for UL and/or DL slots.

In one example, one of the following can be configured or applied:

- Separate beam indication for SBFD slots and joint beam indication for UL and/or DL slots.
- Joint beam indication for SBFD slots and separate beam indication for UL and/or DL slots.

In one example, one of the following can be configured or applied:

- Separate beam indication for SBFD slots and separate beam indication for UL and/or DL slots.
- Separate beam indication for SBFD slots and joint beam indication for UL and/or DL slots
- Joint beam indication for SBFD slots and joint beam indication for UL and/or DL slots.

In one example, one of the following can be configured or applied:

- Separate beam indication for SBFD slots and separate beam indication for UL and/or DL slots.
- Separate beam indication for SBFD slots and joint beam indication for UL and/or DL slots
- Joint beam indication for SBFD slots and joint beam indication for UL and/or DL slots.

In one example, one of the following can be configured or applied:

- Separate beam indication for SBFD slots and separate beam indication for UL and/or DL slots.
- Joint beam indication for SBFD slots and joint beam indication for UL and/or DL slots.
- Joint beam indication for SBFD slots and separate beam indication for UL and/or DL slots.

In one example, one of the following can be configured or applied:

- Separate beam indication for SBFD slots and separate beam indication for UL and/or DL slots.
- Separate beam indication for SBFD slots and joint beam indication for UL and/or DL slots
- Joint beam indication for SBFD slots and joint beam indication for UL and/or DL slots.
- Joint beam indication for SBFD slots and separate beam indication for UL and/or DL slots.

In one example, the UE determines an applicable TCI state for a slot/symbol based on a provided or indicated time-domain configuration associated with a TCI state.

Figure 14:
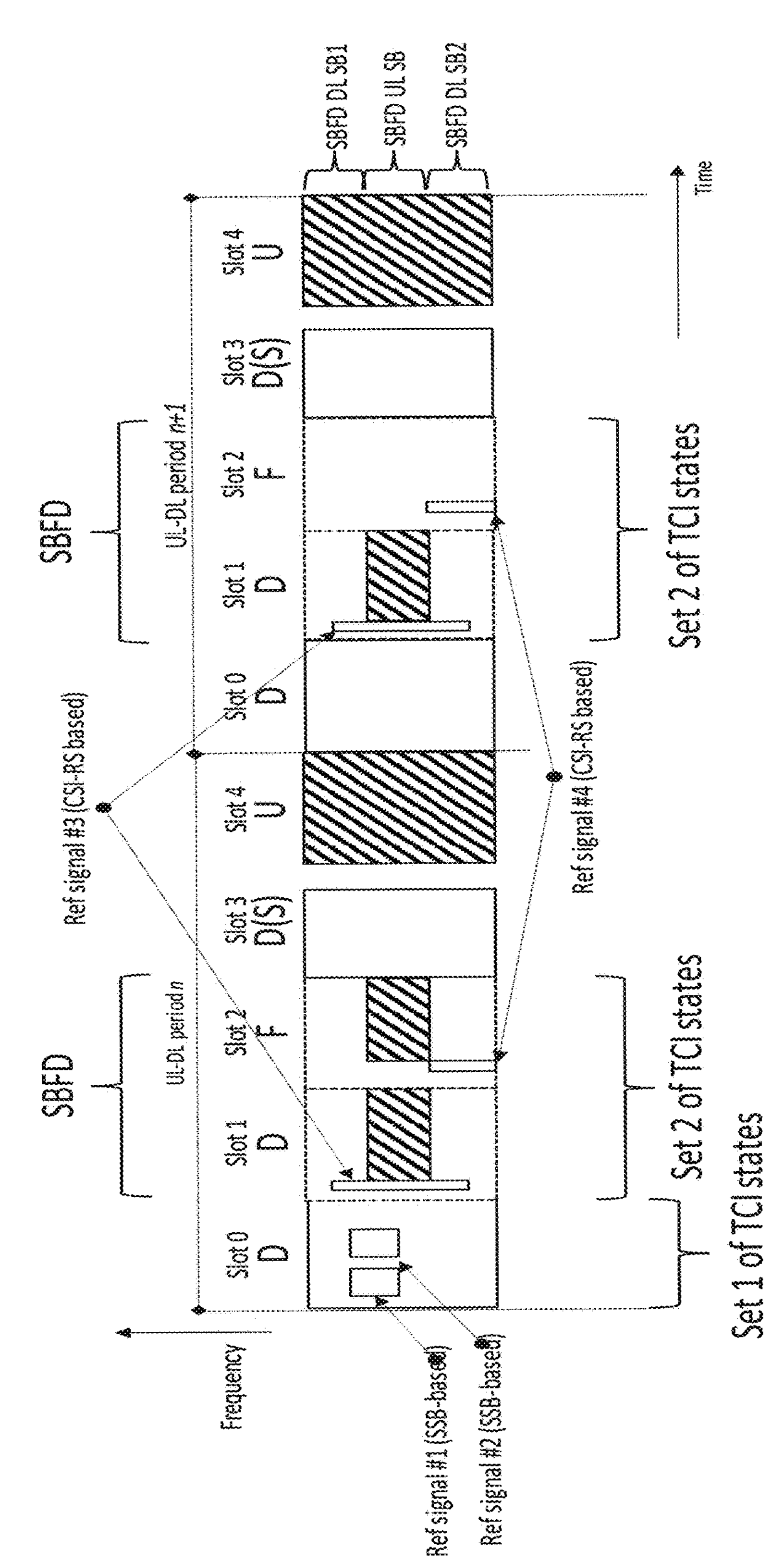
FIG. 14 illustrates a timeline for two separate sets of TCI states according to embodiments of the present disclosure.

FIG. 14 illustrates a timeline 1400 for two separate sets of TCI states according to embodiments of the present disclosure. For example, timeline 1400 for two separate sets of TCI states can be followed by the UE 116 of FIG. 3. This example is for illustration only and other embodiments can be used without departing from the scope of the present disclosure.

For example, and as described by other embodiments, the UE may be provided multiple sets of TCI states, or multiple sets of TCI state codepoints may be activated, or multiple TCI states or TCI state IDs or TCI state codepoints may be indicated, or a set of TCI states may be configured with multiple spatial relation reference signals or multiple reference signals configured with a same QCL type for the UE. In the following example, for simplicity and illustration purposes and without loss of generality, the case of multiple sets of TCI states provided or indicated to the UE is used to exemplify time-domain configuration and operational aspects associated with TCI state determination by the UE. As can be seen, the solutions extend to the other cases described in the embodiments.

In one example, a UE is provided multiple sets of TCI states. The UE can be provided with a set of reference signal (RS) resources or set of RS resource indices for each set of TCI states. For example, the UE is provided with a CSI-RS resource or CSI-RS resource index, or an SSB resource or SSB index, or an SRS resource or an SRS resource index, as RS resource or RS resource index for a set of TCI states. A set of TCI states is associated with a configurable set of time-domain resources, e.g., a set of slots or symbols for which a corresponding set of TCI states are provided to the UE. A UE may also be provided by higher layers an association between slots or symbols for TCI state determination. Alternatively, an association between slots and symbols and a set of TCI states may be indicated through the time-domain resource allocation of the RS resources or RS resource indices configured for a set of TCI states. Alternatively, or additionally, an association between slots and symbols and a set of TCI states may be indicated through MAC CE signaling and/or L1 control signaling.

A first set of TCI states or a first TCI group may be configured on non-SFBD slots or symbols (e.g., DL/UL slots or symbols). A second set of TCI states or a second TCI group may be configured on SFBD slots or symbols. The first set of TCI states may be referred to as Primary TCI group. The second set of TCI states may be referred to as Secondary TCI group. The UE determines a TCI state using the RS of a set of TCI states for the associated time-domain resources, e.g., slots or symbols.

With reference to FIG. 14, a full-duplex communication system using two separate sets of TCI states is shown.

It is one advantage of the solution that the multiple sets of TCI states can be configured for the UE to determine the transmission and/or reception settings separately and to evaluate or indicate the channel quality separately to higher layers for the set of non-SBFD or normal DL slots or symbols, and the set of SBFD slots or symbols.

The UE determines a first set of TCI states and a second set of TCI states, $TCI_{SET1}$ and $TCI_{SET2}$ in a serving cell. The first set of TCI states $TCI_{SET1}$ for a serving cell is associated with RS(s) configured for the UE in a first set of slots or symbols of the serving cell, such as in non-SBFD slots or symbols. The second set of TCI states $TCI_{SET2}$ for a serving cell is associated with RS(s) configured for the UE in a second set of slots or symbols on the serving cell, such as in SBFD slots or symbols.

A first set of TCI states and a second set of TCI states, $TCI_{SET1}$ and $TCI_{SET2}$ in a serving cell respectively, associated with RS(s) in different slot/symbol groups may be provided to the UE by one or a combination of RRC signaling and/or configuration, MAC CE signaling, L1 control signaling by DCI, or tabulated and/or listed by system operating specifications.

Only a first set of TCI states $TCI_{SET1}$ associated with a first set of time-domain resources, e.g., slots or symbols, is provided to the UE (e.g., the UE 116) by RRC whereas the UE determines a second set of TCI states $TCI_{SET2}$ associated with a second set of time-domain resources, e.g., slots or symbols, from, e.g., L1 control signaling by DCI. The determination of a second set of TCI states $TCI_{SET2}$ associated with a second set of time-domain resources, e.g., slots or symbols, may depend on and be a function of a first set of TCI states $TCI_{SET1}$. For example, the UE may determine RS resources or RS resource indices for $TCI_{SET2}$ as a set of RS resources or RS resource indices configured with respect to or as function of a set of RS resources or RS resources indices configured for $TCI_{SET1}$.

For example, the set(s) of the first TCI group or second TCI group may be included in one or more signaling messages and/or IEs. For example, and without loss of generality, the gNB may provide these to the UE as part of RRC signaling messages of type RRCSetup, RRCReconfiguration, SIB1 or SystemInformation and or may provide such configuration in RRC IEs of type ServingCellConfig, ServingCellConfigCommon, or ServingCellConfigSIB1 where an RRC configuration parameter may be of enumerated, listed or sequence type, and/or may be encoded as a bit string.

The UE may determine the TCI state in a slot or symbol using a same RS resource or RS resource index configured in both the first and the second TCI groups $TCI_{SET1}$ and $TCI_{SET2}$ A signaling condition or priority rules may then be used by the UE to include the same RS resource or RS resource index in a particular occurrence, e.g., slot or symbol, in the radio link quality evaluation.

For example, a same RS resource or RS resource index associated with a first set of TCI states or first TCI group and a second set of TCI states or a second TCI group may be configured on a flexible slot or symbol. When the UE determines the flexible slot or symbol to be scheduled or configured by the gNB (e.g., the gNB 102) for DL-only transmissions, the UE determines the TCI state based on the RS resource or RS resource index as part of the TCI state configuration for the first or Primary TCI group, e.g., on non-full-duplex or non-SBFD slots or symbols. When the UE determines the flexible slot or symbol to be scheduled or configured by the gNB for DL and UL transmissions, e.g., the flexible slot or symbol is used by the gNB for full-duplex or SBFD transmissions and receptions, the UE includes the same RS resource or RS resource index as part of the TCI state configuration for the second or Secondary TCI group, e.g., on full-duplex or SBFD slots or symbols. When the UE receives a DCI format scheduling transmission or reception on a slot or symbol, the UE selects a set of TCI states or selects a TCI group to determine the TCI state using the associated RS resource or RS resource index of the TCI group in that slot or symbol.

For example, the UE selects a TCI group associated in a slot or symbol based on a slot or symbol type in a time period. The slot type may include one or a combination of the following:

- slot or symbol of type D (Downlink), U (Uplink) or F (Flexible) in a TDD common or dedicated UL-DL frame configuration or provided through SFI such as in DCI format 2_0;
- slot or symbol of type 'simultaneous Tx-Rx', 'Rx only', or 'Tx only', e.g., associated with a cell common or a UE dedicated slot and/or symbol configuration providing a resource or transmission type indication; or
- slot or symbol associated with a full-duplex UL transmission resource or SBFD UL subband configuration or a full-duplex DL transmission resource or SBFD DL subband configuration; or
- slot or symbol assignment provided to the UE by DCI scheduling.

For example, the UE selects a set of TCI states or a TCI group $TCI_{SET}$ for determination of a TCI state from the set of TCI states in a slot or symbol that is provided, for example, by a higher layer parameter in fd-config. The UE determines the resource type configuration of a serving cell by receiving a system information block (SIB), such as a SIB1, or by a common RRC signaling, or by UE-specific RRC signaling. For example, the resource type indication provided to the UE by higher layers indicates that a slot or symbol or symbol group of the transmission resource may be of type 'simultaneous Tx-Rx', 'Rx only', or 'Tx only'. For example, a transmission resource of type 'simultaneous Tx-Rx', 'Rx only', or 'Tx only' can be provided per slot type 'D', 'U' or 'F' in a slot. For example, the transmission resource may be configured with a SBFD UL and/or DL subband. The indication of the resource type may be provided independently of the transmission direction of a slot or symbol indicated to the UE by the TDD UL-DL frame configuration provided by higher layers. If the determined slot or symbol type of a slot or symbol for TCI state determination is 'non-SBFD', the UE selects a first set of TCI states or TCI group $TCI_{SET1}$. If the determined slot or symbol type of a slot or symbol for TCI state determination is 'SBFD', the UE selects the second set of TCI states or TCI group $TCI_{SET2}$.

A motivation is that by determining a slot or symbol as type 'non-SBFD' versus 'SBFD', the UE may be separately configured for DL receptions and/or UL transmissions to determine a TCI state as a function of the gNB-side SBFD antenna configuration for the slot or symbol type.

In one embodiment, the first and second set of slots or symbols of the serving cell associated with a first TCI group and a second TCI group, $TCI_{SET1}$ and $TCI_{SET2}$, for determination of a TCI state may be configured as a first Slot or Symbol Group SG1 and a second Slot or Symbol Group SG2, respectively. A UE may be configured with one or more Slot or Symbol Group(s) (SG(s)) for TCI state determination on a serving cell where an SG is a set of slots or symbols of the serving cell associated with a same signaled group or a same set of RS resources or RS resource indices. A UE may select a group associated with TCI state determination in a slot or symbol by determining a slot or symbol type, or by determining presence/absence or configuration of a SBFD subband allocation, or by DCI-based scheduling.

For example, the association between slots or symbols and a TCI group, e.g., SG, may be indicated to the UE using a list or a bitmap indicating applicable or valid, or not applicable or not valid, symbols or slots for the SG. An SG may include only a single slot or symbol, or the SG may comprise slots or symbols in a period. There may be only a single or a default SG. The SG may comprise a default RS resource or RS resource index set such as the indicated SSB indices of the serving cell. When an SG includes more than one slot or symbol, the slots or symbols of the SG can be consecutive, or they can be non-consecutive. One or multiple SGs may be configured for the UE.

For example, a UE can be indicated a first SG containing a normal DL slot or symbol, e.g., non-full-duplex or non-SBFD slot or symbol and a second SG containing a full-duplex or SBFD slot or symbol. When a set of TCI states is determined by or provided to the UE for an $SG_k$, the UE applies the set of TCI states to determine a TCI state from the set for a slot or symbol in $SG_k$. The UE does not apply the set of TCI states to determine the TCI state from the set in a slot or symbol when the slot or symbol is not part of the $SG_k$. One or multiple set(s) of TCI states may be associated with an SG, e.g., one or more set(s) if TCI states(s) may be determined by or provided to the UE. When an SG is associated with multiple sets of TCI states or TCI groups, the UE determines a set of TCI states or a TCI group for the slot or symbol from the set of determined or provided groups associated with the SG by selecting a set of TCI states or a TCI group according to an applicable rule, e.g., slot type, configuration SBFD subband transmission direction, a priority level, or the order or sequence in which values are determined by or provided to the UE. A priority level, or the order or sequence in which TCI groups or SGs are determined by or provided to the UE.

A UE can be provided a higher layer parameter indicating the slot or symbol association for a Slot or Symbol group SG by RRC signaling messages and IEs. For example, and without loss of generality, an RRC parameter or field may be signaled from the gNB to the UE as part of RRC signaling messages of type RRCSetup, RRCReconfiguration, SIB1 or SystemInformation and may be included in RRC IEs of type ServingCellConfig, ServingCellConfigCommon, or ServingCellConfigSIB1. These configuration parameters may be of enumerated, listed or sequence type, and/or may be encoded as a bit string. For example, a configuration for a slot or symbol association for an Slot or Symbol Group may be provided as SEQUENCE (SIZE (1, . . . , maxNrofMSGs)) OF Msg where 'Msg' is a bit string of size M. For example, M=10 or a multiple thereof. When Msg={0011000000}, the 3rd and 4th slot or slot #2 and #3 in a sequence of 10 slots numbered from 0 to 9 are configured as part of the slot group SG. When Msg={0000000011}, slots #8- #9 in a sequence of 10 slots are configured as part of the slot group SG, etc.

Multi-transmission/reception point (mTRP) is a technique that can enhance reliability by introducing diversity at the macro-level. mTRP can also enhance data rate and spatial efficiency by supporting spatial multiplexing.

Release 16 introduced PDSCH mTRP operation, where two scenarios are introduced. First, is single DCI (sDCI) operation, where a single DCI schedules PDSCH transmission from two TRPs. In one example of sDCI, a DCI indicates two TCI states providing a QCL for each TRP, where one TRP transmits some layers of PDSCH and the other TRP transmits the remaining layers of PDSCH. This can be an example of non-coherent joint transmission. In another example of sDCI, repetition is used between the two TRPs, where repetition can be in frequency domain (e.g., FDM-based) or in time domain (e.g., TDM-based). There are two frequency domain schemes; fdmSchemeA and fdmSchemeB. In fdmSchemeA, a PDSCH transport block is transmitted from two TRPs in one PDSCH occasion, where the frequency resources of the PDSCH occasion are partitioned into two non-overlapping parts, with one part associated with each TRP. In fdmSchemeB, a PDSCH transport block is transmitted from two TRPs in two PDSCH occasions, one PDSCH occasion from each TRP, where the PDSCH occasions are not overlapping in frequency domain. There is one time-domain scheme, tdmSchemeA, where a PDSCH transport block is transmitted from two TRPs in two PDSCH occasions in non-overlapping symbols in a same slot. Second, is multi-DCI (mDCI) operation, where each PDSCH transmission from a TRP is scheduled by its own DCI, and the PDSCH transmissions can be fully overlapping, partially overlapping or non-overlapping. For mDCI, each TRP is associated with a control resource set resource group identified by a CORESETPOOLIndex.

Release 17 enhanced mTRP operation for other channels. For PDCCH, repetition is used, where two PDCCH candidates in different search space sets are linked, and the linked PDCCH candidates have the same aggregation level and the same payload. Two search space sets are linked by RRC configuration, with each search space set associated with a different CORESET, and hence a different TCI state. The linked search space sets have the same periodicity, the same DCI formats to monitor and the same number of candidates for each aggregation level. Only intra-slot PDCCH repetition is supported for UE-specific space (USS) set and Type-3 PDCCH common search space (CSS) set. One of the PDCCH candidates is configured as a reference PDCCH candidate to determine the timeline of the control channel procedure.

For PUCCH, the PUCCH transmission containing the uplink control information (UCI) is repeated in the time-domain using a same resource and using a different beam for each TRP. For FR1, separate power control parameters are used for each PUCCH transmission to the respective TRP. For FR2, separate PUCCH-spatialRelationInfo, or separate TCI state (in Rel-18), is used for each PUCCH transmission to the respective TRP. The repetitions of the PUCCH transmission can be intra-slot (for low latency applications) or inter-slot, where the number of repeated slots is configured by RRC and can be {2, 4, 8}.

For PUSCH, the PUSCH transmission is repeated in the time-domain using a same resource and using a different beam for each TRP. For FR1, separate power control parameters are used for each PUSCH transmission to the respective TRP. For FR2, separate spatial relation, or separate TCI state (in Rel-18), is used for each PUSCH transmission to the respective TRP. PUSCH repetition is supported for dynamic grant/DCI, Type-1 configured grant and Type-2 configured grant. PUSCH repetition is supported for codebook and non-codebook-based PUSCH transmission.

In certain embodiments, 5G NR radio supports time-division duplex (TDD) operation and frequency division duplex (FDD) operation. Use of FDD or TDD depends on the NR frequency band and per-country allocations. TDD is required in most bands above 2.5 GHz.

With reference to FIG. 7, a DDDSU UL-DL configuration is shown. Here, D denotes a DL slot, U denotes an UL slot, and S denotes a special or switching slot with a DL part, a flexible part that can also be used as guard period G for DL-to-UL switching, and optionally an UL part.

TDD has a number of advantages over FDD. For example, use of the same band for DL and UL transmissions leads to simpler UE implementation with TDD because a duplexer is not required. Another advantage is that time resources can be flexibly assigned to UL and DL considering an asymmetric ratio of traffic in both directions. DL is typically assigned more time resources in TDD to handle DL-heavy mobile traffic. Another advantage is that CSI can be more easily acquired via channel reciprocity. This reduces an overhead associated with CSI reports especially when there is a large number of antennas.

Although there are advantages of TDD over FDD, there are also disadvantages. A first disadvantage is a smaller coverage of TDD due to the smaller portion of time resources available for transmissions from a UE, while with FDD time resources can be used. Another disadvantage is latency. In TDD, a timing gap between reception by a UE and transmission from a UE containing the hybrid automatic repeat request acknowledgement (HARQ-ACK) information associated with receptions by the UE is typically larger than that in FDD, for example by several milliseconds. Therefore, the HARQ round trip time in TDD is typically longer than that with FDD, especially when the DL traffic load is high. This causes increased UL user plane latency in TDD and can cause data throughput loss or even HARQ stalling when a PUCCH providing HARQ-ACK information needs to be transmitted with repetitions in order to improve coverage (an alternative in such case is for a network to forgo HARQ-ACK information at least for some transport blocks in the DL).

To address some of the disadvantages for TDD operation, an adaptation of link direction based on physical layer signaling using a DCI format is supported where, with the exception of some symbols in some slots supporting predetermined transmissions such as for SSBs, symbols of a slot can have a flexible direction (UL or DL) that a UE can determine according to scheduling information for transmissions or receptions. A PDCCH can also be used to provide a DCI format, such as a DCI format 2_0 as described in 38.213 [REF3], that can indicate a link direction of some flexible symbols in one or more slots. Nevertheless, in actual deployments, it is difficult for a gNB scheduler to adapt a transmission direction of symbols without coordination with other gNB schedulers in the network (e.g., the network 130). This is because of cross-link interference (CLI) where, for example, DL receptions in a cell by a UE can experience large interference from UL transmissions in the same or neighboring cells from other UEs.

Full-duplex (FD) communications offer increased spectral efficiency, improved capacity, and reduced latency in wireless networks. When using FD communications, UL and DL signals are simultaneously received and transmitted on fully or partially overlapping, or adjacent, frequency resources, thereby improving spectral efficiency and reducing latency in user and/or control planes.

There are several options for operating a FD wireless communication system. For example, a single carrier may be used such that transmissions and receptions are scheduled on same time-domain resources, such as symbols or slots. Transmissions and receptions on same symbols or slots may be separated in frequency, for example by being placed in non-overlapping sub-bands. An UL frequency sub-band, in time-domain resources that also include DL frequency sub-bands, may be located in the center of a carrier, or at the edge of the carrier, or at a selected frequency-domain position of the carrier. The allocations of DL sub-bands and UL sub-bands may also partially or even fully overlap. A gNB may simultaneously transmit and receive in time-domain resources using same physical antennas, antenna ports, antenna panels and transmitter-receiver units (TRX). Transmission and reception in FD may also occur using separate physical antennas, ports, panels, or TRXs. Antennas, ports, panels, or TRXs may also be partially reused, or only respective subsets can be active for transmissions and receptions when FD communication is enabled.

When a UE (e.g., the UE 116) receives signals/channels from a gNB in a full-duplex slot, the receptions may be scheduled in a DL subband of the full-duplex slot. When full-duplex operation at the gNB uses DL slots for scheduling transmissions from the UE using full-duplex transmission and reception at the gNB, there may be one or multiple, such as two, DL subbands in the full-duplex slot. When a UE is scheduled to transmit in a full-duplex slot, the transmission may be scheduled in an UL subband of the full-duplex slot. When full-duplex operation at the gNB uses UL slots for purpose of scheduling transmissions to UEs using full-duplex transmission and reception at the gNB, there may be one or multiple, such as two, UL subbands in the full-duplex slot. Full-duplex operation using an UL subband or a DL subband may be referred to as Subband-Full-Duplex (SBFD).

For example, when full-duplex operation at the gNB uses a DL or F slot or symbol for scheduling transmissions from the UE using full-duplex transmission and reception at the gNB, there may be one DL subband on the full-duplex slot or symbol and one UL subband of the full-duplex slot or symbol in the NR carrier. A frequency-domain configuration of the DL and UL subbands may then be referred to as 'DU' or 'UD', respectively, depending on whether the UL subband is configured/indicated in the upper or the lower part of the NR carrier. In another example, when full-duplex operation at the gNB uses a DL or F slot or symbol for scheduling transmissions from the UE using full-duplex transmission and reception at the gNB, there may be two DL subbands and one UL subband on the full-duplex slot or symbol. A frequency-domain configuration of the DL and UL subbands may then be referred to as 'DUD' when the UL subband is configured/indicated in a part of the NR carrier and the DL subbands are configured/indicated at the edges of the NR carrier, respectively. Similar principles extend to the case where full-duplex operation at the gNB uses U slot(s) or symbol(s). For example, the gNB may configure and/or indicate one or two SBFD DL subband(s) in the U slot/symbol using for example a frequency-domain 'DU', 'UD' or 'DUD' configuration.

In the following, for brevity, full-duplex slots/symbols and SBFD slots/symbols may be jointly referred to as SBFD slots/symbol and non-full-duplex slots/symbols and normal DL or UL slot/symbols may be referred to as non-SBFD slots/symbols.

Instead of using a single carrier, different component carriers (CCs) can be used for receptions and transmissions by a UE. For example, receptions by a UE can occur on a first CC and transmissions by the UE occur on a second CC having a small, including zero, frequency separation from the first CC.

Furthermore, a gNB can operate with FD mode even when a UE still operates in half-duplex mode, such as when the UE can either transmit and receive at a same time, or the UE can also be capable for FD operation.

FD transmission/reception is not limited to gNBs, TRPs, or UEs, but can also be used for other types of wireless nodes such as relay or repeater nodes.

Full duplex operation needs to overcome several challenges in order to be functional in actual deployments. When using overlapping frequency resources, received signals are subject to co-channel CLI and self-interference. CLI and self-interference cancellation methods include passive methods that rely on isolation between transmit and receive antennas, active methods that utilize RF or digital signal processing, and hybrid methods that use a combination of active and passive methods. Filtering and interference cancellation may be implemented in RF, baseband (BB), or in both RF and BB. While mitigating co-channel CLI may require large complexity at a receiver, it is feasible within current technological limits. Another aspect of FD operation is the mitigation of adjacent channel CLI because in several cellular band allocations, different operators have adjacent spectrum.

Throughout the disclosure, the term Full-Duplex (FD) is used as a short form for a full-duplex operation in a wireless system. The terms 'cross-division-duplex' (XDD), 'full duplex' (FD) and 'subband-full-duplex' (SBFD) may be used interchangeably in the disclosure.

FD operation in NR can improve spectral efficiency, link robustness, capacity, and latency of UL transmissions. In an NR TDD system, transmissions from a UE are limited by fewer available transmission opportunities than receptions by the UE. For example, for NR TDD with SCS=30 kHz, DDDU (2 msec), DDDSU (2.5 msec), or DDDDDDDSUU (5 msec), the UL-DL configurations allow for an DL:UL ratio from 3:1 to 4:1. Any transmission from the UE can only occur in a limited number of UL slots, for example every 2, 2.5, or 5 msec, respectively.

For a single carrier TDD configuration with FD enabled, slots denoted as X are FD slots. Both DL and UL transmissions can be scheduled in FD slots for at least one or more symbols. The term FD or the term SBFD slot is used to refer to a slot where UEs can simultaneously receive and transmit in at least one or more symbols of the slot if scheduled or assigned radio resources by the base station. A half-duplex UE cannot transmit and receive simultaneously in a FD or SBFD slot or on a FD or SBFD symbol of a FD slot. When a half-duplex UE is configured for transmission in symbols of a FD slot, another UE can be configured for reception in the symbols of the FD slot. A FD UE can transmit and receive simultaneously in symbols of a FD slot in presence of other UEs with resources for either receptions or transmissions in the symbols of the FD slot. Transmissions by a UE in a first FD slot can use same or different frequency-domain resources than in a second FD slot, wherein the resources can differ in bandwidth, a first RB, or a location of the center carrier.

For a carrier aggregation TDD configuration with FD enabled, a UE receives in a slot on CC #1 and transmits in at least one or more symbols of the slot on CC #2. In addition to D slots used only for transmissions/receptions by a gNB/UE, U slots used only for receptions/transmissions by the gNB/UE, and S slots that are used for both transmission and receptions by the gNB/UE and also support DL-UL switching, FD slots with both transmissions/receptions by a gNB or a UE that occur on same time-domain resources, such as slots or symbols, are labeled by X. For the example of TDD with SCS=30 kHz, single carrier, and UL-DL allocation DXXSU (2.5 msec), the second and third slots allow for FD operation. Transmissions from a UE can also occur in a last slot (U) where the full UL transmission bandwidth is available. FD slots or symbol assignments over a time period/number of slots can be indicated by a DCI format in a PDCCH reception and can then vary per unit of the time period, or can be indicated by higher layer signaling, such as via a MAC CE or RRC.

In the following and throughout the disclosure, various embodiments of the disclosure may be also implemented in any type of UE including, for example, UEs with the same, similar, or more capabilities compared to common 5G NR UEs. Although various embodiments of the disclosure discuss 3GPP 5G NR communication systems, the embodiments may apply in general to UEs operating with other RATs and/or standards, such as next releases/generations of 3GPP, IEEE WiFi, and so on.

In the following, unless otherwise explicitly noted, providing a parameter value by higher layers includes providing the parameter value by a system information block (SIB), such as a SIB1, or by a common RRC signaling, or by UE-specific RRC signaling.

In the following, for brevity of description, the higher layer provided TDD UL-DL frame configuration refers to tdd-UL-DL-ConfigurationCommon as example for RRC common configuration and/or tdd-UL-DL-Configuration-Dedicated as example for UE-specific configuration. The UE determines a common TDD UL-DL frame configuration of a serving cell by receiving a SIB such as a SIB1 when accessing the cell from RRC_IDLE or by RRC signaling when the UE is configured with an SCell or additional SCGs by an IE ServingCellConfigCommon in RRC_CONNECTED. The UE determines a dedicated TDD UL-DL frame configuration using the IE ServingCellConfig when the UE is configured with a serving cell, e.g., add or modify, where the serving cell may be the SpCell or an SCell of an MCG or SCG. A TDD UL-DL frame configuration designates a slot or symbol as one of types 'D', 'U' or 'F' using at least one time-domain pattern with configurable periodicity.

In the following, for brevity of description, SFI refers to a slot format indicator as example that is indicated using higher layer provided IEs such as slotFormatCombination or slotFormatCombinationsPerCell and which is indicated to the UE by group common DCI format such as DCI F2_0 where slotFormats are defined in REF3.

In the following, for brevity of description, the parameter/IE 'fd-config' is used to describe the configuration and parameterization for UE determination of receptions and/or transmissions in a serving cell supporting full-duplex operation. For example, the UE may be provided with the set of RBs or set of symbols of a SBFD UL or DL subband. It is not necessary that the use of full-duplex operation by a gNB in the serving cell when scheduling to a UE receptions and/or transmissions in a slot or symbol is identifiable by or known to the UE. For example, parameters associated with the parameter 'fd-config' may include a set of time-domain resources, e.g., symbols/slots, where receptions or transmissions by the UE are allowed, or disallowed; a range or a set of frequency-domain resources, e.g., serving cells, BWPs, start and/or end or a set of RBs, where receptions or transmissions by the UE are allowed, or disallowed; one or multiple guard intervals for time and/or frequency domain radio resources during receptions or transmissions by the UE, e.g., guard SCs or RBs, guard symbols; one or multiple resource types, e.g., 'simultaneous Tx-Rx', 'Rx only', or 'Tx only' or 'D', 'U', 'F', 'N/A'; one or multiple scheduling behaviors, e.g., "DG only", "CG only", "any". Configuration and/or parameters associated with the fd-config may include indications or values to determine Tx power settings of receptions by the UE, such as, reference power, energy per resource element (EPRE), or power offset of a designated channel/or signal type transmitted by a serving gNB; to determine the power and/or spatial settings for transmissions by the UE. Configuration and/or parameters associated with the fd-config may be provided to the UE using higher layer signaling, DCI-based signaling, and/or MAC CE based signaling. For example, configuration and/or parameters associated with fd-config may be provided to the UE by means of common RRC signaling using SIB or by UE-dedicated RRC signaling such as ServingCellConfig. For example, configuration and/or parameters associated with fd-config may be provided to the UE using an RRC-configured TDRA table, or a PDCCH, PDSCH, PUCCH or PUSCH configuration, and/or DCI-based signaling that indicates to the UE a configuration for the UE to apply.

When considering mTRP operation for uplink channels in a full-duplex wireless communication system, several issues related to limitations and drawbacks of existing technology need to be overcome. A first issue relates to type of slots or symbols (e.g., SBFD slots/symbols or normal slots/symbols) used for retransmission of PUSCH and PUCCH. For example, whether to limit the retransmission of PUSCH or PUCCH to slots and symbols of the same type, or evaluate slots/symbols of different types when transmitting PUSCH or PUCCH. This disclosure considers different design options for the PUSCH and PUCCH symbols and slots.

A second issue arises when PUSCH or PUCCH is transmitted to a first TRP on uplink resources (e.g., RBs or REs) and the second TRP has overlapping non-uplink (e.g., downlink) resources (e.g., RBs or REs), in some scenarios proceeding with the transmission on the first TRP, can cause interference to DL transmissions from the other TRP. Hence, a solution is to mitigate this interference.

A third issue arises when PUSCH or PUCCH transmission to a first TRP occurs in transmission occasions that include non-uplink (e.g., downlink) resources (e.g., RBs or REs). This transmission can be dropped or postponed to a later slot or transmitted to the other TRP, if the corresponding resources (e.g., RBs or REs) of the other TRP are uplink resources (e.g., RBs or REs).

In this disclosure, various design options are provided for these three issues.

The present disclosure relates to a 5G/NR communication system.

This disclosure considers design aspects related to UL multi-TRP operation for full duplex systems. The following aspects are considered.

- The type of occasion used for a repetition of an UL transmission (e.g., PUCCH or PUSCH).
- Handling overlap of UL transmissions on a first TRP with non-UL resources (e.g., RBs or REs) on a second TRP.
- Handling UL transmission occasions with non-UL resources (e.g., RBs or REs).

Terminology such as TCI, TCI states, SpatialRelationInfo, target RS, reference RS, and other terms is used for illustrative purposes and is therefore not normative. Other terms that refer to same functions can also be used. A "reference RS" corresponds to a set of characteristics of a DL RX beam or an UL TX beam, such as a direction, a precoding/beamforming, a number of ports, and so on. A beam may also be referred to as spatial filter or spatial setting and be associated with a TCI state for quasi co-location (QCL) properties.

In this disclosure, a slot or a symbol can be configured as (1) a normal UL slot or symbol, (2) a normal DL slot or symbol, or (3) SBFD slot or symbol. A normal UL slot or symbol can have UL resources, e.g., UL resource elements (REs) or UL resource blocks (RBs). A normal DL slot or symbol can have DL resources, e.g., DL REs or DL RBs. A SBFD slot or symbol can have at least, (1) UL resources, e.g., UL REs or UL RBs and (2) DL resources, e.g., DL REs or DL RBs. In one example, a SBFD slot or symbol can have flexible resources, e.g., flexible REs or flexible RBs.

In this disclosure, a non-UL resource can be a resource configured as a DL resource and/or a flexible resource, where a resource can be a resource element (RE) or a resource block (RB). A non-UL RB can be a RB configured as a DL RB and/or a flexible RB. A non-UL RE can be a RE configured as a DL RE and/or a flexible RE.

In one example, SBFD configuration is performed at a slot level. In one example, SBFD configuration is performed at a symbol level. In one example, SBFD configuration is performed at a slot level and symbol level.

In this disclosure a PUSCH repetition can be: (1) PUSCH repetition Type A, and/or (2) PUSCH repetition Type B.

A cell may include more than one transmission/reception point (TRP). In one example, a TRP may be identified by a CORESETPOOLIndex associated with CORESETs for PDCCH receptions. In one example, a TRP may be identified by a group (e.g., one or more) SS/PBCH blocks (SSBs). For example, a first group or set of SSBs belong to or determine or identify a first TRP, a second group or set of SSBs belong to or determine or identify a second TRP, and so on. In one example, a TRP may be identified by a group (e.g., one or more) channel state information reference signal (CSI-RS) resources or CSI-RS resource sets. For example, a first group or set of CSI-RS resources or CSI-RS resource sets belong to or determine or identify a first TRP, a second group or set of CSI-RS resources or CSI-RS resource sets belong to determine or identify a second TRP, and so on. In one example, a TRP may be identified by a group (e.g., one or more) antenna ports. For example, a first group or set of antenna ports belong to or determine or identify a first TRP, a second group or set of antenna ports belong to determine or identify a second TRP, and so on. In one example, a TRP is identified or determined following one or more of the previous examples. In one example, a TRP may be identified by a group (e.g., one or more) sounding reference signal (SRS) resources or SRS resource sets. For example, a first group or set of SRS resources or SRS resource sets belong to or determine or identify a first TRP, a second group or set of SRS resources or SRS resource sets belong to or determine or identify a second TRP, and so on. In one example, a TRP may be identified by a group (e.g., one or more) TCI states (UL TCI states or DL TCI states or Joint TCI states or TCI state codepoints). For example, a first group or set of TCI states belong to or determine or identify a first TRP, a second group or set of TCI states belong to or determine or identify a second TRP, and so on.

A UE (e.g., the UE 116) may be provided with a SBFD configuration to determine receptions and/or transmissions on a serving cell supporting full-duplex operation. For example, the UE may be provided with a set of RBs or a set of symbols for a SBFD UL or DL subband on a symbol or in a slot (frequency domain resources). For example, the UE may be provided with a set of symbols or slots for a SBFD subband (time domain resources). In one example, the SBFD configuration applies to TRPs in the cell. In one example, the SBFD configurations are separately provided for each TRP in the cell. In one example, a common SBFD configuration is provided for a cell and an additional delta configuration is separately provided for each TRP in the cell, wherein the delta configuration can include additional frequency/time domain resources to be added to the common configuration and/or excluded frequency/time domain resources to be excluded from the common configuration. In one example, the SBFD configurations are separately provided for each TRP in the cell. In one example, a common SBFD configuration is provided for a first TRP of the cell and an additional delta configuration is provided for each other TRP in the cell, wherein the delta configuration can include additional frequency/time domain resources to be added to the common configuration and/or excluded frequency/time domain resources to be excluded from the common configuration. A SBFD configuration may be provided by higher layer, e.g., RRC, or may be indicated based on DCI and/or MAC-CE signaling. A combination of SBFD configuration based on higher layer parameters and indication through DCI and/or MAC-CE signaling may be used. The UE may determine a SBFD configuration for a symbol or a slot or a set of symbols or a set of slots using higher layer parameter(s) provided for a SBFD configuration and based on reception or transmission conditions such as a slot type 'D', 'U', or 'F'.

A SBFD configuration may provide a set of time-domain resources, e.g., symbols/slots, where receptions or transmissions by the UE are allowed, or disallowed. In one example, the time-domain resources are same (e.g., common) for TRPs as mentioned herein. In another example, the time-domain resources can be different for each TRP, as mentioned herein. A SBFD configuration may provide a range or a set of frequency-domain resources, e.g., serving cell, BWP, start and/or end or a set of RBs, where receptions or transmissions by the UE are allowed, or disallowed. In one example, the frequency-domain resources are same (e.g., common) to TRPs as mentioned herein. In another example, the frequency-domain resources can be different for each TRP, as mentioned herein. A SBFD configuration may provide one or multiple guard intervals or guard RBs for time and/or frequency domain radio resources during receptions or transmissions by the UE, e.g., guard SCs or RBs, guard symbols, wherein the provided SBFD configuration may be same or different for each TRP as mentioned herein. A SBFD configuration may be provided based on one or multiple resource types such as non-SBFD symbol' or 'SBFD symbol', or 'simultaneous Tx-Rx', 'Rx only', 'Tx only' or 'D', 'U', 'F', 'N/A'.

A SBFD configuration may be associated with one or multiple scheduling behaviors, e.g., for "dynamic grant", for "configured grant", for "any". A SBFD configuration and/or parameters associated with a SBFD configuration may include indications or values to determine Tx power settings of receptions by the UE, such as, reference power, energy per resource element (EPRE), or power offset of a designated channel/or signal type transmitted by a serving gNB; to determine the power and/or spatial settings for transmissions by the UE. In one example, the SBFD configuration and/or parameters associated with the SBFD configuration are same for TRPs. In one example, the SBFD configuration and/or parameters associated with the SBFD configuration can be TRP specific following the one or more configuration examples described herein.

A SBFD configuration and/or parameters associated with the SBFD configuration may be provided to the UE using higher layer signaling such as via RRC, DCI-based signaling, and/or MAC CE based signaling.

For example, a SBFD configuration and/or parameters associated with the SBFD configuration may be provided to the UE by means of common RRC signaling using SIB or be provided by UE-dedicated RRC signaling such as ServingCellConfig. For example, a SBFD configuration and/or parameters associated with the SBFD configuration may be provided to the UE using an RRC-configured TDRA table, or a PDCCH, PDSCH, PUCCH or PUSCH configuration, and/or DCI-based signaling that can indicate to the UE a configuration or allow the UE to determine a SBFD configuration on a symbol or slot.

Figure 15:
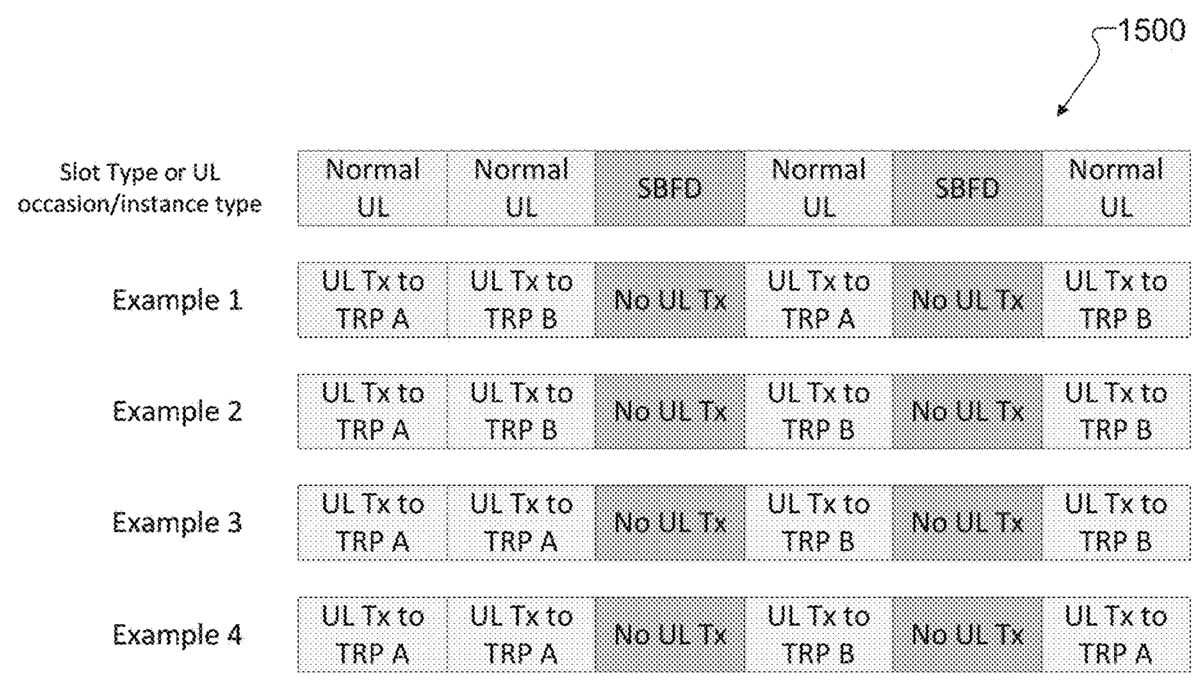
FIG. 15 illustrates a diagram of example uplink (UL) repetitions for transmission according to embodiments of the present disclosure.

FIG. 15 illustrates a diagram of example UL repetitions 1500 for transmission according to embodiments of the present disclosure. For example, UL repetitions 1500 for transmission can be implemented by the UE 111 of FIG. 1. This example is for illustration only and other embodiments can be used without departing from the scope of the present disclosure.

For example, the UE may be provided with information for a SBFD subband configuration such as a SBFD UL subband in one or more SBFD symbols by higher layer signaling. For example, a frequency-domain location and a size or a frequency-domain occupancy of the SBFD subband may be provided to the UE by means of indicating or assigning a start RB and an allocation bandwidth, or based on a resource indicator value (RIV), or a number of RBs, or a bitmap. A SBFD subband configuration may be provided to the UE with respect to a common resource block (CRB) grid. A SBFD subband configuration may be provided to the UE with respect to a UE BWP configuration, e.g., excluding resource blocks (RBs) in an NR carrier BW that are not within a configured or an active UE BWP. A SBFD subband configuration may be provided based on a reference RB and/or based on a reference SCS. The UE may be provided with information for a SBFD subband configuration such as a SBFD DL subband in a SBFD slot or symbol by higher layer signaling. For example, a frequency-domain location and a size or a frequency-domain occupancy of a SBFD DL subband may be provided to the UE by means of indicating or assigning a start RB and an allocation bandwidth, or an RIV value, or a number of RBs, or a bitmap, separately from a configuration provided to the UE for a SBFD UL subband. A SBFD DL subband configuration may be provided to the UE with respect to a CRB grid, or with respect to a UE BWP configuration. A SBFD DL subband configuration may be provided based on an indicated reference RB and/or based on a reference SCS. There may be multiple SBFD DL subband configurations in a SBFD symbol or slot. If multiple SBFD DL subband configurations are provided for a SBFD symbol or slot, the SBFD DL subbands may be non-contiguous. For example, two SBFD DL subband configurations may be provided to the UE for a SBFD symbol by higher layers. A same SBFD DL subband configuration or a same SBFD UL subband configuration may be provided for multiple symbols or slots, or different symbols or slots may be indicated or assigned separate SBFD DL subband and/or SBFD UL subband configurations, respectively.

For example, a SBFD configuration and/or parameters associated with the SBFD configuration may be provided to the UE using tdd-UL-DL-ConfigurationCommon as example for RRC common configuration and/or tdd-UL-DL-ConfigurationDedicated as example for UE-specific configuration. The UE may determine a SBFD configuration based on a common TDD UL-DL frame configuration of a serving cell by receiving a SIB such as a SIB1 when accessing the cell from RRC_IDLE/INACTIVE or by RRC signaling when the UE is configured with an SCell or additional SCGs by an information element (IE) ServingCellConfigCommon in RRC_CONNECTED. The UE may determine a SBFD configuration based on a dedicated TDD UL-DL frame configuration using the IE ServingCellConfig when the UE is configured with a serving cell, e.g., add or modify, where the serving cell may be the SpCell or an SCell of an MCG or SCG. A TDD UL-DL frame configuration can designate a slot or symbol as one of types 'D', 'U' or 'F' using at least one time-domain pattern with configurable periodicity.

In one example, with reference to FIG. 15, the PUSCH or PUCCH is transmitted in normal UL slots or symbols. If a symbol of a PUSCH or PUCCH repetition instance is not a normal UL symbol, the PUSCH or PUCCH repetition is not transmitted. Without any loss of generality, a first TRP is TRP A and a second TRP is TRP B. The role of TRP A and TRP B can be reversed.

With reference to FIG. 15, several examples of UL repetitions is shown. In one example of FIG. 15, an UL transmission is a PUSCH. In another example of FIG. 15, an UL transmission is PUCCH. In one example, FIG. 15, a time unit can be a slot. In one example of FIG. 15, a time unit can be an PUSCH or PUCCH transmission occasion or repetition instance (for example, this can be a sub-slot or multiple slots/super-slot). In one example of FIG. 15, a transmission to TRP A uses a spatial relation associated with TRP A, e.g., a spatial relation from a first SRS resource set, wherein the first SRS resource set is associated with TRP A. A transmission to TRP B uses a spatial relation associated with TRP B, e.g., a spatial relation from a second SRS resource set, wherein the second SRS resource set is associated with TRP B. In one example of FIG. 15, a transmission to TRP A uses a TCI state (e.g., UL TCI state or Joint TCI state) associated with TRP A. A transmission to TRP B uses a TCI state (e.g., UL TCI state or Joint TCI state) associated with TRP B.

In example 1 of FIG. 15, a mapping pattern can be cyclic mapping, and a time unit for transmission that is not normal UL is skipped and does not count for subsequent transmissions of repetitions, as a result the transmission pattern of repetitions shifts by 1 due to no transmission in a time unit. In example 1, the first transmission is to TRP A. The next available time unit that is a normal uplink is to TRP B. The next available time unit that is normal UL is to TRP A, and so on. In Example 1, the third time unit is SBFD, so it is skipped. The next transmission is on the fourth time unit, and this is to TRP A, as the last time unit with transmission (second time unit) is to TRP B. The fifth time unit is SBFD, so it is skipped. The next transmission is on the sixth time unit, and this is to TRP B, as the last time unit with a transmission (fourth time unit) is to TRP A. A cyclic pattern alternates between TRP A and TRP B.

In example 2 of FIG. 15, a mapping pattern can be cyclic mapping and a time unit for transmission that is not normal UL is punctured. Subsequent transmissions expect that a transmission occurred in a time unit that is not normal UL for the purpose of determining which TRP a transmission is to, as a result the transmission pattern of repetitions is not impacted by SBFD time units. In example 2, the first transmission is to TRP A. The next time unit is assumed to be to TRP B, whether or not there is a transmission in that time unit depends on the time unit type. The next time is assumed to be to TRP A, whether or not there is a transmission or not in that time unit depends on the time unit type, and so on. In Example 2, the third time unit is assumed for transmission TRP A, however as this time unit is SBFD there is no transmission. The fourth time unit is assumed to be for transmission to TRP B and, as this time unit is normal UL, there is a transmission to TRP B. The fifth time unit is assumed to be for transmission to TRP A, however as this time unit is SBFD there no transmission. The sixth time unit is assumed to be for transmission to TRP B and, as this time unit is normal UL, there is a transmission to TRP B. A cyclic pattern alternates between TRP A and TRP B.

In example 3 of FIG. 15, a mapping pattern can be sequential mapping and a time unit for a transmission that is not normal UL is skipped and not count for subsequent transmissions. As a result, the transmission pattern for the repetitions shifts by 1 due to no transmission in a time unit. In example 3, the first transmission is to TRP A. The next available time unit that is a normal uplink is also associated with TRP A (two transmissions to TRP A before switching to TRP B). The next available time unit that is normal UL is associated with TRP B. The next available time unit that is normal UL is also associated with TRP B, the transmission switches back to TRP A, and so on. In Example 3, the third time unit is SBFD, so it is skipped, and the next transmission is on the fourth time unit and is to TRP B, as the last 2 time units with transmission (first and second time units) are to TRP A. The fifth time unit is SBFD, so it is skipped. The next transmission is on the sixth time unit and is also to TRP B, as the last time unit with transmission (fourth time unit) is to TRP B and before that the transmission was to TRP A. A sequential pattern of repetitions has two transmissions to TRP A and then two transmissions to TRP B and then two transmissions to TRP A and so on.

In example 4 of FIG. 15, a mapping pattern can be sequential mapping, and a time unit for a transmission that is not normal UL is punctured, subsequent transmissions expect that a transmission occurred in a time unit that is not normal UL for the purpose of determining which TRP a transmission is to, as a result the transmission pattern for repetitions is not impacted by SBFD time units. In example 4, the first transmission is to TRP A. The next time unit is assumed to be also to TRP A (two transmissions to TRP A before switching to TRP B). The next time unit is assumed to be to TRP B. The next time unit is assumed also to be to TRP B, the transmission switches back to TRB A, and so on. In Example 4, the third time unit is assumed to be associated with TRP B (first assumed transmission), however as this time unit is SBFD there no transmission. The fourth time unit is assumed to be associated with TRP B (second assumed transmission), as this time unit is normal UL there is a transmission to TRP B. The fifth time unit is assumed to be associated with TRP A (first assumed transmission), however as this time unit is SBFD there no transmission. The sixth time unit is assumed to be associated with TRP A (second assumed transmission), as this time unit is normal UL there is a transmission to TRP A. A sequential pattern for repetitions has two transmissions to TRP A and then two transmissions to TRP B and then two transmissions to TRP A and so on.

In one example, a number of repetitions for UL transmissions (e.g., PUSCH or PUCCH) is configured or updated by higher layer signaling (e.g., common SIB signaling and/or UE dedicated RRC signaling). In one example, the number of repetitions for UL transmissions (e.g., PUSCH or PUCCH) can be updated by dynamic signaling e.g., MAC CE signaling and/or L1 control signaling. In one example, the number of repetitions for UL transmissions (e.g., PUSCH or PUCCH) is the number of transmissions occasions (e.g., slots, sub-slots, super slots) or repetition instances in which the UL transmissions can occur, regardless of whether or not a transmission actually occurs due to other considerations, such due to prioritization of overlapping transmissions. In a further example, the UL transmission occasions, or repetition instances can be contiguous in time. In one example, the number of repetitions for UL transmissions (e.g., PUSCH or PUCCH) is the number of actual transmissions (e.g., skipped transmission occasions are not counted).

In a further example, the number repetitions to TRP A is equal to the number of repetitions to TRP B. e.g., half the configured number of repetitions is to TRP A, and the other half number of repetitions is to TRP B.

In one example, the redundancy version for repetitions is determined separately for each TRP. In a further example, an offset for the redundancy is configured for the second TRP (e.g., TRP B). In one example, the redundancy version is not updated for skipped or punctured occasions. In one example, the redundancy version is updated for skipped or punctured occasions.

In one example, the redundancy version for repetitions is determined jointly for both TRPs. For example, the redundancy version is updated after an occasion associated with either TRP, and updated redundancy version can be used for the other TRP. In one example, the redundancy version is not updated for skipped or punctured occasions. In one example, the redundancy version is updated for skipped or punctured occasions.

Figure 16:
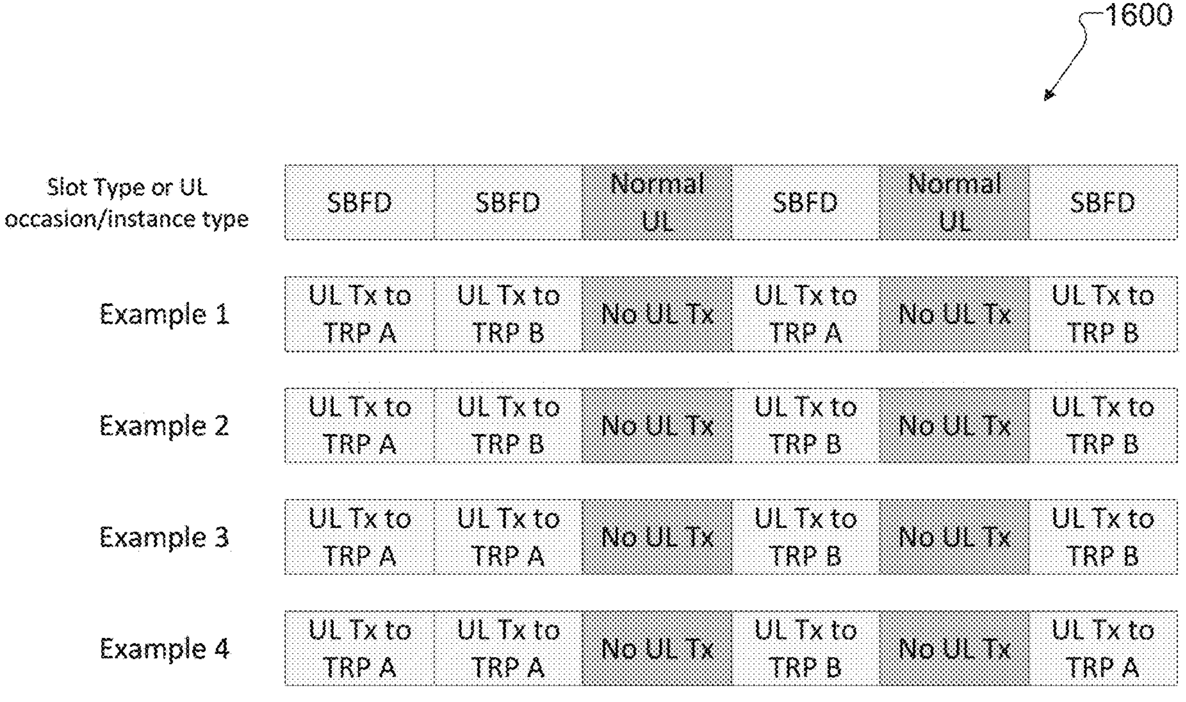
FIG. 16 illustrates a diagram of example UL repetitions for transmission according to embodiments of the present disclosure.

FIG. 16 illustrates a diagram of example UL repetitions 1600 for transmission according to embodiments of the present disclosure. For example, UL repetitions 1600 for transmission can be implemented by the UE 112 of FIG. 1. This example is for illustration only and other embodiments can be used without departing from the scope of the present disclosure.

With reference to FIG. 16, in one example, the PUSCH or PUCCH is transmitted in SBFD slots or symbols. If a symbol of a PUSCH or PUCCH repetition instance is not a SBFD symbol, the PUSCH or PUCCH is not transmitted. Without any loss of generality, a first TRP is TRP A and a second TRP is TRP B. The role of TRP A and TRP B can be reversed.

The same description associated with FIG. 15 applies to FIG. 16, but SBFD is replaced by "Normal UL" and "Normal UL" is replaced by SBFD.

Figure 17:
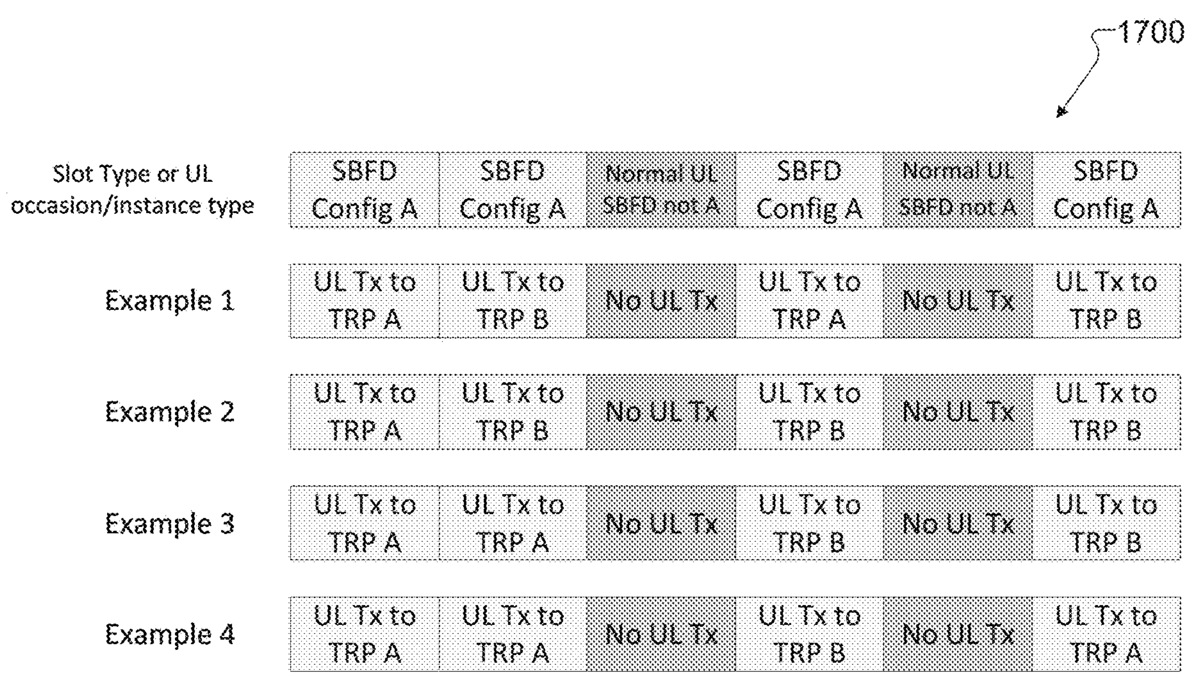
FIG. 17 illustrates a diagram of example UL repetitions for transmission according to embodiments of the present disclosure.

FIG. 17 illustrates a diagram of example UL repetitions 1700 for transmission according to embodiments of the present disclosure. For example, UL repetitions 1700 for transmission can be implemented by the UE 113 of FIG. 1. This example is for illustration only and other embodiments can be used without departing from the scope of the present disclosure.

With reference to FIG. 17, in one example, the PUSCH or PUCCH is transmitted in SBFD slots or symbols with config A. If a symbol of a PUSCH or PUCCH repetition instance is not a SBFD symbol of config A (e.g., Normal UL or SBFD other than config A), the PUSCH or PUCCH is not transmitted. Without any loss of generality, a first TRP is TRP A and a second TRP is TRP B. The role of TRP A and TRP B can be reversed.

The same description associated with FIG. 15 applies to FIG. 17, but SBFD is replaced by "Normal UL or SBFD other than config A" and "Normal UL" is replaced by "SBFD config A". Config A can refer to frequency domain SBFD configuration.

In one example, the first instance of an UL transmission (e.g., PUSCH or PUCCH) determines the type of the remaining repetitions of the UL transmission.

- For example, with reference to FIG. 15, if the first UL transmission is in an UL normal symbol or slot, the remaining repetitions of the UL transmission are in normal UL symbols or slots is shown.
- For example, with reference to FIG. 16, if the first UL transmission is in a SBFD symbol or slot, the remaining repetitions of the UL transmission are in SBFD symbols or slots as shown.
- For example, with reference to FIG. 17, if the first UL transmission is in a SBFD symbol or slot of config A, the remaining repetitions of the UL transmission are in SBFD symbols or slots of config A as shown. Config A can refer to frequency domain SBFD configuration.

In one example, the transmission to TRP A is in normal UL symbol or slot, and the transmission to TRP B is in a SBFD symbol or slot. The same description associated with FIG. 15 can apply, but for transmissions to TRP B, SBFD is replaced by "Normal UL" and "Normal UL" is replaced by SBFD.

In one example, the transmission to TRP A is in a normal UL symbol or slot, and the transmission to TRP B is in a SBFD symbol or slot of config A. The same description associated with FIG. 15 can apply, but for transmissions to TRP B, SBFD is replaced by "Normal UL or SBFD other than config A" and "Normal UL" is replaced by "SBFD config A". Config A can refer to frequency domain SBFD configuration.

In one example, the transmission to TRP A is in SBFD symbol or slot of config B, and the transmission to TRP B is in a SBFD symbol or slot of config A. The same description associated with FIG. 15 can apply, but for transmissions to TRP A, SBFD is replaced by "Normal UL or SBFD other than config B" and "Normal UL" is replaced by "SBFD config B". For transmissions to TRP B, SBFD is replaced by "Normal UL or SBFD other than config A" and "Normal UL" is replaced by "SBFD config A".

In one example, the transmission to TRP B is in a normal UL symbol or slot, and the transmission to TRP A is in a SBFD symbol or slot. The same description associated with FIG. 15 can apply, but for transmissions from TRP A, SBFD is replaced by "Normal UL" and "Normal UL" is replaced by SBFD.

In one example, the transmission to TRP B is in a normal UL symbol or slot, and the transmission to TRP A is in a SBFD symbol or slot of config A. The same description associated with FIG. 15 can apply, but for transmissions to TRP A, SBFD is replaced by "Normal UL or SBFD other than config A" and "Normal UL" is replaced by "SBFD config A". Config A can refer to frequency domain SBFD configuration.

In one example, the first instance of an UL transmission (e.g., PUSCH or PUCCH) to TRPx (e.g., x can be A or B) determines the type of the remaining repetitions of the UL transmission to TRPx, where the Type can be (1) normal UL, (2) SBFD, (3) SBFD of config A, (4) SBFD of config B.

In one example, the type of slots or symbols to use for UL repartitioning instances to TRP A and/or TRP B can be defined in the specifications and/or configured and/or updated by RRC signaling (common e.g., SIB, or UE dedicated), and/or MAC CE signaling and/or L1 control (e.g., DCI) signaling. In one example, the values configured can include one or more of: 1) normal UL, (2) SBFD, (3) SBFD of config A, (4) SBFD of config B, (5) follow slot or symbol type of first transmission, (6) follow slot or symbol type of first transmission of corresponding TRP.

In one example, a first number of repetitions, N1, for UL transmissions (e.g., PUSCH or PUCCH) for normal UL transmission occasions is configured or updated by higher layer signaling (e.g., common SIB signaling and/or UE dedicated RRC signaling). In one example, the first number of repetitions for UL transmissions (e.g., PUSCH or PUCCH) can be further updated by dynamic signaling e.g., MAC CE signaling and/or L1 control signaling. In one example, the first number of repetitions for UL transmissions (e.g., PUSCH or PUCCH) is the number of transmissions occasions (e.g., slots, sub-slots, super slots) or repetition instances in which the UL transmissions can be transmitted in normal UL occasions, regardless of whether or not they are actually transmitted due to other considerations such as prioritization of overlapping transmissions. In a further example, the UL transmission occasions, or repetition instances can be for the first (in time) N1 transmission occasions. In one example, the first number of repetitions for UL transmissions (e.g., PUSCH or PUCCH) is the number of actual transmissions for normal UL occasions (e.g., skipped transmission occasions are not counted).

In one example, a second number of repetitions, N2, for UL transmissions (e.g., PUSCH or PUCCH) for SBFD transmission occasions is configured or updated by higher layer signaling (e.g., common SIB signaling and/or UE dedicated RRC signaling). In one example, the second number of repetitions for UL transmissions (e.g., PUSCH or PUCCH) can be further updated by dynamic signaling e.g., MAC CE signaling and/or L1 control signaling. In one example, the second number of repetitions for UL transmissions (e.g., PUSCH or PUCCH) is the number of transmissions occasions (e.g., slots, sub-slots, super slots) or repetition instances in which the UL transmissions can be transmitted in SBFD occasions, regardless of whether or not they are actually transmitted due to other considerations such as prioritization of overlapping transmissions. In a further example, the UL transmission occasions, or repetition instances can be for the first (in time) N2 transmission occasions. In one example, the second number of repetitions for UL transmissions (e.g., PUSCH or PUCCH) is the number of actual transmissions for SBFD occasions (e.g., skipped transmission occasions are not counted).

In a further example, N2 can be the number of repetitions, for UL transmissions (e.g., PUSCH or PUCCH) for SBFD transmission occasions with config A.

In a further example, N2 can be the number of repetitions, for UL transmissions (e.g., PUSCH or PUCCH) for SBFD transmission occasions with config B.

In one example, when a UE is configured with/indicated N1 repetitions for UL transmissions (e.g., PUSCH or PUCCH) for a first set of symbols or slots and N2 repetitions for UL transmissions (e.g., PUSCH or PUCCH) for a second set of symbol or slots, the UE repeats the UL transmissions (e.g., PUSCH or PUCCH) N1 times on the first set of symbols or slots and N2 times on the second set of symbols or slots.

In one example, when a UE is configured with/indicated N1 repetitions for UL transmissions (e.g., PUSCH or PUCCH) for a first set of symbols or slots and N2 repetitions for UL transmissions (e.g., PUSCH or PUCCH) for a second set of symbol or slots, the UE repeats the UL transmissions (e.g., PUSCH or PUCCH) until one of the following conditions is satisfied (1) N1 times on the first set of symbols or slots or (2) N2 times on the second set of symbols or slots.

In one example, when a UE is configured with/indicated N1 repetitions for UL transmissions (e.g., PUSCH or PUCCH) for a first set of symbols or slots and N2 repetitions for UL transmissions (e.g., PUSCH or PUCCH) for a second set of symbol or slots, the UE repeats the UL transmissions (e.g., PUSCH or PUCCH) until at least the N1 times repetitions on the first set of slots is satisfied.

In one example, when a UE is configured with/indicated N1 repetitions for UL transmissions (e.g., PUSCH or PUCCH) for a first set of symbols or slots and N2 repetitions for UL transmissions (e.g., PUSCH or PUCCH) for a second set of symbol or slots, the UE repeats the UL transmissions (e.g., PUSCH or PUCCH) until at least the N2 times repetitions on the second set of slots is satisfied.

In one example, the redundancy version can be common across normal UL occasions and SBFD occasions, and separate redundancy versions are used for each TRP.

In one example, the redundancy version can be common across normal UL occasions and SBFD occasions, and a joint or common redundancy version is used for both TRPs.

In one example, the redundancy version can be separate across normal UL occasions and SBFD occasions, and separate redundancy versions are used for each TRP.

In one example, the redundancy version can be separate across normal UL occasions and SBFD occasions, and a joint or common redundancy version is used for both TRPs.

Figure 18:
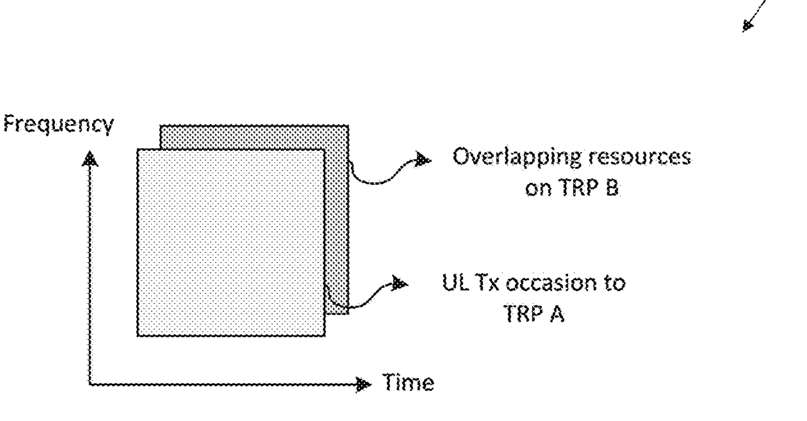
FIG. 18 illustrates a timeline for example UL transmissions according to embodiments of the present disclosure.

FIG. 18 illustrates a timeline 1800 for example UL transmissions according to embodiments of the present disclosure. For example, timeline 1800 for UL transmissions can be followed by the UE 114 of FIG. 1. This example is for illustration only and other embodiments can be used without departing from the scope of the present disclosure.

In one example, a first TRP (e.g., TRP A) and second TRP (e.g., TRP B) can have different SBFD configurations.

- In one example, a normal UL symbol or slot on TRP A overlaps a normal UL symbol or slot on TRP B.
- In one example, a SBFD symbol or slot on TRP A overlaps a SBFD symbol or slot on TRP B, and the SBFD configurations (e.g., in frequency domain) are same.
- In one example, a SBFD symbol or slot on TRP A overlaps a SBFD symbol or slot on TRP B, and the SBFD configurations (e.g., in frequency domain) can be different.
- In one example, a normal UL symbol or slot on TRP A overlaps a SBFD symbol or slot on TRP B.
- In one example, a SBFD symbol or slot on TRP A overlaps a normal UL symbol or slot on TRP B.

With reference to FIG. 18, an example of a UL transmission (e.g., PUSCH or PUCCH) to TRP A is shown. For example, this can be a repetition instance of the corresponding UL channel (e.g., PUSCH or PUCCH). The transmission occasion to TRP A overlaps with resources (e.g., slots, symbols, REs or RBs) on TRP B, wherein:

1. TRP B can be in symbol or slot of a different SBFD Type then that of TRP A.
2. TRP B can be in symbol or slot of a different SBFD configuration then that of TRP A.
3. TRP B can include non-uplink (e.g., downlink) resource(s) (e.g., RB(s) or RE(s)) that overlap the transmission occasion to TRP A.

In one example, an UL transmission (e.g., PUSCH or PUCCH) is to TRP A in a transmission occasion e.g., uses a spatial relation associated with TRP A or a TCI state (UL TCI state or TCI state) associated with TRP A. The transmission occasion is in a normal UL symbol or slot on TRP A. In TRP B, the overlapping resources (e.g., RBs or REs) are in a SBFD symbol or slot. One of following examples, maybe further considered:

- In one example, the transmission to TRP A is skipped or punctured following one of the examples of FIG. 15.
- In another example, if the transmission occasion on TRP A overlaps resources (e.g., RBs or REs) on TRP B that include non-UL resources (e.g., RBs or REs) (e.g., DL resources (e.g., RBs or REs)), the transmission to TRP A is skipped or punctured following one of the examples of FIG. 15, otherwise the UL transmission to TRP A can occur.
- In another example, a UE is configured a threshold. In one example, the threshold can be the number of resources (e.g., RBs or REs) in an UL transmission occasion to a TRP (e.g., TRP A) that can overlap non-uplink (e.g., downlink) resources (e.g., RBs or REs) in another TRP (e.g., TRP B) (alternatively, the threshold can be the number of resources (e.g., RBs or REs) of a transmission occasion that don't overlap non-UL (e.g., DL) resources (e.g., RBs or REs) on TRP B). In one example, the threshold can be the percentage or ratio of resources (e.g., RBs or REs) in an UL transmission occasion to a TRP (e.g., TRP A) that can overlap non-uplink (e.g., downlink) resources (e.g., RBs or REs) in another TRP (e.g., TRP B) (alternatively, the threshold can be the percentage or ratio of resources (e.g., RBs or REs) of a transmission occasion that don't overlap non-UL (e.g., DL) resources (e.g., RBs or REs) on TRP B). If the number or percentage or ratio of overlapping non-UL (e.g., DL) resources (e.g., RBs or REs) in TRP B exceeds (or exceeds or equals/is not smaller than) the threshold, or for the alternative examples, the number or percentage or ratio of overlapping UL resources (e.g., RBs or REs) in TRP B is less than (or less than or equal to) the threshold, the transmission to TRP A is skipped or punctured following one of the examples of FIG. 15, otherwise the UL transmission to TRP A can occur. When the UL transmission occurs, the following examples may be further considered (this can be defined in the specification and/or configured and/or updated by RRC signaling (common e.g., SIB, or UE dedicated), and/or MAC CE signaling and/or L1 control (e.g., DCI) signaling):

1. In one example, the transmission to TRP A is on resources (e.g., RBs or REs) of the transmission occasion.
2. In one example, the transmission to TRP A is only on resources (e.g., RBs or REs) that don't overlap non-UL (e.g., DL) resources (e.g., RBs or REs) on TRP B. The transmission to TRP A is rate matched around overlapping non-UL (e.g., DL) resources (e.g., RBs or REs) of TRP B.
3. In one example, the transmission to TRP A is only on resources (e.g., RBs or REs) that don't overlap non-UL (e.g., DL) resources (e.g., RBs or REs) on TRP B. The transmission to TRP A is punctured in the overlapping non-UL (e.g., DL) resources (e.g., RBs or REs) of TRP B.

The threshold can be defined in the specifications and/or configured and/or updated by RRC signaling (common e.g., SIB, or UE dedicated), and/or MAC CE signaling and/or L1 control (e.g., DCI) signaling. In one example, the threshold can be set to 0 or 0% or 0.0, i.e., if there are any non-UL (e.g., DL) resources (e.g., RBs or REs) overlapping the transmission occasion in TRP B the transmission to TRP A does not occur. In another example, the threshold can be set to infinity or MAX value or 100% or 1.0, transmission to TRP A can occur regardless of the number of overlapping non-uplink (e.g., DL) resources (e.g., RBs or REs) in TRP B.

In another example, the transmission to TRP A on a transmission occasion can occur regardless of the number of overlapping non-uplink (e.g., DL) resources (e.g., RBs or REs) in TRP B.

In one example, an UL transmission (e.g., PUSCH or PUCCH) is to TRP A in a transmission occasion e.g., uses a spatial relation associated with TRP A or a TCI state (UL TCI state or TCI state) associated with TRP A. The transmission occasion is in a SBFD symbol or slot with SBFD configuration A on TRP A. In TRP B, the overlapping resources (e.g., RBs or REs) are in a SBFD symbol or slot with SBFD configuration B. SBFD configuration A and SBFD configuration B can be different. One of following examples, maybe further considered:

In one example, the transmission to TRP A is skipped or punctured following one of the examples of FIG. 15, e.g., when SBFD configuration A and SBFD configuration B are different.

In another example, if the transmission occasion on TRP A overlaps resources (e.g., RBs or REs) on TRP B that include non-UL resources (e.g., RBs or REs) (e.g., DL resources (e.g., RBs or REs)), the transmission to TRP A is skipped or punctured following one of the examples of FIG. 15, otherwise the UL transmission to TRP A can occur (e.g., proceed).

In another example, a UE (e.g., the UE 116) is configured a threshold. In one example, the threshold can be the number of resources (e.g., RBs or REs) in an UL transmission occasion to a TRP (e.g., TRP A) that can overlap non-uplink (e.g., downlink) resources (e.g., RBs or REs) in another TRP (e.g., TRP B) (alternatively, the threshold can be the number of resources (e.g., RBs or REs) of a transmission occasion that don't overlap non-UL (e.g., DL) resources (e.g., RBs or REs) on TRP B). In one example, the threshold can be the percentage or ratio of resources (e.g., RBs or REs) in an UL transmission to a TRP (e.g., TRP A) that can overlap non-uplink (e.g., downlink) resources (e.g., RBs or REs) in another TRP (e.g., TRP B) (alternatively, the threshold can be the percentage or ratio of resources (e.g., RBs or REs) of a transmission occasion that don't overlap non-UL (e.g., DL) resources (e.g., RBs or REs) on TRP B). If the number or percentage or ratio of overlapping non-UL (e.g., DL) resources (e.g., RBs or REs) in TRP B exceeds (or exceeds or equals) the threshold, or for the alternative examples, the number or percentage or ratio of overlapping UL resources (e.g., RBs or REs) in TRP B is less than (or less than or equal to) the threshold, the transmission to TRP A is skipped or punctured following one of the examples of FIG. 15, otherwise the UL transmission to TRP A can occur. When the UL transmission occurs, the following examples may be further considered (this can be defined in the specification and/or configured and/or updated by RRC signaling (common e.g., SIB, or UE dedicated), and/or MAC CE signaling and/or L1 control (e.g., DCI) signaling):

1. In one example, the transmission to TRP A is on resources (e.g., RBs or REs) of the transmission occasion.
2. In one example, the transmission to TRP A is only on resources (e.g., RBs or REs) that don't overlap non-UL (e.g., DL) resources (e.g., RBs or REs) on TRP B. The transmission to TRP A is rate matched around overlapping non-UL (e.g., DL) resources (e.g., RBs or REs) of TRP B.
3. In one example, the transmission to TRP A is only on resources (e.g., RBs or REs) that don't overlap non-UL (e.g., DL) resources (e.g., RBs or REs) on TRP B. The transmission to TRP A is punctured in the overlapping non-UL (e.g., DL) resources (e.g., RBs or REs) of TRP B.

The threshold can be defined in the specifications and/or configured and/or updated by RRC signaling (common e.g., SIB, or UE dedicated), and/or MAC CE signaling and/or L1 control (e.g., DCI) signaling. In one example, the threshold can be set to 0 or 0% or 0.0, i.e., if there are any non-UL (e.g., DL) resources (e.g., RBs or REs) overlapping the transmission occasion in TRP B the transmission to TRP A does not occur. In another example, the threshold can be set to infinity or MAX value or 100% or 1.0, transmission to TRP A can occur regardless of the number of overlapping non-uplink (e.g., DL) resources (e.g., RBs or REs) in TRP B.

In another example, the transmission to TRP A on a transmission occasion can occur regardless of the number of overlapping non-uplink (e.g., DL) resources (e.g., RBs or REs) in TRP B.

In one example, an UL transmission (e.g., PUSCH or PUCCH) is transmitted to TRP A in a transmission occasion e.g., uses a spatial relation associated with TRP A or a TCI state (UL TCI state or TCI state) associated with TRP A. The transmission occasion is in a SBFD symbol or slot on TRP A. In TRP B, the overlapping resources (e.g., RBs or REs) are in a normal UL symbol or slot. One of following examples, maybe further considered:

In one example, the transmission to TRP A is skipped or punctured following one of the examples of FIG. 15.

In another example, the transmission to TRP A on a transmission occasion can occur (e.g., proceed).

The role of TRP A and TRP B can be switched.

For multi-TRP operation, an uplink transmission (e.g., PUSCH or PUCCH) is repeated N times across the multiple TRPs (e.g., 2 TRPs). As described in this disclosure herein, uplink transmissions can be limited to normal UL symbols or slots or to SBFD symbols or slots, or to both normal UL and SBFD symbols and slots. In an example, two numbers of repetitions can be configured, e.g., a first number of repetitions, N1, for normal UL symbols or slots and a second number of repetitions for, N2, for SBFD symbols or slots. In other example, there can be a first number of repetitions, N1, for SBFD symbols or slots with configuration A and a second number of repetitions for, N2, for SBFD symbols or slots with configuration B.

One step of multi-TRP transmission is to determine the TRP to use for a UL transmission occasion. As described in FIG. 15, this can depend on:

A mapping pattern: For example, a mapping pattern can be cyclic mapping where transmission to a first TRP (e.g., based on a spatial relation (e.g., from a first SRS resource set) or TCI state associated with the first TRP) is followed by second transmission to a second TRP (e.g., based on a spatial relation (e.g., from a second SRS resource set) or TCI state associated with the second TRP), and this transmission mapping pattern repeats. In another example, a mapping pattern can be sequential mapping, where $M_1$ transmissions to a first TRP (e.g., based on a spatial relation (e.g., from a first SRS resource set) or TCI state associated with the first TRP) are followed by $M_2$ transmission to a second TRP (e.g., based on a spatial relation (e.g., from a second SRS resource set) or TCI state associated with the second TRP) and this pattern repeats. In one example, $M_1=M_2=M$. In one example, M=2.

The mapping pattern can be confined within one type of slots or symbols, e.g., (1) normal UL slots or symbols, or (2) SBFD slots or symbols, or (3) SBFD slots or symbols with same SBFD configuration. Alternatively, the mapping pattern can be across slot or symbol types e.g., (1) normal UL and SBFD slots or symbols, (2) normal UL or normal DL or SBFD slots or symbols. In another example, there can be two mapping patterns; one used for normal UL (or normal) slots or symbols, and one use for SBFD slots or symbols.

A dropping pattern: The dropping pattern refers to how subsequent transmissions are handled, when a transmission in a transmission occasion cannot occur. In one example, the punctured transmission occasion is skipped, e.g., the mapping pattern is delayed by one transmission occasion (Example 1 and Example 3 of FIG. 15), the next valid or available transmission occasions is to a same TRP as the TRP of the skipped occasion. In one example, with reference to Example 2 and Example 4 of FIG. 15, subsequent transmissions determine the transmission pattern and occasion with the dropped transmissions are counted as occasions with actual transmissions.

Another step is to determine whether or not an uplink transmission can occur in a transmission occasion. One or more embodiments described herein provided relevant examples. In this embodiment considers additional examples.

In one example, an uplink transmission (e.g., PUSCH or PUCCH) is to TRP A. The UL transmission (e.g., a repetition of PUSCH or PUCCH or a first transmission) is in a SBFD slot or symbol. The UL transmission occasion to TRP A includes non-UL (e.g., DL) resources (e.g., RBs or REs). One of following examples, maybe further considered:

In one example, the transmission to TRP A is skipped or punctured following one of the examples of FIG. 15.

In another example, a UE is configured a threshold. In one example, the threshold can be the number of resources (e.g., RBs or REs) in an UL transmission occasion to a TRP (e.g., TRP A) that can be non-uplink (e.g., downlink) resources (e.g., RBs or REs) (alternatively, the threshold can be the number of resources (e.g., RBs or REs) of a transmission occasion that can't be non-UL (e.g., DL) resources (e.g., RBs or REs) in the transmission occasion). In one example, the threshold can be the percentage or ratio of resources (e.g., RBs or REs) in an UL transmission occasion to a TRP (e.g., TRP A) that can be non-uplink (e.g., downlink) resources (e.g., RBs or REs) (alternatively, the threshold can be the percentage or ratio of resources (e.g., RBs or REs) of a transmission occasion that cannot be non-UL (e.g., DL) resources (e.g., RBs or REs) in the transmission occasion). If the number or percentage or ratio of the non-UL (e.g., DL) resources (e.g., RBs or REs) in the transmission occasion exceeds (or exceeds or equals/is not smaller than) the threshold, or for the alternative examples, the number or percentage or ratio of UL resources (e.g., RBs or REs) in the transmission occasion is less than (or less than or equal to) the threshold, the transmission to TRP A is skipped or punctured following one of the examples of FIG. 15, otherwise the UL transmission to TRP A can occur. When the UL transmission occurs, the following examples may be further considered (this can be defined in the specification and/or configured and/or updated by RRC signaling (common e.g., SIB, or UE dedicated), and/or MAC CE signaling and/or L1 control (e.g., DCI) signaling):

1. In one example, the transmission to TRP A is on resources (e.g., RBs or REs) of the transmission occasion.
2. In one example, the transmission to TRP A is only on resources (e.g., RBs or REs) that do not overlap non-UL (e.g., DL) resources (e.g., RBs or REs) of the transmission occasion. The transmission to TRP A is rate matched around the non-UL (e.g., DL) resources (e.g., RBs or REs) of transmission occasion.
3. In one example, the transmission to TRP A is only on resources (e.g., RBs or REs) that do not overlap non-UL (e.g., DL) resources (e.g., RBs or REs) of the transmission occasion. The transmission to TRP A is punctured in the non-UL (e.g., DL) resources (e.g., RBs or REs) of the transmission occasion.

The threshold can be defined in the specifications and/or configured and/or updated by RRC signaling (common e.g., SIB, or UE dedicated), and/or MAC CE signaling and/or L1 control (e.g., DCI) signaling. In one example, the threshold can be set to 0 or 0% or 0.0, i.e., if there are any non-UL (e.g., DL) resources (e.g., RBs or REs) in the transmission occasion the transmission to TRP A does not occur. In another example, the threshold can be set to infinity or MAX value or 100% or 1.0, transmission to TRP A can occur (e.g., proceed) regardless of the number of non-uplink (e.g., DL) resources (e.g., RBs or REs) in the transmission occasion.

In a further example, for a transmission occasion used for an UL transmission from the UE to TRP A, the non-uplink resource (e.g., RB or RE) in the transmission occasion can be one of:

Non-uplink (e.g., DL) resource (e.g., RB or RE) for TRP A in the transmission occasion.

Non-uplink (e.g., DL) resource (e.g., RB or RE) for another TRP (e.g., TRP B) overlapping the transmission occasion.

Non-uplink (e.g., DL) resource (e.g., RB or RE) for TRP A in the transmission occasion, and non-uplink (e.g., DL) resource (e.g., RB or RE) for another TRP (e.g., TRP B) overlapping the transmission occasion.

Figure 19:
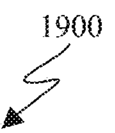
FIG. 19 illustrates an example method performed by a UE in a wireless communication system according to embodiments of the present disclosure.
Figure 19:
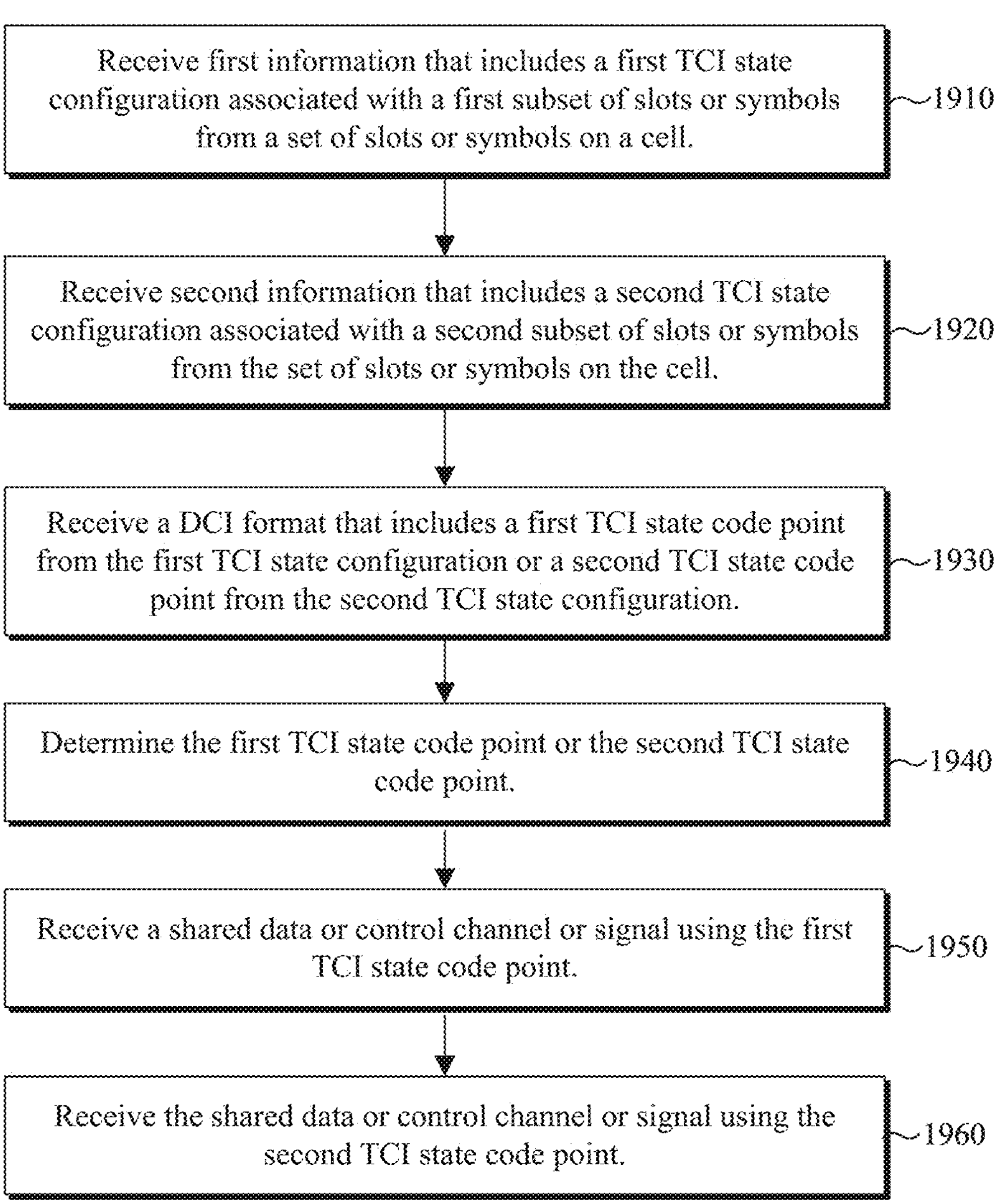

FIG. 19 illustrates an example method 1900 performed by a UE in a wireless communication system according to embodiments of the present disclosure. The method 1900 of FIG. 19 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 1900 is for illustration only and other embodiments can be used without departing from the scope of the present disclosure.

The method 1900 begins with the UE receiving first information that includes a first TCI state configuration associated with a first subset of slots or symbols from a set of slots or symbols on a cell (1910). For example, in 1910, the first subset of slots or symbols does not include time-domain resources indicated for simultaneous transmission and reception on the cell. The UE then receives second information that includes a second TCI state configuration associated with a second subset of slots or symbols from the set of slots or symbols on the cell (1920). For example, in 1920, the second subset of slots or symbols includes time-domain resources indicated for simultaneous transmission and reception on the cell.

The UE then receives a DCI format that includes a first TCI state code point from the first TCI state configuration or a second TCI state code point from the second TCI state configuration (1930). In various embodiments, the first TCI state code point and the second TCI state code point include a DL TCI state, an UL TCI state, a joint TCI state, or a pair of DL and UL TCI states. In various embodiments, the DCI format includes a field that indicates a presence of the first TCI state code point or the second TCI state code point.

The UE then determines the first TCI state code point or the second TCI state code point (1940). For example, in 1940, the determination based on whether a slot or symbol is from the first subset of slots or symbols or the second subset of slots or symbols. For example, if the slot or symbol is from the first subset of slots or symbols, the UE determines the first TCI state code point and if the slot or symbol is from the second subset of slots or symbols, the UE determines the second TCI state code point. In various embodiments, a TCI state includes a source reference signal for quasi-colocation or a source reference signal for spatial information. If the TCI state is associated with the first TCI state code point, the source reference signal is transmitted in the first subset of slots or symbols, and if the TCI state is associated with the second TCI state code point, the source reference signal is transmitted the second subset of slots or symbols.

The UE then receives a shared data or control channel or signal using the first TCI state code point (1950). For example, in 1950, the reception is based on the determination that the slot or symbol is from the first subset of slots or symbols. The UE then receives the shared data or control channel or signal using the second TCI state code point (1960). For example, in 1960, the reception is based on the determination that the slot or symbol is from the second subset of slots or symbols.

In various embodiments, the UE receives a PUSCH repetition Type A configuration, determines if a slot or symbol for a PUSCH repetition instance is in the second subset, and skips a transmission of the PUSCH repetition instance in the second subset.

In various embodiments, the UE receives a PUSCH repetition Type A configuration, determines if a slot or symbol for a PUSCH repetition instance is in the second subset, transmits the PUSCH repetition instance in the second subset, and rate matches around non-uplink (UL) resource elements.

In various embodiments, the UE receives a PUSCH repetition Type A configuration and a threshold for a minimum number of resource elements, determines if a slot or symbol for a PUSCH repetition instance is in the second subset, determines if a number of available uplink (UL) resources exceeds the threshold, and transmits, based on the determination that the number of available UL resource exceeds the threshold, the PUSCH repetition instance in the second subset.

Any of the above variation embodiments can be utilized independently or in combination with at least one other variation embodiment.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:

a transceiver configured to receive:

first information that includes a first transmission configuration indicator (TCI) state configuration associated with a first subset of slots or symbols from a set of slots or symbols on a cell, second information that includes a second TCI state configuration associated with a second subset of slots or symbols from the set of slots or symbols on the cell, and a downlink control information (DCI) format that includes a first TCI state code point from the first TCI state configuration or a second TCI state code point from the second TCI state configuration; and a processor operably coupled to the transceiver, the processor configured to determine, based on whether a slot or symbol is from the first subset of slots or symbols or the second subset of slots or symbols, the first TCI state code point or the second TCI state code point, wherein the transceiver is further configured to:

receive, based on the determination that the slot or symbol is from the first subset of slots or symbols, a shared data or control channel or signal using the first TCI state code point, and receive, based on the determination that the slot or symbol is from the second subset of slots or symbols, the shared data or control channel or signal using the second TCI state code point, wherein the first subset of slots or symbols does not include time-domain resources indicated for simultaneous transmission and reception on the cell, and wherein the second subset of slots or symbols includes time-domain resources indicated for simultaneous transmission and reception on the cell.

2. The UE of claim 1, wherein the first TCI state code point and the second TCI state code point include:

a downlink (DL) TCI state, an uplink (UL) TCI state, a joint TCI state, or a pair of DL and UL TCI states.

3. The UE of claim 1, wherein:

a TCI state includes a source reference signal for quasi-colocation or a source reference signal for spatial information, if the TCI state is associated with the first TCI state code point, the source reference signal is transmitted in the first subset of slots or symbols, and if the TCI state is associated with the second TCI state code point, the source reference signal is transmitted the second subset of slots or symbols.

4. The UE of claim 1, wherein:

the DCI format includes a field, and the field indicates a presence of:

the first TCI state code point, or the second TCI state code point.

5. The UE of claim 1, wherein:

the transceiver is further configured to receive a physical uplink shared channel (PUSCH) repetition Type A configuration, the processor is further configured to determine if a slot or symbol for a PUSCH repetition instance is in the second subset, and the transceiver is further configured to skip a transmission of the PUSCH repetition instance in the second subset.

6. The UE of claim 1, wherein:

the transceiver is further configured to receive a physical uplink shared channel (PUSCH) repetition Type A configuration, the processor is further configured to determine if a slot or symbol for a PUSCH repetition instance is in the second subset, and the transceiver is further configured to:

transmit the PUSCH repetition instance in the second subset, and rate match around non-uplink (UL) resource elements.

7. The UE of claim 1, wherein:

the transceiver is further configured to receive:

a physical uplink shared channel (PUSCH) repetition Type A configuration, and a threshold for a minimum number of resource elements;

the processor is further configured to:

determine if a slot or symbol for a PUSCH repetition instance is in the second subset, and determine if a number of available uplink (UL) resources exceeds the threshold; and the transceiver is further configured to transmit, based on the determination that the number of available UL resource exceeds the threshold, the PUSCH repetition instance in the second subset.

8. A base station (BS) comprising:

a transceiver configured to transmit:

first information that includes a first transmission configuration indicator (TCI) state configuration associated with a first subset of slots or symbols from a set of slots or symbols on a cell, second information that includes a second TCI state configuration associated with a second subset of slots or symbols from the set of slots or symbols on the cell, and a downlink control information (DCI) format that includes a first TCI state code point from the first TCI state configuration or a second TCI state code point from the second TCI state configuration; and a processor operably coupled to the transceiver, the processor configured to determine, based on whether a slot or symbol is from the first subset of slots or symbols or the second subset of slots or symbols, the first TCI state code point or the second TCI state code point, wherein the transceiver is further configured to:

transmit, based on the determination that the slot or symbol is from the first subset of slots or symbols, a shared data or control channel or signal using the first TCI state code point, and transmit, based on the determination that the slot or symbol is from the second subset of slots or symbols, the shared data or control channel or signal using the second TCI state code point, wherein the first subset of slots or symbols does not include time-domain resources indicated for simultaneous transmission and reception on the cell, and wherein the second subset of slots or symbols includes time-domain resources indicated for simultaneous transmission and reception on the cell.

9. The BS of claim 8, wherein the first TCI state code point and the second TCI state code point include:

a downlink (DL) TCI state, an uplink (UL) TCI state, a joint TCI state, or a pair of DL and UL TCI states.

10. The BS of claim 8, wherein:

a TCI state includes a source reference signal for quasi-colocation or a source reference signal for spatial information, if the TCI state is associated with the first TCI state code point, the source reference signal is transmitted in the first subset of slots or symbols, and if the TCI state is associated with the second TCI state code point, the source reference signal is transmitted the second subset of slots or symbols.

11. The BS of claim 8, wherein:

the DCI format includes a field, and the field indicates a presence of:

the first TCI state code point, or the second TCI state code point.

12. The BS of claim 8, wherein:

the transceiver is further configured to transmit a physical uplink shared channel (PUSCH) repetition Type A configuration, the processor is further configured to determine if a slot or symbol for a PUSCH repetition instance is in the second subset, and the transceiver is further configured to skip a reception of the PUSCH repetition instance in the second subset.

13. The BS of claim 8, wherein:

the transceiver is further configured to transmit a physical uplink shared channel (PUSCH) repetition Type A configuration, the processor is further configured to determine if a slot or symbol for a PUSCH repetition instance is in the second subset, and the transceiver is further configured to:

receive the PUSCH repetition instance in the second subset, and rate match around non-uplink (UL) resource elements.

14. The BS of claim 8, wherein:

the transceiver is further configured to transmit:

a physical uplink shared channel (PUSCH) repetition Type A configuration, and a threshold for minimum number of resource elements;

the processor is further configured to:

determine if a slot or symbol for a PUSCH repetition instance is in the second subset, and determine if a number of available uplink (UL) resources exceeds the threshold; and the transceiver is further configured to receive, based on the determination that the number of available UL resource exceeds the threshold, the PUSCH repetition instance in the second subset.

15. A method of operating a user equipment (UE), the method comprising:

receiving first information that includes a first transmission configuration indicator (TCI) state configuration associated with a first subset of slots or symbols from a set of slots or symbols on a cell;

receiving second information that includes a second TCI state configuration associated with a second subset of slots or symbols from the set of slots or symbols on the cell;

receiving a downlink control information (DCI) format that includes a first TCI state code point from the first TCI state configuration or a second TCI state code point from the second TCI state configuration;

determining, based on whether a slot or symbol is from the first subset of slots or symbols or the second subset of slots or symbols, the first TCI state code point or the second TCI state code point; and one of:

receiving, based on the determination that the slot or symbol is from the first subset of slots or symbols, a shared data or control channel or signal using the first TCI state code point; or receiving, based on the determination that the slot or symbol is from the second subset of slots or symbols, the shared data or control channel or signal using the second TCI state code point, wherein the first subset of slots or symbols does not include time-domain resources indicated for simultaneous transmission and reception on the cell, and wherein the second subset of slots or symbols includes time-domain resources indicated for simultaneous transmission and reception on the cell.

16. The method of claim 15, wherein:

the first TCI state code point and the second TCI state code point include:

a downlink (DL) TCI state, an uplink (UL) TCI state, a joint TCI state, or a pair of DL TCI state and UL TCI state;

a TCI state includes a source reference signal for quasi-colocation or a source reference signal for spatial information;

if the TCI state is associated with the first TCI state code point, the source reference signal is transmitted in the first subset of slots or symbols; and if the TCI state is associated with the second TCI state code point, the source reference signal is transmitted the second subset of slots or symbols.

17. The method of claim 15, wherein:

the DCI format includes a field, and the field indicates a presence of:

the first TCI state code point, or the second TCI state code point.

18. The method of claim 15, further comprising:

receiving a physical uplink shared channel (PUSCH) repetition Type A configuration;

determining if a slot or symbol for a PUSCH repetition instance is in the second subset; and skipping a transmission of the PUSCH repetition instance in the second subset.

19. The method of claim 15, further comprising:

receiving a physical uplink shared channel (PUSCH) repetition Type A configuration;

determining if a slot or symbol for a PUSCH repetition instance is in the second subset;

transmitting the PUSCH repetition instance in the second subset; and rate matching around non-uplink (UL) resource elements.

20. The method of claim 15, further comprising:

receiving a physical uplink shared channel (PUSCH) repetition Type A configuration;

receiving a threshold for minimum number of resource elements;

determining if a slot or symbol for a PUSCH repetition instance is in the second subset;

determining if a number of available uplink (UL) resource exceeds the threshold; and transmitting, based on the determination that the number of available UL resource exceeds the threshold, the PUSCH repetition instance in the second subset.

* * * * *